United States Patent
Bansal et al.

(10) Patent No.: US 12,462,254 B2
(45) Date of Patent: *Nov. 4, 2025

(54) SYSTEMS AND METHODS FOR DYNAMIC MANAGEMENT OF A PLURALITY OF RESOURCES ACROSS COMPUTER NETWORKS USING SYNTHETIC AVAILABILITIES

(71) Applicant: Citibank, N.A., New York, NY (US)

(72) Inventors: Ambrish Bansal, New York, NY (US); Sujay Nanjashetty, London (GB); John Oladapo Olalowo Olatunji, London (GB); Diego Miyake Dos Santos, Tampa, FL (US); Rodolphe De Lassus Saint-Genies, New York, NY (US); Ryan Rhea Rugg, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/205,967

(22) Filed: May 12, 2025

(65) Prior Publication Data

US 2025/0272681 A1    Aug. 28, 2025

Related U.S. Application Data

(63) Continuation-in-part of application No. 19/200,630, filed on May 6, 2025, and a continuation-in-part of application No. 18/979,083, filed on Dec. 12, 2024, now Pat. No. 12,335,168, which is a continuation-in-part of application No. 18/887,688, filed on Sep. 17, 2024, said application No. 19/200,630 is a continuation-in-part of application No. 18/596,273, filed on Mar. 5, 2024, now Pat. No. 12,346,905, said application No. 18/887,688 is a continuation of application No. 18/592,244, filed on Feb. 29, 2024, now Pat. No. 12,095,676, said application No. 18/596,273 is a continuation of application No. 17/498,622, filed on Oct. 11, 2021, now Pat. No. 11,935,052.

(51) Int. Cl.
G06Q 20/40      (2012.01)
G06F 16/27      (2019.01)
G06Q 20/36      (2012.01)
G06Q 20/38      (2012.01)

(52) U.S. Cl.
CPC .......... *G06Q 20/401* (2013.01); *G06F 16/27* (2019.01); *G06Q 20/36* (2013.01); *G06Q 20/3829* (2013.01); *G06Q 2220/00* (2013.01)

(58) Field of Classification Search
CPC .. G06Q 20/401; G06Q 20/36; G06Q 20/3829; G06Q 2220/00; G06F 16/27
See application file for complete search history.

(56) References Cited

U.S. PATENT DOCUMENTS 10,621,164 B1 *   4/2020   Kain ...................... G06F 16/215
11,706,155 B1 *   7/2023   O'Connor ................. H04L 9/50
                                                                709/226
2022/0272084 A1 * 8/2022   Hyatt ...................... H04W 4/70

* cited by examiner

*Primary Examiner* — Minh Chau Nguyen
(74) *Attorney, Agent, or Firm* — Foley & Lardner LLP

(57) ABSTRACT

Systems and methods for managing resources across a global and/or cloud network. In particular, systems and methods for mitigating issues related to providing services while resources are offline (or may potentially go offline). For example, the systems and methods may mitigate issues related to providing services while resources are offline (or may potentially go offline) by monitoring network services at an aggregate level.

18 Claims, 15 Drawing Sheets

SYSTEMS AND METHODS FOR DYNAMIC MANAGEMENT OF A PLURALITY OF RESOURCES ACROSS COMPUTER NETWORKS USING SYNTHETIC AVAILABILITIES

CROSS REFERENCE TO RELATED APPLICATION(S)

This application is a continuation-in-part of U.S. patent application Ser. No. 19/200,630, filed May 6, 2025, which is a continuation-in-part of U.S. patent application Ser. No. 18/887,688, filed Sep. 17, 2024, which is a continuation of U.S. Pat. No. 12,095,676, filed Feb. 29, 2024. The content of the foregoing applications is incorporated herein in its entirety by reference.

This application is also a continuation-in-part of U.S. patent application Ser. No. 18/979,083, filed Dec. 12, 2024, which is a continuation-in-part of U.S. patent application Ser. No. 18/887,688, filed Sep. 17, 2024, which is a continuation of U.S. Pat. No. 12,095,676, filed Feb. 29, 2024. The content of the foregoing applications is incorporated herein in its entirety by reference.

This application is also a continuation-in-part of U.S. patent application Ser. No. 18/596,273, filed Mar. 5, 2024, which is a continuation of U.S. Pat. No. 11,935,052, filed Oct. 11, 2021. The content of the foregoing applications is incorporated herein in its entirety by reference.

BACKGROUND

Cloud computing refers to the delivery of computing services over the internet (the cloud) to offer on-demand access to a variety of resources, including computing power, storage, databases, networking, and/or software, without direct management or control of the underlying infrastructure by the user. A key characteristic of cloud computing is that it allows for the quick and flexible scaling of resources up or down based on demand. To provide this rescaling, the devices in the cloud computing network must maintain connectivity to the network. If a device loses connectivity to the network, the device is no longer available for use as a network resource.

To mitigate disruptions resulting from the loss of one or more devices in the network, cloud providers often have redundant systems in place across multiple devices, data centers, and/or regions. If one device (or data center) experiences an outage, services can be rerouted to another device (or data center), ensuring continuity of service. This redundancy reduces the impact of random network outages.

However, rerouting services and redundancies have their limits. For example, while a given service may be rerouted if a data center assigned to that service goes offline, the network still loses the resources of that data center (e.g., the aggregate number of services that can be performed by the network are reduced due to the loss of the data center). If the percentage of resources in a network that goes offline is too high or the number of services otherwise required exceeds the available resources, the services must be triaged and/or services are suspended.

To further complicate this technical problem, if a resource goes offline, information about that resource is also inaccessible. For example, information about what services are, or were, being provided by the resource is no longer available. This not only affects services currently being performed (e.g., services that are suspended), but also prevents the network as a whole from obtaining information used to plan and/or route services in the future. For example, the network is no longer able to determine if the resource will have availability for performing future services (e.g., based on services currently being performed being completed, services not currently being scheduled to be performed in the future, and/or services likely to be completed while the resource is offline).

SUMMARY

In view of the aforementioned technical problems, systems and methods are described herein for managing resources across a global and/or cloud network. In particular, systems and methods are described for mitigating issues related to providing services while resources are offline (or may potentially go offline). For example, the systems and methods may mitigate issues related to providing services while resources are offline (or may potentially go offline) by monitoring network services at an aggregate level. By doing so, the system may determine what resources, if any, will have availability for performing services (e.g., services currently being performed being completed, services not currently being scheduled, and/or services likely to be completed) irrespective of whether or not a resource is offline.

However, monitoring network services at an aggregate level presents several technical issues. First, different services may require different resources that may be described by different terminology and/or may generate usage data related to the different resources in different formats. Furthermore, the way an application uses a resource to perform a service, the availability required, and/or the attributes of that service may be specific to the application and/or resource. To overcome these technical issues, the system generates a tokenized representation of these respective availabilities, which standardizes and abstracts the underlying complexities of different formats and requirements. Using this tokenization, the system may monitor the network services at the aggregate level.

Unfortunately, tokenization alone does not overcome all the technical issues related to monitoring network services at the aggregate level. For example, to generate a proper tokenization of availability at a resource, the system needs to receive updated data related to each service and resource. However, if a resource is offline, the updated data may not be available. As such, the system may determine a synthetic availability for any resource that is offline to complement an actual availability of any resource that is online. The system may then tokenize the synthetic availability and actual availability. The tokenization of these availabilities may then be used to monitor the network services at the aggregate level in real-time with the system replacing the tokens of the synthetic availability with actual availability (and vice-versa) as resource come online and go offline.

However, the real-time monitoring of tokens based on synthetic availability and actual availability as well as replacing tokens based on synthetic availability and actual availability as devices comes online presents timing and organizational challenges. Furthermore, maintaining a log of the tokens and/or their respective basis (e.g., synthetic or actual availability) creates a fundamental technical flaw in that if the device (or data center) responsible for maintaining the log goes offline, the entire system is threatened. To overcome this fundamental technical flaw, the system maintains the log through a series of self-executing programs across a decentralized blockchain network. For example, by using the decentralized blockchain network to maintain the log, the loss of any device (or data center) due to the device (or data center) going offline will not threaten the system or impede its ability to monitoring network services at the aggregate level.

In some aspects, systems and methods for managing resources across global or cloud networks while mitigating issues related to providing services while resources are offline are disclosed. For example, the system may determine, using a first self-executing program, a first actual availability for a first resource in a first network, wherein the first resource is currently online. The system may determine, using a second self-executing program, a first synthetic availability for a second resource in the first network, wherein the second resource is currently offline. The system may generate an aggregate availability for the first network based on the first synthetic availability and the first synthetic availability. The system may receive a first user request to perform a first blockchain action across the first network. The system may process the first user request by adjusting the aggregate availability based on the first blockchain action.

Another problem faced with managing network resources to provide network services is efficiently allocating resources to enable network services to be provided. For example, as each service has its own set of requirements (e.g., required resources, processing requirements, memory requirements, etc.), existing systems may simply identify which resources are available and may select such resources (e.g., allocate resources) based on the requirements of the service. However, such allocation of resources is performed under a "real-time" mindset. That is, existing systems liberally allocate resources for the service based simply on the requirements for that service and the availability of resources that can fulfill those requirements. For example, existing systems may allocate a greater number of dispersed resources to fulfill the requirements of that service. Furthermore, each resource within a computing network may have a set of computational limits (e.g., processing power limits, processing speed, memory limits, storage availability, or other limitations).

To help allocate resources in view of resource limitations, existing systems may allocate a number of resources to a service that is in accordance with these computational limits. However, because this allocation of resources is performed under this "real-time" mindset, when these limits are exceeded (e.g., due to a large volume of requests being processed by the service), existing systems must reallocate resources to provide the service—thereby wasting valuable computational resources (e.g., computer memory and processing resources) to reallocate resources to the service. As such, existing systems may waste valuable computational resources at times where resource availability is needed the most.

To overcome this, the methods and systems described herein may manage resources irrespective of resource readiness to reduce wasted computational resources associated with reallocating computational resources. For example, contrary to existing systems, the system may assume that all resources within a computing network are currently unavailable and/or the computational limitations of such resources are maxed out. To accomplish this, in accordance with one or more embodiments, the system may determine and use synthetic availabilities for each computing resource of the computing network to be used as a basis for allocating resources. For example, as opposed to using actual availability information (e.g., real-time availability information of a resources), the system may use standardized synthetic availability of the resources of the computing network. As the tokenized synthetic availability of a resource may represent that a resource is currently offline (e.g., unavailable) and/or the resource is computationally maxed out, the system is forced to rely on a worst-case scenario basis when allocating resources for a given service.

To do so, the system may determine an aggregate availability for the computer network based on the synthetic availabilities of the computing network. For example, the system may use an artificial intelligence model to determine a network-wide availability of resources using the synthetic availabilities of the computing network to conservatively allocate resources on a worst-case scenario basis. For instance, as opposed to determining the availability of resources when resources are available (or not limited by their computational limits), the system assumes, via the synthetic availabilities that resources are unavailable (or near/at their computational limits). Under this worst-case scenario (or limited) basis, the system may allocate resources for a service by consolidating the amount of resources needed to provide the intended service to reduce future reallocation of resources. By doing so, the system may conservatively allocate (e.g., select) resources, thereby reducing wasted computational resources associated with such reallocation procedures.

In some aspects, systems and methods for managing resources across global or cloud networks while mitigating issues related to providing services irrespective of resource readiness are disclosed. For example, the system may determine, using a first self-executing program, a first synthetic availability for a first resource in a first computer network, wherein the first synthetic availability is represented by a first cryptographically secure digital asset in a digital log, and wherein the first synthetic availability is related to a first actual availability for the first resource. The system may determine, using a second self-executing program, a second synthetic availability for a second resource in the first computer network, wherein the second synthetic availability is represented by a second cryptographically secure digital asset in the digital log, and wherein the second synthetic availability is related to a second actual availability for the second resource. The system may determine, using a first artificial intelligence model, a first aggregate availability for the first computer network based on the first synthetic availability and the second synthetic availability. The system may receive a first request to perform a first blockchain action across the first computer network. The system may process the first blockchain action using the first aggregate availability.

Another challenge in managing network resources to provide network services is that availability can become overly distributed across too many resources. In an effort to avoid bottlenecks and increase system resilience, availability may be spread thinly across numerous nodes or endpoints. However, this over-distribution can lead to inefficiencies where certain resources remain underutilized, while none of the resources individually possess sufficient capacity to handle a substantial workload. As a result, even though total availability across the network might be adequate in theory, the inability to consolidate or reaggregate this availability when needed can prevent the system from effectively responding to demand. This fragmentation of resources ultimately undermines the very goal of improving performance and reliability, creating new bottlenecks and potential points of failure in a system designed to avoid them.

To overcome this technical challenge, the system may automatically pool availability at a plurality of resources across computer networks by dynamically determining aggregation events to overcome the challenge of over-distribution by intelligently coordinating when and where to consolidate resources. Instead of passively allowing availability to remain scattered, the system continuously monitors network conditions, resource usage, and service demand to identify optimal moments for aggregation. These dynamically triggered aggregation events enable the system to temporarily reallocate or centralize availability from multiple underutilized resources to a single resource or group of resources where demand is concentrated. This ensures that sufficient availability can be mobilized in real-time to meet service requirements without overwhelming any single node or leaving resources idle. By adapting to current network states and workload patterns, the system maintains both flexibility and efficiency, effectively balancing the need for distribution with the benefits of consolidation.

In some aspects, systems and methods for pooling a plurality of resources across computer networks are described. For example, the system may determine a first actual availability for a first resource in a first computer network for a first user. The system may determine a second actual availability for a second resource in the first computer network for the first user. The system may determine a first aggregate availability for the first user based on the first actual availability and the second actual availability. The system may determine, using a first self-executing program, a first synthetic availability based on the first aggregate availability, wherein the first synthetic availability is represented by a first cryptographically secure digital asset in a digital log. The system may process a first blockchain action based on the first synthetic availability by populating a third resource in the first computer network for the first user with a third actual availability corresponding to the first synthetic availability and modifying, using a second self-executing program, the first synthetic availability as recorded in the digital log.

Another challenge in managing network resources to provide network services is due to the distribution of availability across network resources, those resources may not provide access in real-time. For example, when availability is spread out over a wide range of resources, there may be delays in locating, coordinating, and accessing the necessary capacity to fulfill a service request. Each resource may be operating independently, with limited awareness of overall network demand or the availability status of other nodes. As a result, even if sufficient availability exists in the system as a whole, the lack of real-time synchronization and coordination can prevent timely access to those resources. This fragmentation can lead to latency, reduced responsiveness, and an inability to meet time-sensitive service requirements, ultimately compromising the efficiency and reliability of the network services being delivered.

To overcome this challenge, the systems and methods may dynamically manage a plurality of resources across computer networks using synthetic availabilities. For example, the system may use synthetic availability to effectively mitigate delays in locating, coordinating, and accessing the necessary capacity to fulfill a service request by representing actual availability with a more agile, manageable abstraction. Synthetic availability serves as a temporary, virtual stand-in for real resource availability, allowing the system to make faster decisions about allocation and coordination without waiting for real-time confirmation from each physical resource. It can be dynamically reallocated, adjusted, or reserved in anticipation of demand, acting as a placeholder during the interim period required to mobilize actual resources. This enables the system to respond quickly to service requests, initiating processes such as routing, load balancing, or provisioning while the underlying availability is being finalized or restructured. By decoupling decision-making from the latency of physical resource coordination, synthetic availability improves responsiveness, supports more seamless scaling, and helps maintain the continuity of network services even in complex or distributed environments.

In some aspects, systems and methods for dynamic management of a plurality of resources across computer networks using synthetic availabilities are described. For example, the system may receive a first request to generate availability at a first resource. In response to the first request, the system may determine a first actual availability for a second resource. The system may determine, using a first self-executing program, a first synthetic availability for the second resource based on the first actual availability, wherein the first synthetic availability is represented by a first cryptographically secure digital asset in a digital log. The system may determine whether to authorize the first request. In response to determining whether to authorize the first request, the system may process a first blockchain action to transfer the first synthetic availability from the second resource to a second synthetic availability for the first resource. The system may determine, using a second self-executing program, a second actual availability for the first resource based on the second synthetic availability.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
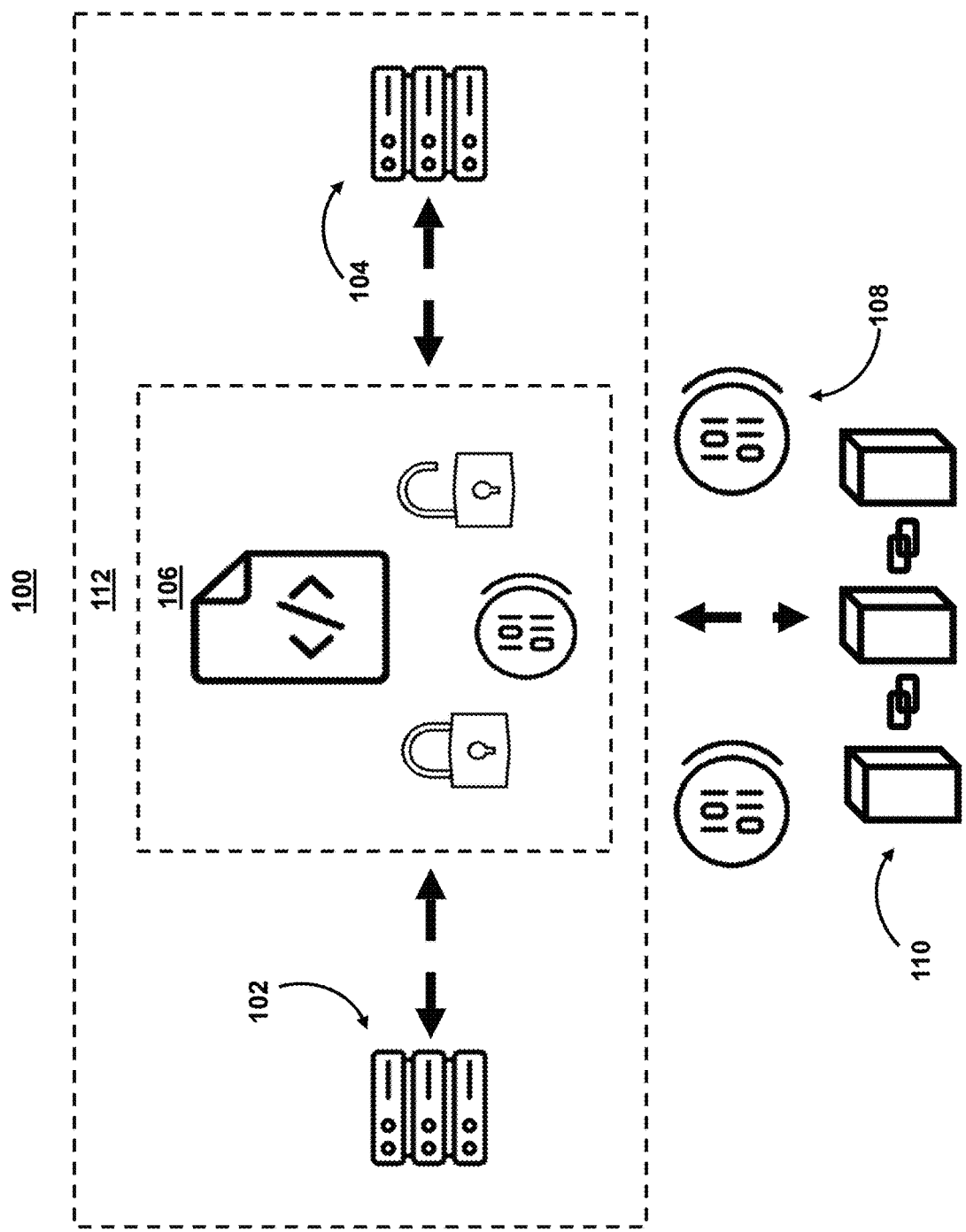
FIG. 1A shows an illustrative architecture for managing resources across global or cloud networks, in accordance with one or more embodiments.

FIG. 1A shows an illustrative architecture for managing resources across global or cloud networks, in accordance with one or more embodiments. For example, system 100 includes a network between two resources (e.g., resource 102 and resource 104). As described herein, a resource may refer to any entity or component within the network that is made available and accessible for use by network users, applications, or devices. These resources can be hardware devices, software applications, or data that are shared across the network for various purposes. Hardware devices may include physical devices connected to the network that can be shared among multiple users or applications. Examples of hardware resources in a network include printers, scanners, servers, routers, switches, storage devices (like NAS-Network Attached Storage), and other peripheral devices. Software resources may be software applications, programs, or services made available for access and utilization over the network. This could include shared databases, file servers, web servers, email servers, application servers, and any other software-based services accessible to network users. Data resources refer to information or data stored and shared within the network. This could include shared files, documents, databases, multimedia content, and any other data that can be accessed and utilized by authorized users or applications within the network. Network resources are typically made accessible through a process called resource sharing or resource sharing protocols, which allow authorized users or devices to access, use, or modify these resources based on permissions and security configurations set by the network administrators. For instance, in a client-server network model, a server could host resources such as files or applications, and client devices can request access to these resources over the network. Access control mechanisms, such as user authentication and permissions, regulate who can access specific resources and what actions they can perform on those resources.

In some embodiments, resources may encompass a wide array of assets, tools, and components that are essential for conducting operations, delivering services, managing finances, and supporting a financial service firm's overall functioning. For example, a resource may comprise financial assets. Financial assets include cash reserves, investments, securities, loans, and other financial instruments held by the firm or managed on behalf of clients. For example, a resource corresponding to a user may comprise a bank account for that user.

In some embodiments, a resource may comprise a bank branch or other subdivision of the firm and/or an amount of liquidity for the bank branch or subdivision. For example, when a resource is a bank branch or other subdivision, the resource may go on and/or offline based on the operating hours (or regulated trading hours) for the bank branch or subdivision. For example, banks and financial institutions often have specific business hours during which their systems and staff are available to process transactions. Outside these hours, certain banking functions, including fund transfers, may not be processed immediately. Some financial regulations or rules may limit or dictate the processing of certain types of transactions or transfers after regular business hours for security, compliance, or fraud prevention purposes. Banks may also risk management measures in place to detect and prevent fraudulent activities. Transactions initiated after hours may be flagged for additional scrutiny to ensure they are legitimate, which could cause delays.

In some embodiments, system 100 may illustrate one or more communications between resource 102 and resource 104 as managed by a platform application. For example, a platform application may be used to facilitate one or more blockchain actions (e.g., via self-executing program 106) to conduct the communications across computer network 112.

As referred to herein, a computer network may refer to a collection of interconnected computers and other devices that are linked together to share resources, information, and services. These networks can be established using various technologies and configurations, allowing devices to communicate and exchange data with each other. In some embodiments, the computer network may comprise a network for a financial services firm.

In some embodiments, a computer network (or simply network) may refer to the interconnected system of computers, devices, and infrastructure specifically designed and configured to support the operations and services provided by a financial service firm and/or the financial industry. The network infrastructure may enable the firm to process transactions efficiently and securely. This includes services like online banking, wire transfers, trading platforms for stocks and securities, electronic fund transfers, and other financial transactions. For example, financial firms often require connectivity to various financial markets, exchanges, and data providers. The network infrastructure allows access to real-time market data, trade execution platforms, and connections to external financial systems.

In some embodiments, the computer network may comprise a global payment network that facilitate credit and debit card transactions. The network may connect issuing banks, acquiring banks, merchants, and cardholders, enabling electronic payments at point-of-sale terminals and online. In some embodiments, the computer network may comprise an ACH (Automated Clearing House). An ACH is a network used for electronic fund transfers and direct deposits in the United States. It enables the processing of large volumes of credit and debit transactions, including payroll deposits, bill payments, and person-to-person transfers. In some embodiments, the computer network may comprise a SWIFT (Society for Worldwide Interbank Financial Telecommunication) network. SWIFT is a global messaging network used by financial institutions for secure communication and the transfer of financial messages, particularly for international transactions and cross-border payments. In some embodiments, the computer network may comprise a blockchain network.

As described herein, a "platform application" may refer to software or an application that serves as a foundation or infrastructure for developing and deploying other software applications or services. It provides a set of tools, frameworks, and functionalities upon which developers can build, integrate, and run applications. These platforms form the basis for running other software applications. Examples include Windows, macOS, Linux, iOS, and Android. They provide the necessary environment and services for software to execute on devices like computers, smartphones, and tablets.

In some embodiments, the platform application may be used to manage the availability of devices in a computer network. This type of platform application is designed to monitor, control, and manage various devices and components within a network to ensure their availability, performance, and security. The platform application may automatically identify and map devices present on the network, including computers, routers, switches, servers, printers, and other network-connected devices. The platform application may constantly monitor the status and performance metrics (such as bandwidth usage, CPU usage, memory, etc.) of network devices to identify any abnormalities or performance bottlenecks. The platform application may generate alerts or notifications when certain predefined thresholds are breached or when anomalies in network behavior are detected. This helps in proactive issue resolution and prevents network downtime. The platform application may allow administrators to centrally manage and update device configurations, ensuring consistency and compliance with network policies and standards. The platform application may monitor the network for security threats, unauthorized access attempts, malware, and other vulnerabilities, providing insights into potential security breaches.

In some embodiments, the platform application may comprise a platform application for a financial services firm. A platform application, in the context of a financial services firm or a global bank, typically refers to a software application or system that serves as a foundation or framework for delivering various financial services, managing transactions, facilitating communication, and supporting interactions between different entities within the firm or with external stakeholders such as clients, partners, or regulatory bodies. These platform applications may be designed to integrate multiple functionalities and services within a unified infrastructure. These functionalities and services may encompass various aspects such as banking operations (e.g., day-to-day banking operations including customer onboarding, account management, transaction processing, and compliance), trading (e.g., trading functionalities for various financial instruments like stocks, bonds, derivatives, and currencies), risk management (e.g., risk assessment and management tools to monitor and mitigate risks across different financial activities), Customer Relationship Management (CRM) (e.g., functionalities that manage client interactions, track customer preferences, and personalize services), data analytics and reporting (e.g., capabilities that derive insights from large volumes of financial data), compliance and regulatory requirements (e.g., features to ensure compliance with various financial regulations and standards), and mobile and online banking (e.g., mobile applications and online banking portals).

In some embodiments, the first request may comprise receiving, at a platform management application, a user request to perform a first off-chain action. The system may then determine that the first blockchain action corresponds to first off-chain action. For example, a user may initiate a request for a specific action that needs to be performed off-chain. This request could come through a user interface, API call, or any other user interaction method supported by the platform. The user request is received by the system and routed to a platform management application that serves as the central control or coordination point for managing various actions within the system. The platform management application analyzes the received user request and identifies the nature of the action requested. It parses and understands the details of the requested off-chain action, such as its purpose, parameters, and requirements. The system, through its logic or predefined mapping rules, identifies that the requested off-chain action has a corresponding action or operation that needs to be executed on the blockchain. This mapping could be based on predetermined correlations between off-chain and on-chain actions within the system's architecture or business logic.

The platform management application may validate the user request, ensuring it meets necessary criteria, security checks, and any required authorizations before proceeding further. Upon recognizing the corresponding blockchain action linked to the off-chain request, the system prepares the necessary data, parameters, or transaction details (e.g., other resources involved in the blockchain action) required to execute the corresponding action on the blockchain. For example, the system may receive a first user request to perform a first off-chain action determining that the first blockchain action corresponds to a second resource (e.g., a transaction from a first resource to a second resource).

Using appropriate mechanisms or interfaces (e.g., one or more self-executing programs, APIs, etc.), the platform management application triggers the execution of the determined blockchain action that aligns with the requested off-chain action. The prepared blockchain action is broadcast to the blockchain network, initiating the process of validating, processing, and confirming the action by network nodes or validators. Validators in the blockchain network process the transaction, execute the action according to the defined logic, and include the validated transaction in a block. Once confirmed and added to the blockchain, the action is considered completed on-chain. The platform management application updates the status of the user request, providing feedback or notifications to the user about the successful execution of the requested action, whether it is off-chain or on-chain.

System 100 (e.g., using a platform application) may facilitate the performance of an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network. They are conducted through secondary layers or channels and are settled or reconciled on-chain later. This helps in reducing congestion on the main chain and lowering transaction fees. Off-chain actions may also comprise off-chain computations. For example, complex computations or operations that are computationally expensive can be performed off-chain. For instance, in decentralized applications (DApps), certain computations or processes might be handled off-chain to improve performance and reduce latency, with only the final outcome or necessary data being recorded on the blockchain.

In some embodiments, off-chain actions may also comprise state channels and/or sidechains. For example, these are off-chain scaling solutions that enable parties to conduct transactions or execute smart contracts off the main chain. State channels allow participants to interact directly with each other off-chain, updating the state between them, while sidechains are separate blockchains that can be connected to the main blockchain, facilitating faster and more scalable transactions.

In some embodiments, off-chain actions may also comprise off-chain data storage. For example, storing large amounts of data directly on a blockchain can be inefficient and costly. Off-chain data storage solutions, such as decentralized storage networks (e.g., IPFS, Filecoin), enable the storage of data off-chain while maintaining references or proofs of the data's existence or integrity on the blockchain.

In some embodiments, an off-chain action (or result thereof) may refer to any data, information, or transactional details that are stored, processed, or maintained outside of the primary blockchain network. In blockchain technology, off-chain records exist separately from the main distributed ledger or blockchain itself. For example, an off-chain record may comprise a user bank account and/or other account linked to a user and/or other entity.

To facilitate the off-chain action, system 100 may use one or more on-chain actions related to network 110. Network 110 may comprise a blockchain. As described herein, a blockchain is a decentralized ledger of transactions built upon a combination of cryptography techniques (e.g., secret-keys, hash functions, etc.), consensus mechanisms (e.g., Proof of Work, Proof of Stake, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology have become a foundation of many decentralized applications.

For example, network 110 may comprise a digital log. A digital log may comprise a record or file that captures and stores a chronological sequence of events, actions, or transactions in a digital format. These logs serve various purposes across different domains, including information technology, cybersecurity, finance, and more. Digital logs may maintain a time-sequenced record of activities, events, or changes. Each entry in the log file typically includes a timestamp indicating when the event occurred. The digital log may contain specific details about the events or actions being logged. This information could include user activities, system events, errors, security-related events, transactions, or changes in configurations. Digital logs can be stored in various formats, including text files, structured databases, JSON, XML, or other formats that suit the specific requirements of the system or application generating the logs. The digital logs may be used for diagnosing issues, troubleshooting problems, monitoring system performance, conducting forensic analysis, and auditing activities. They serve as a historical record for understanding past actions or incidents.

In some embodiments, the digital log may comprise a distributed ledger (e.g., for a blockchain) and/or other index of blockchain data. For example, the distributed ledger may be a type of database or digital ledger that exists across multiple locations or nodes within a decentralized network. It records transactions, contracts, or any form of data in a secure, transparent, and tamper-evident manner without the need for a central authority or intermediary. Unlike traditional centralized ledgers, distributed ledgers are not controlled by a single entity. Instead, they are distributed among multiple participants or nodes in a network, each maintaining an identical copy of the ledger. This decentralization increases transparency and resiliency by eliminating a single point of control or failure. Distributed Ledgers use consensus mechanisms among network participants to validate and agree upon the state of the ledger. Consensus protocols ensure that all copies of the ledger across the network are in sync and agree on the validity of transactions, maintaining a consistent record of data. Once information is added to the ledger, it becomes virtually immutable, meaning it cannot be altered or deleted retroactively without consensus from the network. The use of cryptographic techniques ensures the security and integrity of the data stored on the ledger.

Network 110 may be used by system 100 to manage and/or facilitate one or more cryptographically secure digital assets (e.g., asset 108). A cryptographically secure digital asset may comprise a tokenization of a value or asset (e.g., a tokenized bank deposit). For example, a cryptographically secure digital asset refers to a digital representation of value, ownership, and/or rights that is secured by cryptographic techniques, ensuring its integrity, authenticity, and/or protection against unauthorized access or modification. These assets exist in digital form and rely on cryptographic protocols and technologies for their security and verification. For example, the asset's security may be based on cryptographic algorithms and techniques that provide strong encryption, hashing, digital signatures, and other cryptographic mechanisms to protect its data and transactions. The cryptographically secure digital assets may operate on blockchain networks. Blockchains use decentralized and distributed ledger technology, ensuring tamper-proof records of transactions and asset ownership. Transactions involving these assets are recorded on a blockchain, creating an immutable and transparent history of ownership and transactional history. Once recorded, data on the blockchain cannot be altered retroactively without consensus from the network. Cryptographically secure digital assets allow ownership and transfer of value or rights in a decentralized manner. Users can securely transfer ownership or conduct transactions directly without relying on intermediaries.

Users may access and manage these assets using cryptographic keys. Public and private keys allow users to securely interact with the assets, sign transactions, and prove ownership without revealing sensitive information.

Network 110 may be used to facilitate communications (e.g., blockchain actions) irrespective of whether a resource is online. For example, a resource in a network may be "online," whether it is a device, service, and/or application, when it is currently connected and available for communication and interaction within the network. In contrast, a resource may be offline when it is not online. For example, the term "online" signifies that the resource is active, operational, and accessible to other devices or users in the network. Being online implies that the resource is powered on, connected to the network infrastructure (such as the internet or a local network), and ready to send, receive, or process data, requests, or commands.

For example, a computer, server, printer, or any network-connected device is considered online when it is powered up, connected to the network (via Ethernet or Wi-Fi), and ready to send and receive data. In another example, applications, websites, or cloud-based services may be online when their servers are operational, connected to the internet, and available for users to access or utilize their functionalities. In yet another example, being online indicates that the resource is reachable and responsive to requests or communication attempts from other devices or users on the network. For example, in embodiments, in which the resource is a bank account, bank branch, etc., the resource may be online when the resource (or assets held by the resource) are reachable and responsive to requests or communication attempts from other devices or users on the network.

In some embodiments, system 100 may be used to manage resources across network 110. For example, system 100 may manage resources based on the availability of resources in network 110. In some embodiments, availability may comprise resource availability. Resource availability in a computer network may refer to the accessibility and readiness of various network resources, devices, services, or applications for use by authorized users or other components within the network. It signifies the ability of these resources to fulfill requests, process data, or perform tasks effectively and efficiently when required. For example, availability may correspond to device accessibility (e.g., the ability of devices (such as computers, servers, routers, switches, printers, etc.) to be reachable and responsive on the network), service uptime (e.g., time services remain operational and responsive to user requests), bandwidth and performance (e.g., resources promptly accessing and/or delivering data or services efficiently without delays or bottlenecks), data and information access (e.g., availability of data resources, databases, files, and information required by users or applications within the network).

In some embodiments, availability may correspond to liquidity. Liquidity refers to the ability of a bank or financial institution to meet its short-term obligations and fund its day-to-day operations efficiently. It represents the availability of liquid assets that can be quickly converted into cash to cover liabilities, withdrawals, or unexpected demands for funds. Banks maintain liquidity primarily through liquid assets such as cash, reserves held at central banks, short-term government securities, highly marketable securities, and other instruments that can be easily sold or converted into cash without significant loss of value. Banks may engage in asset-liability management to balance their assets and liabilities, ensuring that they have sufficient liquid assets to cover liabilities and maintain a healthy liquidity position.

In some embodiments, the system may determine one or more characteristics of availability in one or more resources. The system may then select a cryptographically secure digital asset, from a plurality of cryptographically secure digital assets, based on the characteristics. In some embodiments, the system may determine one or more characteristics of availability in one or more resources. The system may then select a cryptographically secure digital asset, from a plurality of cryptographically secure digital assets, based on the characteristics. For example, the system (or self-executing program) may determine a condition for performing the first blockchain action and select a first cryptographically secure digital asset, from a plurality of cryptographically secure digital assets, based on the condition. For example, the condition may indicate a requirement for a cryptographically secure digital asset as recorded in a predetermined digital log corresponding to the first resource. For example, the self-executing program condition may determine a requirement for a first cryptographically secure digital asset, as recorded in a predetermined digital log corresponding to a resource, involves encoding specific criteria or rules within the smart contract's code to validate the possession or existence of the digital asset before executing certain actions or operations. For example, developers encode conditions within the self-executing program's code using a programming language suitable for smart contracts (e.g., Solidity for Ethereum). These conditions define the rules or requirements that need to be met regarding the possession or existence of the cryptographically secure digital asset. The self-executing program may interact with a predetermined digital log or ledger that records information related to resources. The condition within the contract checks this log to verify the presence or ownership of the specific digital asset corresponding to the resource. The condition may specify requirements such as verifying the ownership of the digital asset through cryptographic keys, checking the asset's unique identifier or token ID, validating a specific transaction or event recorded in the digital log related to the asset, or confirming its existence in a specific state. When a user initiates an action or transaction involving the resource within the self-executing program, the condition is evaluated. If the condition verifies the possession or existence of the required cryptographically secure digital asset in the predetermined digital log, the self-executing program proceeds with the intended operation or execution.

As described herein, a characteristic of availability may comprise any attribute that distinguishes the availability (or availability of a resource) from other availability (or availability of another resource). In some embodiments, characteristics of availability of resources within a computer network may refer to attributes or factors that define the accessibility, reliability, and continuity of these resources. For example, a characteristic may refer to uptime and reliability as availability is associated with the ability of resources to remain operational and accessible over time without unexpected interruptions. High availability implies minimal downtime and consistent reliability.

In another example, a characteristic may refer to accessibility. Available resources should be easily accessible and reachable by users or systems when needed. This includes factors such as network connectivity, response time, and the absence of barriers preventing access. In another example, a characteristic may refer to redundancy and fault tolerance. Systems designed with redundancy have backup mechanisms or duplicate resources to ensure continuous operation even if one component fails. Fault-tolerant systems can detect and recover from failures without significant impact on availability. In another example, a characteristic may refer to resilience against failures. Availability may be linked to a system's resilience against failures caused by hardware malfunctions, software errors, network issues, or other disruptions. Systems designed for high availability can withstand failures and maintain functionality. In another example, a characteristic may refer to scalability and capacity planning. Availability considerations involve the ability to scale resources to meet increasing demand without compromising performance or accessibility. Proper capacity planning ensures resources are available as needed. In another example, a characteristic may refer to monitoring and maintenance. Continuous monitoring, proactive maintenance, and timely interventions play a crucial role in ensuring resource availability. Monitoring tools help detect issues early, allowing for prompt resolution and minimizing downtime. In another example, a characteristic may refer to recovery and disaster preparedness. Availability includes having recovery strategies and disaster preparedness plans in place. These plans help restore services quickly after unexpected events, such as natural disasters or cyber-attacks. In another example, a characteristic may refer to service level agreements (SLAs) characteristics. Defining and adhering to SLAs regarding availability metrics, such as uptime percentage, response time, and maintenance windows, is essential in ensuring commitments to users or customers.

In another example, a characteristic may refer to geographical distribution and load balancing. Distribution of resources across multiple geographical locations and load balancing techniques contribute to availability by ensuring even distribution of workload and minimizing the impact of localized disruptions. In another example, a characteristic may refer to security measures. Availability is linked to security practices that protect resources from unauthorized access, cyber threats, or malicious attacks. Security measures prevent service disruptions caused by security breaches. In another example, a characteristic may refer to documentation and recovery procedures. Maintaining comprehensive documentation and well-defined recovery procedures helps restore services efficiently in case of outages or failures, minimizing the impact on availability.

In some embodiments, a characteristic of availability may refer to a characteristic of a good, service, and/or medium of exchange (e.g., money). The characteristics of currency, which is issued by governments and central banks. For example, a characteristic may refer to an issuing authority (e.g., a recognized government or central monetary authority within a country), legal tender (e.g., whether it is authorized by the government for settling debts, transactions, and payments within the country's borders), denomination and/or amount, physical form (e.g., banknotes and coins), type (e.g., fiat, commodity-backed), security features, exchange rate, stability, regulation, etc.

Selecting a cryptographically secure digital asset from a plurality of such assets based on characteristics involves a process that considers various attributes or features associated with these assets. The system may identify the specific characteristics or attributes that are essential for the system's purpose or requirements. These criteria could include factors such as security features, transaction speed, scalability, decentralization, consensus mechanism, token standard (e.g., ERC-20, ERC-721), utility, or network adoption. The system may obtain information and data about the plurality of cryptographically secure digital assets under consideration. This information may include technical specifications, whitepapers, historical performance, market data, developer community, security audits, and use case relevance. The system may evaluate and compare the characteristics of each digital asset against the predefined selection criteria. The system may assess how well each asset aligns with the system's requirements, considering factors like security, functionality, transaction costs, liquidity, governance, or regulatory compliance. The system may apply a weighted scoring system or ranking mechanism to assign importance or priority to different characteristics based on their relevance to the system's goals. For example, security might have higher weightage compared to transaction speed. The system may conduct both quantitative analysis (e.g., metrics, performance data) and qualitative analysis (e.g., community support, development activity) to comprehensively assess the assets' characteristics. In some embodiments, the system may employ decision models or algorithms that factor in the weighted criteria and analysis to generate a scoring system or rank the assets based on their suitability for the system's requirements.

Figure 1B:
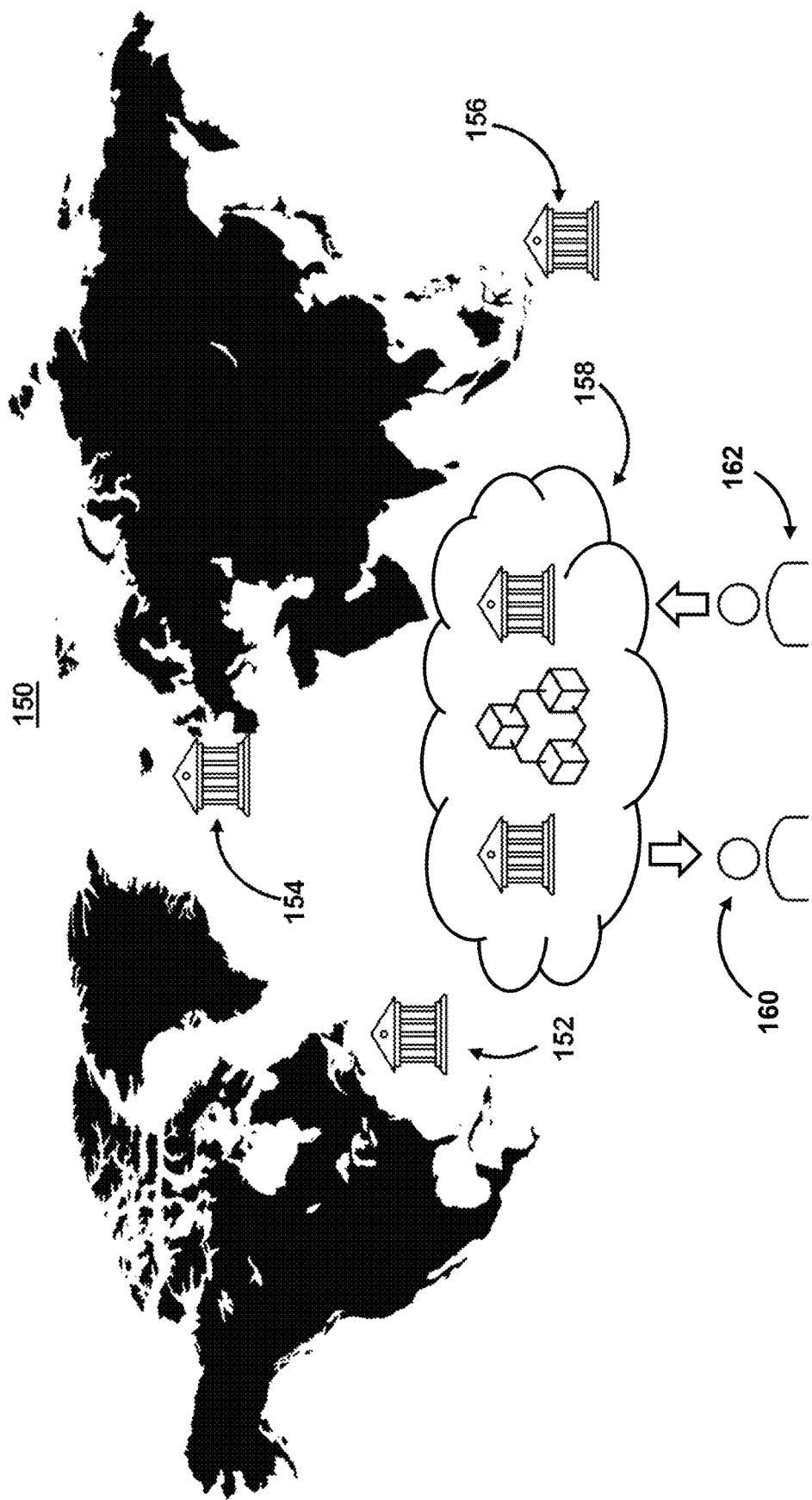
FIG. 1B shows an illustrative diagram for managing resources across global or cloud networks, in accordance with one or more embodiments.

FIG. 1B shows an illustrative diagram for managing resources across global or cloud networks, in accordance with one or more embodiments. For example, as shown in FIG. 1B, system 150 may manage resources across global or cloud networks while mitigating issues related to providing services while resources are offline. System 150 may use the architecture described in FIG. 1A (e.g., system 100) to manage these resources. For example, system 150 may reflect that application of system 100 (FIG. 1A) to the exchange of money, assets, and/or financial instruments between parties located in different countries or jurisdictions. These transactions involve the movement of funds or financial instruments across international borders and are conducted through various channels within the global financial system. International transactions can be complicated by the closure of local bank branches due regulatory issues related to conducting transactions after hours (e.g., when a bank branch is offline). This could delay the processing of transactions or create difficulties in meeting regulatory requirements. System 150 (e.g., via system 100 (FIG. 1A)) may overcome these difficulties using a series of networks.

For example, system 150 may illustrate a transaction occurring from a bank branch (or account) located in jurisdiction 152 and jurisdiction 156, which may also involve jurisdiction 154. In particular, system 150 may illustrate how the availability of liquidity is used to conduct international transactions. For example, banks use liquidity as a crucial factor in facilitating international transactions. Liquidity, in the context of banking, refers to the availability of funds or assets that a bank holds to meet its financial obligations, including processing transactions. Banks use their liquidity to provide funding for international transactions, including trade finance, cross-border payments, letters of credit, and other financial services required by businesses or individuals engaged in global trade. Banks use liquidity to settle cross-border payments on behalf of their customers. Adequate liquidity enables banks to convert and transfer currencies, ensuring timely and smooth international payments between parties in different countries.

For example, the system may determine, using one or more self-executing programs, a first actual availability (e.g., liquidity) for a first resource (e.g., a first user account and/or bank branch) in a first computer network (e.g., financial services network), wherein the first resource is currently online (e.g., the branch is currently open), and wherein the first actual availability is represented by a first cryptographically secure digital asset in a digital log (e.g., digital log 158).

In some embodiments, the system may determine a synthetic liquidity for a resource that is offline. Synthetic availability (e.g., liquidity) may refer to availability (e.g., liquidity) that is artificially created or enhanced through instruments, strategies, mechanisms, and/or the use of tokenized digital assets. For example, rather than relying solely on traditional liquid assets or actually determined availability, the system may use synthetic availability as a placeholder.

The system may determine, using the one or more self-executing programs, a first synthetic availability (e.g., liquidity) for a second resource (e.g., a second user account and/or bank branch) in the first computer network, wherein the second resource is currently offline (e.g., the bank branch is closed), and wherein the first synthetic availability is represented by a second cryptographically secure digital asset in the digital log.

The system may determine a first aggregate availability (e.g., a global liquidity for the financial services firm) in the digital log for the first computer network based on the first cryptographically secure digital asset and the second cryptographically secure digital asset. The aggregate availability of resources in a computer network may refer to the collective or overall availability of various resources, devices, services, or applications within the network. It represents the combined availability status of multiple individual resources, considering their availability, readiness, and operational status as a whole. To determine the aggregate availability, the system may consider the availability of all network resources as a whole, including devices (such as servers, routers, switches, etc.), services (such as web servers, databases, email servers), applications, and other critical components within the network. Aggregate availability may provide a comprehensive view of the network's health by assessing the combined readiness and accessibility of multiple resources. It may take into account the interdependencies among various resources and their impact on the network's overall functionality.

In some embodiments, the aggregate availability may correspond to aggregate liquidity. Aggregate liquidity may refer to the overall or combined level of liquidity available to meet a bank or other entity's funding needs and obligations across its various assets, liabilities, and off-balance-sheet exposures. It represents the collective liquidity position of the entity, considering all its sources of liquidity and the ability to withstand liquidity stress or funding challenges. It considers the total availability of liquid assets, funding sources, and contingent funding facilities that the bank can access to meet its short-term and long-term liquidity requirements.

The system may receive a first request (e.g., a request from a platform application to facilitate an action from payer 160 to beneficiary 162) to perform a first blockchain action, wherein the first blockchain action requests access to the second resource. A request (e.g., a computer request) may refer to a communication or a query made by a computer or a software application to another computer, server, and/or device on a network. This request is typically initiated by a client computer seeking specific information, data, resources, or services from a server or another computing device. Computer requests can take various forms depending on the nature of the interaction and the protocols used. For example, in web-based applications, computers often make HTTP (Hypertext Transfer Protocol) requests to web servers. These requests are sent when a user accesses a website, submits a form, or requests data from an API (Application Programming Interface). In another example, computers within a network communicate by sending requests and receiving responses. This could include file transfer requests, database queries, or any form of data exchange between devices on the network. Software applications often interact with external services or APIs to fetch or send data. API requests are made by the client application to the server hosting the API, specifying the desired action or information needed. In distributed computing environments, Remote Procedure Calls (RPCs) are requests made by one program to execute a procedure or function on another remote system, and then receiving the result. When a computer needs to resolve a domain name into an IP address, it sends a Domain Name System (DNS) request to a DNS server, asking for the IP address associated with a specific domain name.

The system may process the first blockchain action using the first aggregate availability. The system may process the first blockchain action using the first aggregate availability. For example, the system may use a privately permissioned blockchain network to enable real-time settlement between bank branches irrespective of whether branches are online. The system may process the blockchain action using the aggregate availability (or liquidity). For example, the system may process a blockchain action using aggregate liquidity, involving leveraging the available liquidity resources within a blockchain network to facilitate transactions, ensuring sufficient funds to fulfill obligations, and managing liquidity requirements effectively. For example, the system may aggregate liquidity within a blockchain network by combining availability of liquid assets, tokens, or cryptocurrencies held by participants, decentralized finance (DeFi) protocols, liquidity pools, and/or self-executing programs within the blockchain ecosystem. When a user initiates a transaction on the blockchain network (such as transferring tokens or executing a smart contract), the system assesses the liquidity requirements for that action. The system checks the aggregate liquidity available within the network. It may involve querying decentralized exchanges (DEXs), liquidity pools, or smart contracts to determine the availability of required tokens or assets. In some embodiments, liquidity may be pooled into account pools, device (or regional) pools, and/or decentralized liquidity pools. The system may then utilize these pools to source tokens or assets required for the transaction, ensuring sufficient liquidity to execute the action despite one or more resources being on- or offline.

The system may determine a second aggregate availability for the first computer network following the first blockchain action. In some embodiments, the system may balance the digital log (or other ledger) to reflect the actual availability (or liquidity) of a resource. For example, balancing a ledger of resource availability after using availability for a resource to conduct an action for another resource involves maintaining accurate records of resource availability transactions to ensure that the ledger reflects the changes made due to these actions. This process can be applied in various contexts, including accounting, resource management, or transactional systems within a computer network.

For example, the ledger may start with a record of the initial availability of resources (e.g., whether recorded as actual or synthetic availability). This could include details such as quantities, types, or states of available resources within the system or network. When a resource is used to conduct an action for another resource or entity, the system records this transaction in the ledger. It deducts or adjusts the availability of the utilized resource accordingly. The action is executed or performed using the utilized resource, fulfilling the intended purpose or transaction. This could involve processes like transferring resources, completing a task, providing a service, or facilitating a transaction. The system updates the ledger to reflect the utilization of the resource for the conducted action. It records the details of the transaction, including the specific resource utilized, the action conducted, quantities involved, timestamps, and any relevant metadata. After the action is completed and the ledger is updated, the system ensures that the total availability of resources is accurately reflected in the ledger. It reconciles the ledger entries to confirm that the total resources available match the sum of initial availability minus the utilized resources for conducted actions. The system verifies the ledger entries to ensure accuracy and consistency. It reconciles any discrepancies, verifies the integrity of the recorded transactions, and performs audits if necessary to confirm the correctness of resource availability records. The system continuously maintains and updates the ledger as resource transactions occur. It monitors resource utilization, updates availability records for each action, and ensures that the ledger accurately represents the current availability of resources within the system or network.

The system may determine, using the one or more self-executing programs, a second synthetic availability for the second resource following the first blockchain action. The system may determine that the second resource is now online. The system may then replace, using the one or more self-executing programs, the second synthetic availability with second actual availability in the digital log. For example, replacing synthetic availability represented by digital assets with actual availability represented by detected availability in a digital log involves transitioning from a theoretical or assumed state of availability (synthetic availability) to the real-time, observed, or measured state of availability (actual availability) of resources or assets within a system. To do so, the system may establish metrics and parameters that determine synthetic availability based on digital assets or assumptions. For instance, synthetic availability might be calculated based on planned uptime, theoretical performance, or assumed availability of resources. The system may deploy monitoring systems, sensors, or tools within the network infrastructure to continuously observe and detect the actual availability of resources. These monitoring systems can track various aspects such as device uptime, response times, network connectivity, service status, etc. The system may continuously collect real-time data and performance metrics from the monitoring systems. This data provides insights into the actual operational status and availability of resources within the network. The system may compare the synthetic availability, which is derived from digital assets or assumptions, with the actual availability detected and recorded by the monitoring systems. The system may identify discrepancies or differences between the two states (e.g., as resource go on and offline). The system may replace or update entries in the digital log that represent synthetic availability with the actual availability detected by the monitoring systems. The system may record the observed availability, downtime, incidents, or performance metrics accurately in the log entries. The system may implement automated reporting or alerting mechanisms that trigger notifications or reports whenever the detected availability deviates significantly from the synthetic availability or predefined thresholds.

Figure 1C:
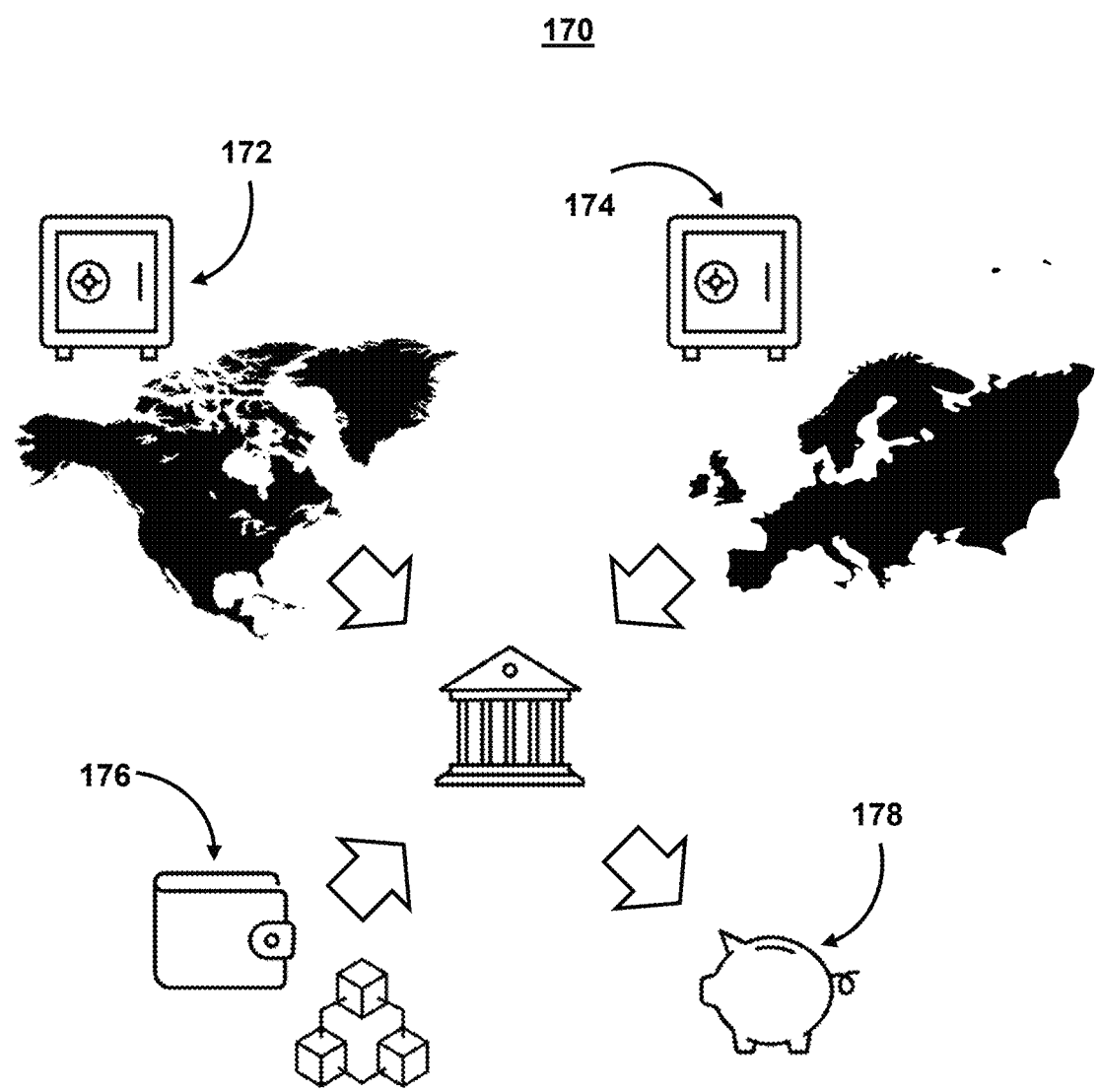
FIG. 1C shows an illustrative diagram for on-demand resource pooling, in accordance with one or more embodiments.

FIG. 1C shows an illustrative diagram for on-demand resource pooling, in accordance with one or more embodiments. For example, system 170 may show a system for pooling a plurality of resources across computer networks. The system for pooling a plurality of resources across computer networks may function by dynamically identifying, aggregating, and reallocating resources—such as funds, digital assets, or data-based on a variety of trigger mechanisms and identifiers. The system may continuously monitor resources distributed across different accounts, institutions, or platforms, using a combination of real-time data feeds, transactional logs, and historical analytics. Pooling actions may be initiated based on several types of triggers: (1) client-specific triggers, such as a user's bank account balances, pending transactions, or liquidity thresholds, which reflect individual financial conditions or goals; (2) market-specific triggers, including fluctuations in trading volume, shifts in currency exchange rates, or new government regulations, which signal external conditions that may warrant aggregation; (3) predetermined triggers, such as scheduled events (e.g., weekly or monthly collection cycles) or reaching a minimum volume in one or more accounts; and (4) AI-based triggers, derived from predictive models trained on past user behavior and market activity, allowing the system to anticipate optimal pooling opportunities. To ensure traceability and accuracy, the system may utilize pool-specific identifiers that track the origin, destination, and purpose of each fund, and may attach metadata such as account IDs, transaction tags, or non-fungible tokens (NFTs) to each resource unit. These identifiers enable precise attribution of pooled assets and facilitate transparent auditing and reporting. Through this multi-trigger, identifier-based framework, the system provides intelligent, responsive pooling of resources that aligns with both user-specific needs and broader market dynamics.

For example, system 170 can pool resources, such as user funds, across a computer network like a banking network by enabling the collection and aggregation of availability from multiple distributed sources. For example, the system (e.g., system 170) may allow a client to access and collect their funds from various resource pools, such as resource 172, resource 174, and resource 176, which could represent different accounts, institutions, or financial instruments. The system identifies the availability across these resources— whether actual funds currently accessible or synthetic availability that temporarily represents those funds—and aggregates them into a unified total. This aggregated availability can then be transferred or represented within a single resource, such as resource 178, which may function as a centralized user account or transaction point. By doing so, the system simplifies fund management for the user, enhances transactional efficiency, and ensures that distributed resources can be effectively leveraged as a cohesive financial entity. This approach also enables faster processing, better coordination across banking systems, and more reliable fulfillment of user requests by treating dispersed funds as a singular, consolidated resource.

System 170 may determine a first actual availability (e.g., first user funds) for a first resource (e.g., resource 172) in a first computer network for a first user, wherein the first resource corresponds to a first geographic location (e.g., a first country, banking account, account location, etc.).

As described herein, an actual availability may refer to the real, tangible resources—such as user funds—that are currently accessible and ready for use within a given system or network. For example, system 170 may determine a first actual availability, such as the amount of funds currently available to a user, within a first resource like resource 172. This resource exists within a first computer network and corresponds to a specific context, such as a banking account located in a particular geographic area (e.g., a first country or account location). Actual availability reflects verified, confirmed resources that the system can immediately allocate or use for transactions, without requiring further validation or aggregation. By identifying actual availability, the system can reliably account for what is truly accessible at any given moment, ensuring that operations are based on accurate and current data from specific resources distributed across various networks or locations.

As described herein, a resource, in the context of a computer network such as system 170, may refer to a specific entity or component that holds or manages availability—such as user funds—that can be accessed, utilized, or allocated by the system. For example, system 170 may determine a first actual availability, such as the amount of funds a user has, within a first resource like resource 172. This resource operates within a first computer network and corresponds to a particular geographic location, such as a country, a specific banking account in a geographic location, or an account tied to a regional branch. Essentially, a resource represents a defined point of access or control within the broader network where availability is tracked and managed. It can take various forms depending on the system's structure, including accounts, servers, databases, or service endpoints, and is typically associated with a user, location, or organizational unit. Resources serve as the foundational elements from which the system aggregates, allocates, or redistributes availability to meet operational or user-specific needs.

As described herein, a geographic location, in the context of system 170, may refer to a physical or regionally defined area that is associated with a particular resource within a computer network. For example, system 170 may determine a first actual availability, such as first user funds, for a first resource (e.g., resource 172) in a first computer network for a first user, where that resource is tied to a specific geographic location. This location could represent a country, a region, a specific banking institution, or a particular account location, such as a branch or data center tied to a physical place. Geographic location helps the system contextualize and organize resources based on where they are managed, regulated, or accessed, which can be important for compliance, latency optimization, or localization of services. It essentially provides a spatial dimension to resource management, allowing the system to differentiate between and operate within multiple jurisdictions or service zones across a distributed network.

Additionally or alternatively, system 170 may determine a second actual availability for a second resource in the first computer network for the first user, wherein the second resource corresponds to a second geographic location. For example, different availabilities, resources, and geographic locations may represent distinct segments of a user's overall access to services or assets within a distributed system. For example, system 170 may determine a second actual availability for a second resource within the same computer network for the first user, where that second resource corresponds to a second geographic location. This means the user's assets or services are spread across multiple physical or organizational boundaries—such as different countries, banking institutions, account types, or regional data centers. Each availability reflects the amount of usable or accessible value at a given moment, each resource represents a discrete point of control or storage for that value, and each geographic location adds a contextual layer, such as legal jurisdiction, time zone, or local infrastructure. Together, these elements allow the system to manage complex, decentralized environments where user data or funds are distributed but still need to be accessed, aggregated, or coordinated as a unified whole.

System 170 may determine a first synthetic availability, wherein the first synthetic availability is represented by a first cryptographically secure digital asset of the first user in a digital log (e.g., resource 176). For example, synthetic availability may refer to a virtual or abstract representation of actual availability—such as funds or resources—that can be used by a system to facilitate faster, more flexible management of those resources. For example, system 170 may determine a first synthetic availability, which is represented by a first cryptographically secure digital asset belonging to the first user and recorded in a digital log, such as resource 176. This synthetic availability acts as a placeholder or proxy for actual availability, allowing the system to reference, allocate, or move value within the network without needing to immediately interact with or verify the underlying physical or financial resources. Because it is cryptographically secure, synthetic availability can be trusted for transactional purposes while still being subject to validation or settlement against actual resources at a later stage. This approach helps improve system responsiveness, reduces coordination delays, and enables more seamless operations across distributed networks by bridging the gap between real-time demand and resource consolidation.

System 170 may determine, in response to a predetermined aggregation event, a first aggregate availability for the first user based on the first actual availability, the second actual availability, and the first synthetic availability.

As described herein, an aggregation event may refer to a trigger or condition that prompts a system to combine multiple types of availability—such as actual and synthetic—across various resources and locations into a single, unified value. For example, system 170 may determine, in response to a predetermined aggregation event, a first aggregate availability for the first user based on the first actual availability, the second actual availability, and the first synthetic availability. This aggregation event could be initiated by a user request, a scheduled reconciliation process, a system-detected need for consolidation, or a threshold-based condition such as a transaction amount or resource utilization level. The purpose of the aggregation event is to streamline access to distributed resources by calculating a comprehensive, up-to-date representation of the user's total availability. By doing so, the system enables more efficient decision-making, ensures sufficient capacity for service delivery, and simplifies interactions with otherwise fragmented data sources across networks and geographic regions.

System 170 may determine, using a first self-executing program, a second synthetic availability based on the first aggregate availability, wherein the second synthetic availability is represented by a second cryptographically secure digital asset in the digital log. The system may then process a first blockchain action based on the second synthetic availability. As one example, the system may use synthetic availability to manage aggregated resources by creating a secure digital representation of the total availability that can be used for efficient processing and execution within the network. For example, system 170 may determine, using a first self-executing program such as a smart contract, a second synthetic availability based on the first aggregate availability. This second synthetic availability is represented by a second cryptographically secure digital asset recorded in a digital log, allowing the system to manage the aggregated resources as a single, unified unit. By converting the aggregate availability into a synthetic form, the system enables rapid, verifiable operations without needing to interact directly with the individual underlying resources each time. The system may then process a first blockchain action—such as a transfer, validation, or allocation—based on the second synthetic availability. This approach leverages the speed, transparency, and automation of blockchain technology to efficiently manage distributed assets, ensure trust through cryptographic security, and streamline complex resource operations across multiple networks and locations.

The system may then aggregate the detected availability and balance the resources that were aggregated. For example, in response to processing the first blockchain action, the system may populate a third resource (e.g., resource 178) in the first computer network for the first user with a third actual availability corresponding to the second synthetic availability. Additionally or alternatively, the system may modify, using a second self-executing program, the second synthetic availability as recorded in the digital log. The system may modify the first actual availability for the first resource (e.g., deducting funds from the account represented by the resource), modify the second actual availability for the second resource (e.g., deducting funds from the account represented by the resource), and/or modify, using a third self-executing program, the first synthetic availability as recorded in the digital log (e.g., deducting funds from the account represented by the resource).

For example, the system may aggregate detected availability and balance the resources involved by coordinating both actual and synthetic values across multiple resources. For example, in response to processing the first blockchain action, the system may populate a third resource—such as resource 178—in the first computer network with a third actual availability for the first user. This third actual availability corresponds to the value represented by the second synthetic availability, effectively converting the synthetic representation into a tangible, usable form within a centralized account or service point. Additionally or alternatively, the system may use a second self-executing program, such as another smart contract, to modify the second synthetic availability as recorded in the digital log to reflect the completed action. To balance the aggregation, the system may also update the contributing resources by modifying the first actual availability for the first resource—such as deducting funds from a user account—modifying the second actual availability for the second resource in a similar manner, and adjusting the first synthetic availability using a third self-executing program. These operations ensure that all components involved in the aggregation event are reconciled, keeping the system's state consistent and accurate across both physical and digital representations of availability. This approach provides a seamless way to manage complex resource distributions while maintaining real-time integrity and trust in the system's operations.

Figure 1D:
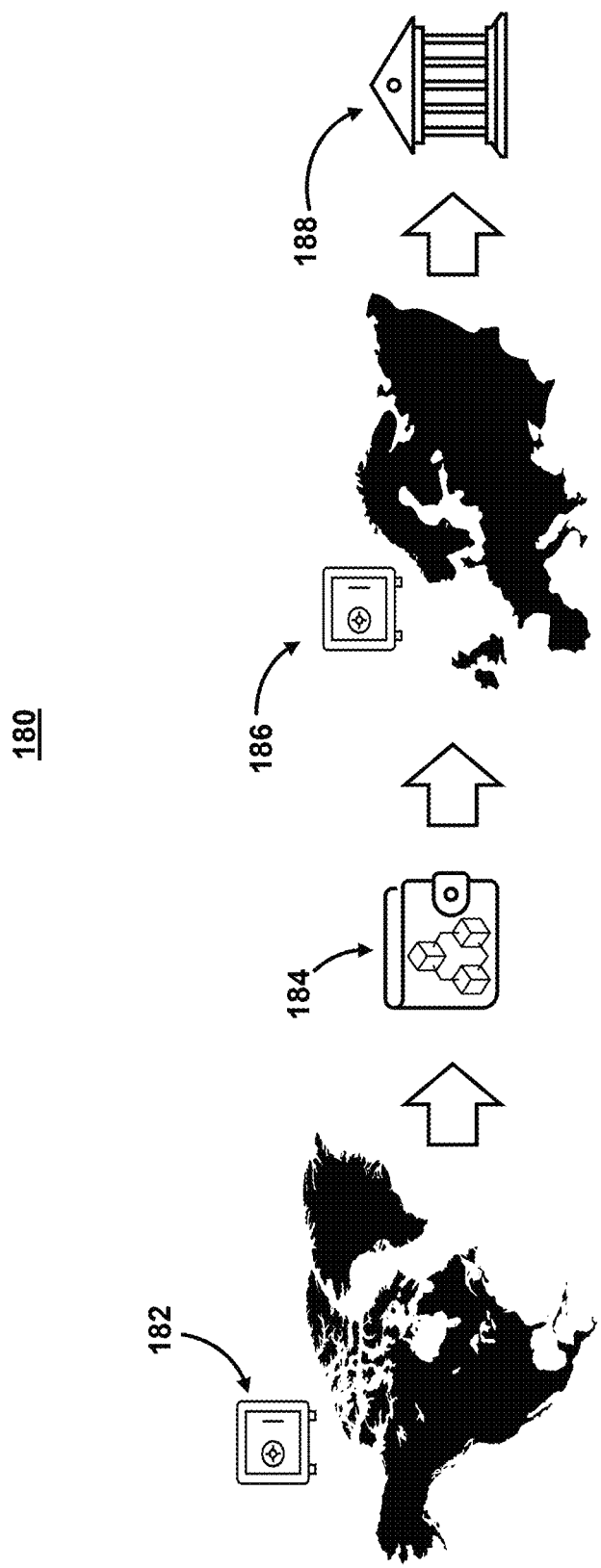
FIG. 1D shows an illustrative diagram for on-demand resource transfers, in accordance with one or more embodiments.

FIG. 1D shows an illustrative diagram for on-demand resource transfers, in accordance with one or more embodiments. For example, system 180 may show a system for dynamic management of a plurality of resources across computer networks using synthetic availabilities. For example, system 180 shows an on-demand transfer (e.g., or resource availability such as computing resources, user funds, etc.) from resource 182 to resource 186 using synthetic availability 184 in order to fund resource 188. For example, system 180 may allow a user to access their available/synthetic liquidity in real-time (e.g., to settle a transaction). In such cases, the system may receive a triggering event that then moves the funds to a third party using available/synthetic liquidity.

System 180 may facilitate an on-demand transfer of resources—such as computing capacity, user funds, or other digital assets—from resource 182 to resource 186 by leveraging synthetic availability 184 in order to fund resource 188. This process enables real-time access to liquidity or resource capacity that may be distributed or fragmented across multiple systems. Synthetic availability 184 serves as an abstracted, cryptographically secured representation of the actual availability in resource 182, allowing the system to act on that availability without requiring immediate physical consolidation. When a triggering event occurs—such as a user-initiated transaction, a system request for additional capacity, or a time-based threshold—the system processes the synthetic availability and initiates a transfer protocol. This protocol authorizes the movement or allocation of a corresponding amount of value or resource from resource 182 to resource 186, which acts as a staging or intermediary resource. From there, system 180 completes the transfer by funding resource 188, which may be a third-party account, service endpoint, or designated destination. By abstracting and mobilizing resources through synthetic availability, the system enables users to access their liquidity or capacity instantly, even when the underlying assets are distributed, thereby supporting real-time settlement, allocation, or provisioning. This approach enhances speed, flexibility, and scalability in environments where traditional transfer mechanisms would be too slow or fragmented.

For example, system 180 may receive a first request to generate availability at a first resource based on potential availability at a second resource, wherein the first resource corresponds to a first user account in a first geographic location, and wherein the second resource corresponds to a second user account in a second geographic location. For example, a system, such as system 180, may receive a first request to generate availability at a first resource (e.g., resource 186) based on potential availability at a second resource (e.g., resource 182), wherein the first resource corresponds to a first user account in a first geographic location (e.g., the United States), and the second resource corresponds to a second user account in a second geographic location (e.g., Europe), used to fund or pay a second user at resource 188. This request may be initiated by a user, an automated process, or a third-party application seeking to facilitate a cross-border transfer or payment in real-time. Upon receiving the request, the system evaluates the potential availability at the second resource—such as a pending balance, a cryptocurrency holding, or a foreign bank account—and determines whether sufficient value exists to support the creation of synthetic or temporary availability at the first resource. If validated, the system may generate synthetic availability or a credit-backed representation at the first resource (resource 186), allowing the first user to complete a transaction or fund the second user at resource 188 without waiting for the full cross-border settlement. This mechanism enables efficient real-time funding by bridging geographic and institutional boundaries and ensures that liquidity or asset value in one region can be reflected and acted upon in another through the use of secure synthetic representations and predictive risk models.

In response to the first request, the system may determine, based on the second user account, a first actual availability for the second resource. For example, a system may determine, based on the second user account, a first actual availability for the second resource (e.g., resource 182) used to fund or pay a second user at resource 188 by evaluating the current and accessible value held within the second user account and mapping it to the operational status of the second resource. The system begins by identifying the second user account, which may be associated with a financial institution, digital wallet, or resource pool, and retrieving relevant data such as balance information, transaction history, and any pending authorizations or holds. It then assesses the specific configuration of resource 186, which acts as an intermediary funding or staging point within the network, to determine whether and how the second user account's value can be reflected as actual availability at that resource. This may involve confirming currency compatibility, regional compliance requirements, settlement latency, or the status of linked synthetic availability. Once these parameters are validated, the system quantifies the amount from the second user account that is currently usable or transferrable and designates it as the first actual availability for resource 186. This value is then made available to fund or settle obligations to the second user at resource 188, ensuring that the transaction is supported by verifiable and accessible value originating from the second user account.

The system may determine, using a first self-executing program, a first synthetic availability for the second resource based on the first actual availability, wherein the first synthetic availability is represented by a first cryptographically secure digital asset in a digital log. For example, the system may determine, using a first self-executing program, a first synthetic availability (e.g., synthetic availability 184) for the second resource (e.g., resource 186) based on the first actual availability, wherein the first synthetic availability is represented by a first cryptographically secure digital asset in a digital log. The self-executing program—such as a smart contract deployed on a blockchain or distributed ledger—automatically initiates upon detection or receipt of the first actual availability, which may represent verifiable funds, credits, or resources currently accessible at or through a linked account. The program then calculates a corresponding synthetic availability by converting the actual availability into a digital representation that reflects its value, scope, or access rights. This synthetic availability is encoded as a cryptographically secure digital asset, embedding key attributes such as the asset amount, origin, timestamp, and ownership details, and is logged immutably into a digital ledger. This ensures the synthetic availability can be transparently audited, transferred, or acted upon within a secure and decentralized system. By encapsulating the first actual availability in this way, the system enables real-time portability and interoperability of resources—allowing the synthetic availability to be used for funding, settlement, or access control—without immediately moving or altering the underlying assets, thereby improving efficiency, speed, and trust in resource-based transactions.

The system may determine whether to authorize the first request. For example, system 180 may determine whether to authorize the first request by evaluating a combination of party/transaction-based criteria, system-determined criteria, and replenishment or cool-down criteria to ensure compliance, feasibility, and operational stability. First, party and transaction-based criteria may include Know Your Customer (KYC) factors such as known user identifiers, geographic markers, or whitelist status to validate the identity and eligibility of the requester, along with Know Your Transaction (KYT) considerations like transaction volume, frequency, pre-validation checks, and alignment with regulatory or compliance frameworks. Additionally, AI-based models may analyze historical behaviors and contextual data to predict the legitimacy or risk level of the transaction before authorizing it. Second, system-determined criteria may be applied to assess the overall capacity to fulfill the request, including the ratio of actual to synthetic funds needed, the availability of synthetic liquidity across individual users, pools, or the entire network, and the complexity of the transaction—such as the number of intermediaries, exchanges, or jurisdictions involved (e.g., within a Yoda system architecture). Finally, replenishment or cool-down criteria may be used to manage system integrity and prevent overextension, incorporating enforced delays between transactions, especially in cases of high-frequency activity or constrained liquidity, and supporting gradual replenishment of synthetic availability over time. Through this multi-dimensional evaluation, system 180 ensures that each request is authorized only when it aligns with risk tolerance, regulatory requirements, system limits, and resource availability.

In response to determining whether to authorize the first request, the system may process a first blockchain action to transfer the first synthetic availability from the second resource to a second synthetic availability for the first resource in the digital log. For example, system 180 may process a first blockchain action to transfer the first synthetic availability (e.g., synthetic availability 184) from the second resource (e.g., resource 186) to a second synthetic availability for the first resource by executing a secure, verifiable transaction recorded in the digital log. Upon initiation of the blockchain action—either through a user request, system trigger, or self-executing contract—system 180 first validates the current state and ownership of the first synthetic availability associated with resource 186. This includes confirming that the digital asset representing the synthetic availability is active, unencumbered, and properly linked to the second resource. Once validated, the system generates a blockchain transaction that initiates the transfer of value from the first synthetic availability to a new or updated synthetic representation for the first resource. This second synthetic availability reflects the transferred value, now associated with the first resource, and is encoded as a separate cryptographically secure digital asset. The system then immutably records this transfer in the digital log, updating both the originating and receiving entries to reflect the change in synthetic availability. This process ensures transparent, secure, and traceable movement of resource representations across networked systems, allowing synthetic liquidity to follow authorized paths of execution without requiring real-time settlement of the underlying actual resources.

The system may determine, using a second self-executing program, a second actual availability for the first resource based on the second synthetic availability. For example, the system may determine, using a second self-executing program, a second actual availability for the first resource based on the second synthetic availability by autonomously validating and converting the synthetic representation into a real, usable allocation within the network. Once the second synthetic availability is recorded in the digital log—indicating a verified transfer or issuance of synthetic value to the first resource—the second self-executing program, such as a smart contract, is triggered to assess the legitimacy and completeness of the transaction. This program may reference predefined rules, such as user entitlements, system thresholds, and external validation data (e.g., oracle feeds or compliance checks), to determine whether the synthetic availability can be converted into actual availability. If all conditions are met, the self-executing program facilitates the update of the system state by issuing or crediting the first resource with a corresponding second actual availability. This may involve allocating funds, computing power, or access rights within the resource environment to reflect the value represented by the synthetic asset. By automating this process through secure and tamper-proof execution, the system ensures that synthetic liquidity is reliably translated into actionable availability, enabling seamless user interactions and real-time resource provisioning.

The system may record the second actual availability at the second resource. The system may record the second actual availability at the second resource by updating the internal state of the second resource to reflect the newly available value, thereby making it accessible for subsequent operations such as transaction settlement or resource allocation. Upon confirmation that the second actual availability has been determined—typically following the conversion of synthetic availability through a self-executing program—the system writes this value to a secure, persistent storage layer associated with the second resource. This may involve updating a ledger entry, account balance, token allocation, or resource quota within the resource's control system or database. The recorded second actual availability serves as a verified indicator that the resource is now capable of being used in a real-world context, such as funding a user transaction, provisioning computational tasks, or authorizing access to services. For example, if the second actual availability represents funds or credits, the system may immediately apply it to settle an outstanding payment or fulfill a smart contract obligation. By formally recording the second actual availability, the system ensures data integrity, auditability, and real-time responsiveness, enabling the resource to participate confidently and transparently in network operations and financial activities.

Figure 2:
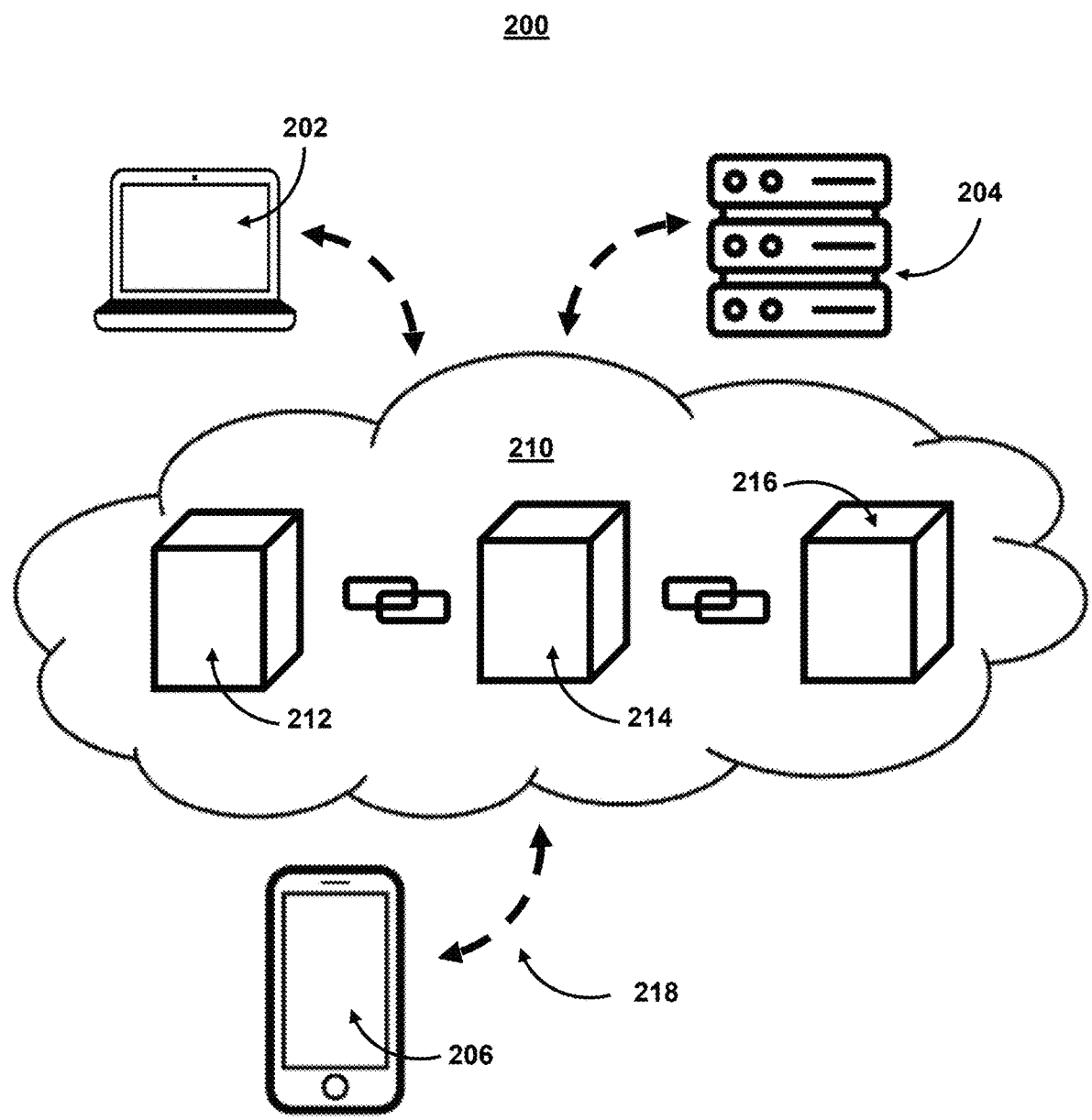
FIG. 2 shows an illustrative diagram of a blockchain network, in accordance with one or more embodiments.

FIG. 2 shows an illustrative diagram of a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 210.

As referred to herein, blockchain 210 may comprise a type of distributed ledger technology that consists of growing list of records, called blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214, but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. In some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to managing resources across global or cloud networks using a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes network 218, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3A:
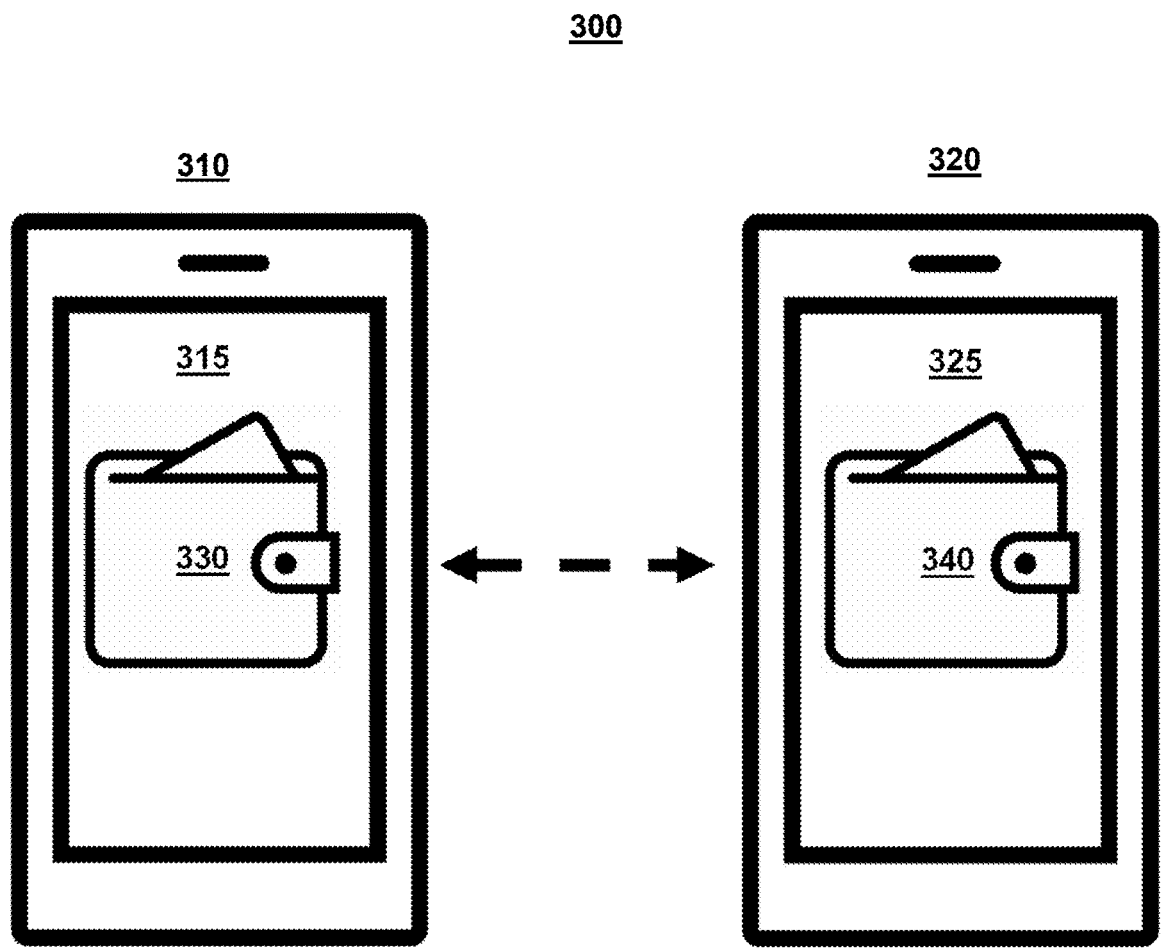
FIG. 3A shows an illustrative diagram for performing a blockchain action, in accordance with one or more embodiments.

FIG. 3A shows an illustrative diagram for conducting blockchain actions, in accordance with one or more embodiments. For example, the diagram presents various components that may be used to manage resources across global or cloud networks in some embodiments.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a smart contract or program stored on a blockchain. For example, a smart contract may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

FIG. 3A includes system 300, which includes user device 310 and user device 320, although other devices and/or components may also be featured in system 300 (e.g., one or more of devices and/or components shown in FIG. 2). User device 310 includes user interface 315. User device 320 includes user interface 325. As referred to herein, a "user interface" may comprise a mechanism for human-computer interaction and communication in a device and may include display screens, keyboards, a mouse, and the appearance of a desktop. For example, a user interface may comprise a way for a user to interact with and/or access an application, website, and/or other program in order to manage resources across global or cloud networks. A user interface may display content related to blockchain actions. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3A, one or more user devices may include a cryptography-based storage application (e.g., cryptography-based storage application 330 and cryptography-based storage application 340) used to perform blockchain actions. The cryptography-based storage application may be used to perform a plurality of blockchain actions across a computer network. For example, the cryptography-based storage application may comprise a decentralized application that functions to perform one or more blockchain actions.

In some embodiments, the cryptography-based storage application may comprise and/or be compatible with one or more application program interfaces (e.g., APIs). For example, an API may be implemented on user device 310 and/or communicate with an API implemented on user device 320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate blockchain actions. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDOS) attacks. The API may use RESTful APIs as standard for external integration.

In some embodiments, the system may also use one or more Application Binary Interfaces (ABIs) and an alternative to and/or in addition to an API. An ABI is an interface between two program modules, often between operating systems and user programs. ABIs may be specific to a blockchain protocol. For example, an ABI defines the methods and structures used to interact with the binary contract similar to an API, but on a lower level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some embodiments, the cryptography-based storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiments, a cryptography-based storage application may include, or have access to, key-based wallet or a smart contract wallet. For example, the cryptography-based storage application may comprise a digital or other construct (e.g., a reference, a pointer, a text on a blockchain, an address, etc.).

In some embodiments, to conduct a blockchain action, user device 310, user interface 315, and/or cryptography-based storage application 330 may comprise, control, and/or have access to a private key and/or digital signature. For example, system 300 may use cryptographic systems for conducting blockchain actions, such as managing the availability of resources. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a monetary reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action, and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 210 (FIG. 2)), and the blockchain action is completed. For example, to add the blockchain action to blockchain, the successful node (e.g., the successful miner) encapsulates the blockchain action in a new block before transmitting the block throughout system 300.

In some embodiments, a cryptography-based storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based storage application (e.g., cryptography-based storage application 330) may allow a user device (e.g., user device 310) to share files, access, and/or perform a blockchain action with another user device (e.g., user device 320) and/or cryptography-based storage application (e.g., cryptography-based storage application 340). For example, the peer-to-peer architecture and decentralized nature allows blockchain actions to be conducted between the user devices, without the need for any intermediaries or central authorities.

Figure 3B:
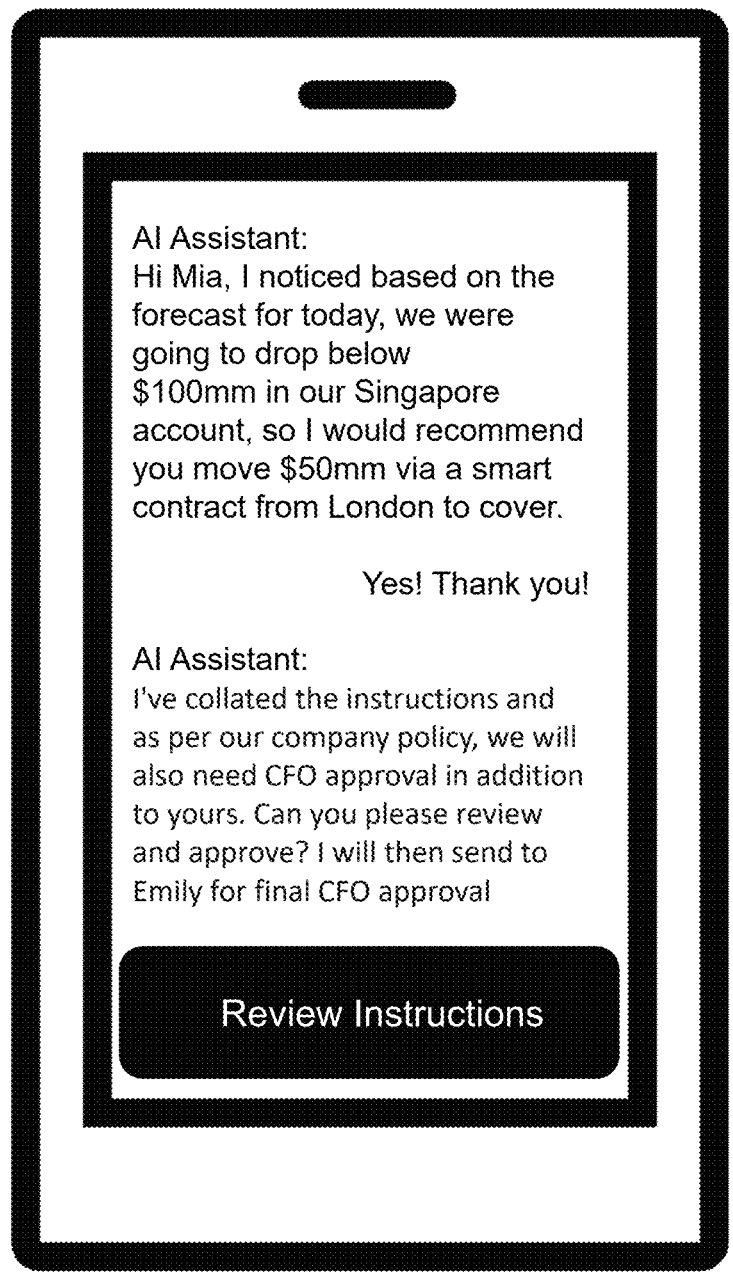
FIG. 3B shows an illustrative diagram for performing real-time actions, in accordance with one or more embodiments.

FIG. 3B shows an illustrative diagram for performing real-time actions, in accordance with one or more embodiments. For example, FIG. 3B shows user interface 350. User interface 350 may depict a mobile-based AI assistant designed to support real-time actions. For example, FIG. 3B describes an embodiment where user interface 350 supports financial decision-making and policy-compliant workflows within an enterprise environment. The system implements a context-aware conversational interface that allows users to interact naturally while leveraging backend intelligence to automate routine yet critical financial tasks. For example, the assistant informs the user, Mia, that based on the forecasted cash flow for the day, the balance in the Singapore account is expected to fall below $100 million. To mitigate this issue, it proactively recommends transferring $50 million from the London account via a smart contract. The system may integrate real-time data ingestion and predictive modeling capabilities, using internal cash forecasts and account monitoring to identify financial thresholds and autonomously generate appropriate recommendations.

To support this, the system may rely on an integrated financial data layer that consolidates information from various internal sources such as bank feeds, enterprise resource planning (ERP) systems, or treasury management platforms. Machine learning models or rule-based engines are applied to these data streams to predict shortfalls and identify corrective actions. Additionally, the assistant incorporates enterprise policy logic, ensuring that before any transaction is executed, required governance steps are followed. In this case, the AI informs the user that chief financial officer (CFO) approval is also needed, consistent with company policy. The system may then gain access to corporate policy frameworks and may dynamically route tasks for multi-level approval.

To support transparency and control, the interface includes an interactive element—a "Review Instructions" button—that allows the user to inspect the proposed actions in detail before proceeding. This design enables traceable and auditable financial actions while maintaining an intuitive user experience. Underlying this interface, the system likely includes secure communication with smart contract infrastructure, identity management to enforce role-based access, and workflow engines that coordinate approvals across stakeholders like the CFO. Overall, the implementation of such a system involves the orchestration of real-time analytics, enterprise workflow management, policy enforcement, and secure transaction processing, all surfaced through a conversational mobile interface.

To implement a user interface capable of opening and transacting into accounts in real-time across multiple asset classes and jurisdictions, a system may need to integrate several layers of infrastructure, data services, and user experience design. In the given scenario, when a new entity is created and a user (e.g., "Mia") wants to initiate payments and access real-time account information, the system must provide a seamless interface—potentially embedded within her existing Treasury Management System (TMS) or ERP platform—that connects directly to banking APIs. Upon a user's request to open accounts, the system would invoke an orchestration layer that automates the account onboarding process across geographies, handling compliance requirements, entity verification, KYC/AML checks, and regulatory submissions in parallel for each jurisdiction.

The user interface may allow the user to specify parameters such as target markets, currencies, asset types (e.g., fiat and digital assets), and transactional preferences. These details would be translated into standardized API requests sent to the bank's infrastructure. Once the accounts are provisioned, the system would retrieve account details and initiate real-time integration with the bank's data feeds for balance reporting, transaction monitoring, and payment initiation. Support for both domestic and cross-border activity would require the platform to interoperate with real-time payment networks (such as SEPA Instant or FedNow) and distributed ledger networks if digital assets are involved. Additionally, the interface must abstract the complexity of asset-specific settlement mechanisms, allowing Mia to initiate payments in traditional currencies or digital tokens through a unified, intuitive experience.

Security and access control may be important, so the system may incorporate identity and role-based access management, ensuring that users like Mia can only access functions permitted for their role or jurisdiction. Smart contract logic or rule-based workflows may be embedded to ensure preconditions for transactions—such as CFO approval, liquidity checks, or policy compliance—are met before funds are released. Notifications, audit trails, and integration with internal systems for reconciliation and reporting would further support operational transparency and efficiency. Ultimately, this approach enables real-time, multi-asset financial operations at scale, delivered through a frictionless interface that embeds complex banking services directly into enterprise finance environments.

The system can generate a notification outlining the specific requirements for opening accounts by leveraging contextual data it has already ingested or been provided during earlier interactions. When the system previously advised on the M&A activity and the creation of the new entity, key information such as the entity's legal name, structure, ownership details, geographic footprint, and anticipated transactional needs may have been shared or captured within the system. Using this historical data, the system can prefill much of the account opening documentation automatically. As a user initiates the request to open accounts in multiple markets, the system cross-references the pre-existing entity profile and regulatory requirements per jurisdiction to generate a customized checklist of documentation, KYC artifacts, and authorization forms needed to complete onboarding.

The notification is intelligently constructed to be both actionable and personalized—it details the required inputs for each market, highlights any data gaps, and indicates whether certain documents (e.g., articles of incorporation or board resolutions) are already on file from the M&A process. The system can also categorize requirements by urgency or legal complexity, prompting the user to prioritize markets where additional regulatory clearance is needed. This notification could appear as an in-platform message or an email with embedded actions (e.g., "Review & Submit," "Upload Missing Document"), ensuring the user remains within her existing workflow. By unifying data from prior engagements with the company and dynamically interpreting regulatory demands, the system minimizes manual entry, accelerates time to transact, and provides Mia with a guided, compliant path toward full account activation across all targeted jurisdictions.

To facilitate a transaction such as a tokenized payment from one account in one country to another, the system must coordinate several interconnected processes across digital infrastructure, compliance layers, and transactional networks. First, the user interface would allow the initiator—such as the user—to specify the origin and destination accounts, currency type, asset class (e.g., tokenized fiat or stablecoin), and transaction amount. The system would then validate whether both accounts are enabled for tokenized transfers and whether any regulatory, legal, or internal preconditions apply to cross-border asset movement. It would reference self-executing programs or embedded policy rules to check for transaction limits, counterparties' verification status, and real-time liquidity.

Once validated, the system initiates the transfer by interacting with the appropriate distributed ledger or tokenization platform—often through APIs provided by the bank or a trusted settlement network. The tokens representing value are either minted and transferred or moved from one digital wallet to another, with the underlying blockchain recording the transaction immutably. Simultaneously, metadata about the payment (e.g., purpose, originator ID, compliance flags) is packaged and transmitted to ensure auditability and regulatory transparency. For countries where local clearing is required, the system may also interface with traditional payment rails in parallel to reconcile settlement.

Throughout the process, real-time status updates are surfaced to the user, and downstream systems such as the ERP or TMS are automatically updated to reflect the new balances and ledger entries. If additional approvals are needed—such as from a CFO or compliance officer—the system routes the transaction through a digital workflow before releasing it. Ultimately, this architecture allows for secure, compliant, and near-instantaneous cross-border tokenized payments, all initiated and monitored through a unified interface.

Figure 4:
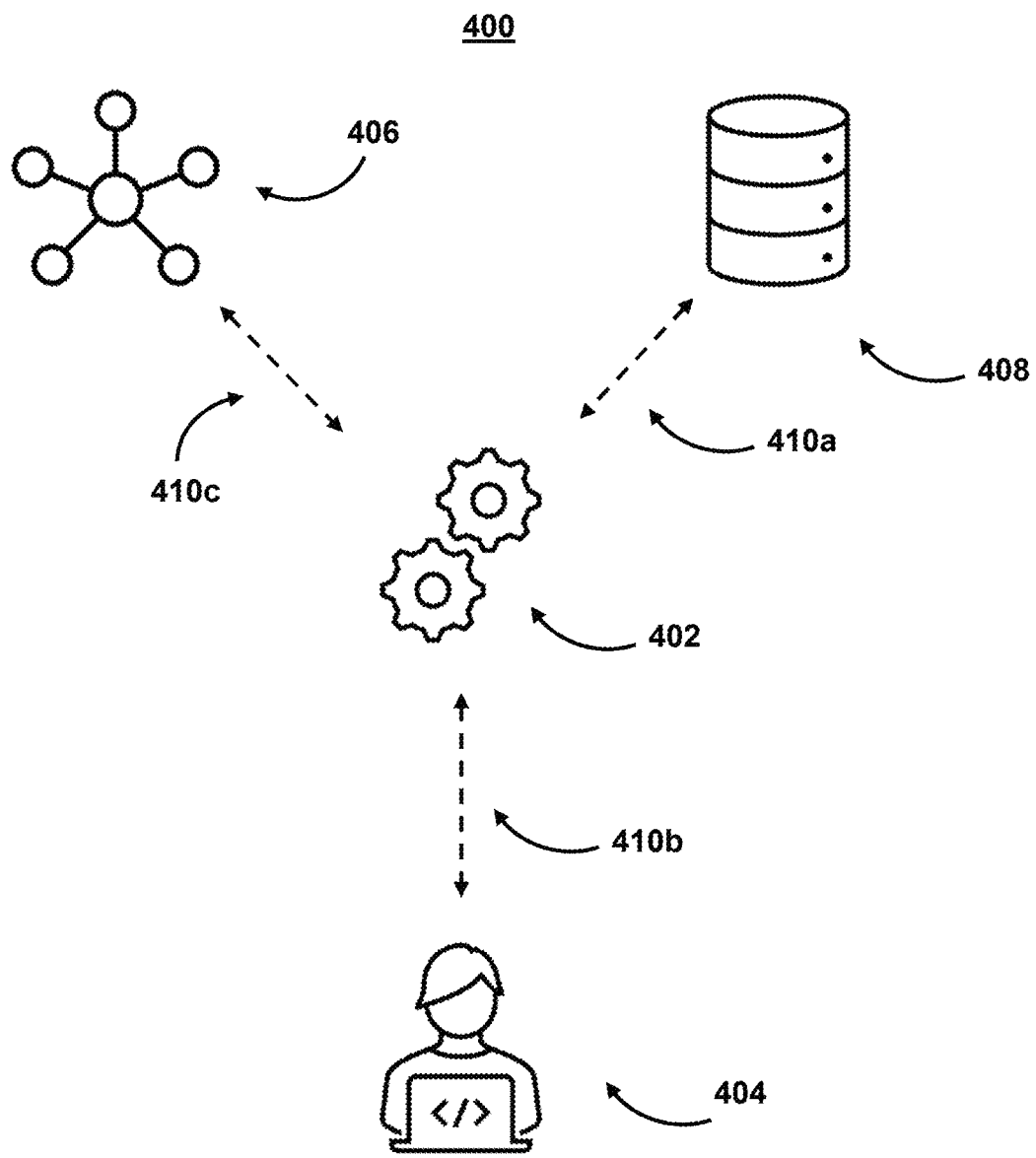
FIG. 4 shows illustrative components for a system used to support managing resources across global or cloud networks, in accordance with one or more embodiments.

FIG. 4 shows RAG framework 400, which may include implementation component 402, interface component 404, an artificial intelligence model 406, and a database 408. For example, implementation component 402 may act as a middleman for facilitating communication between each of interface component 404, artificial intelligence model 406, and database 408. It should be noted that other components of RAG framework 400 may exist, in accordance with one or more embodiments. Interface component 404 may enable interaction with the RAG framework 400. For example, interface component 404 may be configured to provide inputs to artificial intelligence model 406 and/or database 408, as well as receive outputs from artificial intelligence model 406 and/or database 408. For example, where artificial intelligence model 406 is an LLM, interface component 404 may provide one or more instructions (e.g., queries, synthetic availabilities, requests to generate aggregate availability based on synthetic or actual availabilities, requests to generate an alternative blockchain action, a request for a recommendation, prompts, structured prompts, etc.) to the LLM, and receive one or more outputs from the LLM (e.g., aggregate availability of resources of a computing network, aggregate availability of user-account based/accessible resources of a computing network, recommendation of an alternative blockchain action to be processed, etc.). Additionally, or alternatively, interface component 404 may be able to directly interact with database 408. For example, interface component 404 may be configured to provide one or more queries to database 408 (e.g., to search for data, filter data, etc.) and receive outputs from database 408 (e.g., aggregate availabilities, aggregate availability of user-account based/accessible resources, recommendations of alternative blockchain actions, etc.). For example, a user may use interface component 404 to interact with one or more components of RAG framework 400, such as by submitting prompts to the artificial intelligence model 406 via a user interface.

FIG. 4 also shows communication paths 410a-410c, which may include the Internet, a mobile phone network, a mobile voice or data network (e.g., a 5G or LTE network), a cable network, a public switched telephone network, or other types of communications networks or combinations of communications networks. Communication paths 410a-410c may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The components of FIG. 4 may include additional communication paths linking a plurality of hardware, software, and/or firmware components operating together.

The RAG framework offers several advantages over conventional artificial intelligence model training frameworks. For example, RAG frameworks optimize the outputs of artificial intelligence models (e.g., large language models) by leveraging an authoritative database (e.g., database 408) prior to generating a response to a given input (e.g., instruction, query, etc.). For instance, RAG framework 400 enables artificial intelligence model 406 to be communicatively coupled with database 408 to enable the artificial intelligence model 406 to reference database 408 with contextual knowledge (e.g., information that is in a specific domain, information that is specific to an entity, current availability of a resource (e.g., online, offline, etc.), actual availabilities of resources, synthetic availabilities of resources, weighted availabilities of resources, etc.) related to a given input that is provided to the artificial intelligence model 406. For example, by using RAG framework 400, where the artificial intelligence model 406 is an LLM, the LLM may generate responses that is tailored to information that is specific to the entity hosting database 408. Moreover, by utilizing the RAG framework 400, the LLM itself does not need to be retrained when new contextual information (e.g., new data) is updated or uploaded to database 408 itself. For instance, in conventional artificial intelligence model training, the artificial intelligence model itself must be retrained when new data becomes available. In contrast, using RAG framework 400, given that the artificial intelligence model 406 is communicatively coupled to the database 408, when new information is pushed (e.g., stored) to database 408, the artificial intelligence model 406 may access database 408 to retrieve additional information (e.g., contextual information) to enhance the artificial intelligence model's 406 responses, thereby reducing the amount of computational resources conventionally required to train/retrain artificial intelligence models.

In some embodiments, artificial intelligence model 406 may be trained. For example, artificial intelligence model 406 may be trained to generate an aggregate availability. For instance, artificial intelligence model 406 may be an LLM. The LLM may be trained on a fourth set of training data. The fourth set of training data may include (i) one or more availabilities (e.g., synthetic availability, actual availabilities, etc.) corresponding to one or more resources of a computing system, and (ii) an aggregate availability. For example, the fourth set of training data may include a first synthetic availability of a first resource and a second synthetic availability of a second resource. The first and second synthetic availabilities may be labeled as synthetic/actual availabilities with their corresponding value (e.g., an amount of synthetic availability). Additionally or alternatively, the first and second synthetic availabilities may include other labels denoting availability type, cryptographically secure digital asset identifier labels (e.g., a cryptographically secure digital asset identifier label that identifies the digital asset representing the synthetic availability), or other information. The fourth set of training data may also include a labeled aggregate availability corresponding to both of the first synthetic availability and the second synthetic availability. In this way, the fourth set of training data may reflect the relationship between the synthetic availabilities and the determined aggregate availability on which the LLM will be trained. It should be noted that the fourth set of training data may include variations of first and second synthetic availabilities for a variety of computing system resources.

The system may then provide the fourth set of training data to the LLM during a training routine. For example, as described above, the LLM may be communicatively coupled to a retrieval component (e.g., implementation component 402). In some embodiments, the retrieval component is configured to communicate between artificial intelligence model 406 and database 408, to retrieve actual availabilities of resources of the computer network to be provided to the LLM. Additionally or alternatively, the retrieval component may be configured to communicate between artificial intelligence model 406 and database 408, to retrieve weighted availabilities related to resources of the computer network. For example, during the training routine, the system may provide the fourth set of training data to the LLM. The LLM may learn the relationships between the synthetic availabilities (and the attributes/features thereof) and the aggregate availabilities (e.g., of the fourth training data set) to generate a predicted aggregate availability. For instance, when the LLM is provided a synthetic availabilities (e.g., the first synthetic availability, the second synthetic availability), the LLM may provide a response indicating an aggregate availability. Upon learning the relationships between the synthetic availabilities and the provided aggregate availabilities, the LLM may access the database (e.g., database 408) to retrieve (i) actual availability corresponding to the synthetic availabilities, and/or (ii) weighted availabilities related to resources of the computing network.

For example, the LLM may access the database (e.g., via the retrieval component) to obtain the most accurate, up-to-date information regarding the actual availability of a resource. For instance, where the first synthetic availability corresponds to a first resource of the computer network, and the first resource is determined to be online at the time of determining the aggregate availability of the computing network (e.g., via the LLM), the retrieval component may retrieve a first actual availability from the database 408 that corresponds to the first resource. By doing so, the system may use the first actual availability in lieu of the first synthetic availability when generating the aggregate availability to provide a more accurate aggregate availability computation.

As another example, the LLM may access the database (e.g., via the retrieval component) to obtain a weight corresponding to a synthetic/actual availability. For example, the database 408 may store a set of weights to be applied to the synthetic availability (or actual availability) to emphasize or deemphasize the resulting value of the aggregate availability. For instance, in a financial services embodiment, the system may weight actual liquidity greater than that of a synthetic liquidity of a resource. Additionally or alternatively, the system may weight a type of availability (e.g., fiat cash) greater than that of another type of availability (e.g., stock). As such, the system may retrieve a weight corresponding to the resource. By doing so, the system may use weights to provide a more accurate availability computation.

The system may then receive, from the LLM during the training routine, a set of candidate aggregate availabilities. For example, after an initial training step (described above), the LLM may generate a set of candidate aggregate availabilities. The system may then provide the set of candidate aggregate availabilities to interface component 404, via implementation component 402, where a user (e.g., a subject matter expert) may fine-tune train the LLM.

Fine-tune training (or fine tuning) refers to a training method where a pre-trained artificial intelligence is adapted for a specific task or use case. For example, fine-tuning may involve a user providing additional information (e.g., labels, indication of accuracy, prompts etc.) to the LLM to generate more accurate, contextualized, domain-specific responses from the LLM. For instance, with respect to the above, a user may provide, via interface component 404, a message to the LLM that includes an accuracy value corresponding to each of the set of candidate aggregate availabilities that the LLM generated. The accuracy value may be a numerical value, such as a normalized numerical value according to a given scale (0-1, 0-10, 0-100, etc.), a percentage, or other quantitative metric for measuring accuracy. By doing so, the LLM may be further trained (e.g., fine-tuned) using quantitative accuracy metrics to better predict or generate responses indicating an aggregate availability of the computing system.

In some embodiments, artificial intelligence model 406 may be trained. For example, artificial intelligence model 406 may be trained to generate an alternative blockchain action to be processed. For instance, artificial intelligence model 406 may be an LLM. The LLM may be trained on a fifth set of training data. The fifth set of training data may include (i) requests to perform a blockchain action, and/or (ii) aggregate availabilities corresponding to the requests to perform a blockchain action. For example, the fifth set of training data may include a first blockchain action corresponding to a first aggregate availability, and a second blockchain action corresponding to a second aggregate availability. The first and second blockchain actions may include one or more labels (e.g., indicating a type of action to be performed, a transaction amount, a payer identifier, a beneficiary identifier, etc.). The first and second aggregate availabilities may also be labeled indicating availability types (e.g., synthetic availability, actual availability, asset type (e.g., fiat currency, cryptocurrency, stock, bonds, etc.)), an amount (e.g., amount of aggregate availability), or other information. In this way, the fifth set of training data may reflect the relationship between the blockchain actions and the aggregate availabilities that the blockchain actions use, on which the LLM will be trained.

The system may then provide the fifth set of training data to the LLM during a training routine. For example, as described above, the LLM may be communicatively coupled to a retrieval component (e.g., implementation component 402). In some embodiments, the retrieval component is configured to communicate between artificial intelligence model 406 and database 408, to retrieve (i) similar blockchain actions historically processed by the computer network successfully, and (ii) similar aggregate availabilities corresponding to the similar blockchain actions historically processed by the computer network successfully, which is to be provided to the LLM. For example, during the training routine, the system may provide the set fifth set of training data to the LLM. The LLM may learn the relationships between the blockchain actions and the aggregate availabilities. For instance, when the LLM is provided the blockchain actions and the corresponding aggregate availabilities, the LLM may provide a response indicating an alternative blockchain action (e.g., which may include a different aggregate availability). Upon learning the relationships between the blockchain actions and the aggregate availabilities, the LLM may access the database (e.g., database 408) to retrieve (i) similar blockchain actions historically processed by the computer network successfully, and (ii) similar aggregate availabilities corresponding to the similar blockchain actions historically processed by the computer network successfully.

For example, the LLM may access the database (e.g., via the retrieval component) to verify whether the provided aggregate availabilities (e.g., of the fifth set of training data) are able to be used to process the corresponding blockchain actions (e.g., of the fifth set of training data). For example, the (i) similar blockchain actions historically processed by the computer network successfully, and (ii) similar aggregate availabilities corresponding to the similar blockchain actions historically processed by the computer network successfully may serve as contextual information to enable the LLM to update its prediction (e.g., recommendation of an alternative blockchain action). In other words, the similar blockchain actions and similar aggregate availabilities may provide supplemental information to the LLM to update an initial recommendation of an alternative blockchain action to be performed without user intervention.

For example, the LLM may generate an initial recommendation based on the fifth set of training data, and then access the database (e.g., via the retrieval component) to obtain the (i) similar blockchain actions historically processed by the computer network successfully, and (ii) similar aggregate availabilities corresponding to the similar blockchain actions historically processed by the computer network successfully. Using this obtained information, the LLM may regenerate a recommendation based on the obtained information from the database. The similar blockchain actions and similar aggregate availabilities may be retrieved based on a similarity metric between (i) the blockchain actions of the fifth set of training data and the blockchain actions stored in the database, and (ii) the aggregate availabilities of the fifth set of training data and the aggregate availabilities stored in the database. The similarity metric may be a Euclidean distance, Manhattan distance, cosine similarity, or other similarity metric between vectorized (e.g., embedded via an embedding model) blockchain actions and aggregate availabilities, respectively. In some embodiments, the LLM (or other system components) may compare the similarity metrics to a similarity metric threshold. If the similarity metric satisfies the similarity metric threshold (e.g., greater or equal to the similarity metric threshold), the system may select the corresponding blockchain action and/or aggregate availability as a candidate blockchain action/candidate aggregate availability. For example, the LLM may compare a first similarity metric between (i) a first blockchain action (e.g., of the fifth set of training data), and (ii) a first blockchain action stored in the database to a first similarity metric threshold. If the first similarity metric satisfies the first similarity metric threshold, the system may select the first blockchain action stored in the database (and the aggregate availability corresponding to the first blockchain action) as a candidate alternative blockchain action to be performed.

The system may then receive, from the LLM during the training routine, a set of candidate alternative blockchain actions. For example, after the initial training step (described above), the LLM may generate a set of candidate blockchain actions to be performed based on the (i) similar blockchain actions historically processed by the computer network successfully, and (ii) similar aggregate availabilities corresponding to the similar blockchain actions historically processed by the computer network successfully. The system may then provide the set of candidate alternative blockchain actions to interface component 404, via implementation component 402, where a user (e.g., a subject matter expert) may fine-tune train the LLM.

Fine-tune training (or fine tuning) refers to a training method where a pre-trained artificial intelligence is adapted for a specific task or use case. For example, fine-tuning may involve a user providing additional information (e.g., labels, indication of accuracy, prompts etc.) to the LLM to generate more accurate, contextualized, domain-specific responses from the LLM. For instance, with respect to the above, a user may provide, via interface component 404, a message to the LLM that includes an accuracy value corresponding to each of the set of candidate alternative blockchain actions that the LLM generated. The accuracy value may be a numerical value, such as a normalized numerical value according to a given scale (0-1, 0-10, 0-100, etc.), a percentage, or other quantitative metric for measuring accuracy. By doing so, the LLM may be further trained (e.g., fine-tuned) using quantitative accuracy metrics to better predict or generate recommended alternative blockchain actions.

Figure 5:
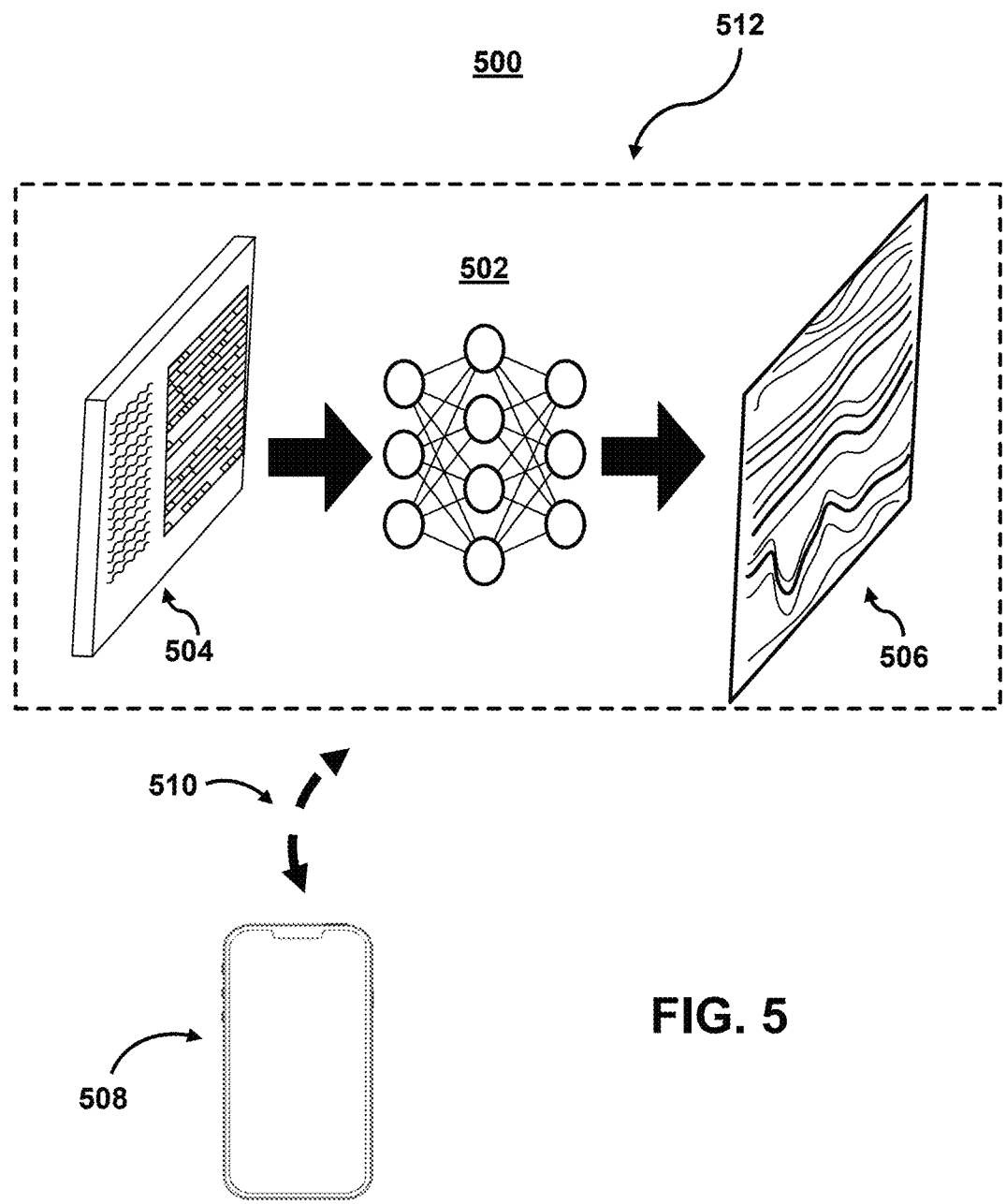
FIG. 5 shows a flowchart of the steps involved in managing resources across global or cloud networks irrespective or resource-readiness, in accordance with one or more embodiments.

FIG. 5 shows illustrative components for a system used to support managing resources across global or cloud networks, in accordance with one or more embodiments. For example, FIG. 5 may show illustrative components used to support managing resources across global or cloud networks. As shown in FIG. 5, system 500 may include mobile device 508 which may correspond to one or more of user devices 310, 320 (FIG. 3A). While shown as a smartphone in FIG. 5, it should be noted that mobile device 508 may be any computing device, including, but not limited to, a laptop computer, a tablet computer, a hand-held computer, and other computer equipment (e.g., a server), including "smart," wireless, wearable, and/or mobile devices. For example, mobile device 508 may be used by a user (e.g., customer, system administrator, or other user) to perform one or more blockchain actions, in accordance with one or more embodiments. System 500 may also include cloud components 512. For example, cloud components may be implemented as a cloud computing system and may feature one or more component devices. It should be noted, that, while one or more operations are described herein as being performed by particular components of system 500, these operations may, in some embodiments, be performed by other components of system 500. As an example, while one or more operations are described herein as being performed by components of mobile device 508, these operations may, in some embodiments, be performed by cloud components 512. In some embodiments, the various computers and systems described herein may include one or more computing devices that are programmed to perform the described functions. Additionally, or alternatively, multiple users may interact with system 500 and/or one or more components of system 500.

With respect to the components of mobile device 508, mobile device 508 may receive content and data via input/output (I/O) paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 5, mobile device 508 includes a display upon which to display data.

Additionally, as mobile device 508 is shown as a touchscreen smartphone, these displays also act as user input interfaces. It should be noted that in some embodiments, the device may have neither user input interfaces nor displays, and may instead receive and display content using another device (e.g., a dedicated display device such as a computer screen, and/or a dedicated input device such as a remote control, mouse, voice input, etc.). Additionally, the devices in system 500 may run an application (or another suitable program).

Such device may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication path 510. Communication path 510 may include the Internet, a mobile phone network, a mobile voice or data network (e.g., a 5G or LTE network), a cable network, a public switched telephone network, or other types of communications networks or combinations of communications networks. Communication path 510 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 512 may be accessible via an API layer. The API layer may allow the system to provide information from model 502 to mobile device 508. In some embodiments, the API layer may be implemented on mobile device 508. Alternatively or additionally, the API layer may reside on one or more of cloud components 512. The API layer (which may be a REST or Web services API layer) may provide a decoupled interface to data and/or functionality of one or more applications. The API layer may provide a common, programming language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

The API layer may use various architectural arrangements. For example, system 500 may be partially based on the API layer, such that there is strong adoption of SOAP and RESTful Web services, using resources like Service Repository and Developer Portal, but with low governance, standardization, and separation of concerns. Alternatively, system 500 may be fully based on the API layer, such that separation of concerns between layers like the API layer, services, and applications are in place.

In some embodiments, the system architecture may use a microservice approach. Such systems may use two types of layers: Front-End Layer and Back-End Layer where microservices reside. In this kind of architecture, the role of the API layer may provide integration between Front-End and Back-End. In such cases, the API layer may use RESTful APIs (exposition to front-end or even communication between microservices). The API layer may use AMQP (e.g., Kafka, RabbitMQ, etc.). The API layer may use incipient usage of new communications protocols such as gRPC, Thrift, etc.

In some embodiments, the system architecture may use an open API approach. In such cases, the API layer may use commercial or open-source API Platforms and their modules. The API layer may use a developer portal. The API layer may use strong security constraints applying WAF and DDOS protection, and the API layer may use RESTful APIs as standard for external integration.

System 500 also includes model 502, which may be a machine learning model, artificial intelligence model, etc. (which may be referred collectively as "models" herein). Model 502 may take inputs 504 and provide outputs 506. The inputs may include multiple datasets, such as a training dataset and a test dataset. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a mapping of a logical data model to a platform data model, whether or not a data model corresponds to a given data structure characteristic, whether or not a dataset corresponds to a given data characteristic, etc.).

In a variety of embodiments, model 502 may update its configurations (e.g., weights, biases, or other parameters) based on the assessment of its prediction (e.g., outputs 506) and reference feedback information (e.g., user indication of accuracy, reference labels, or other information). In a variety of embodiments, where model 502 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 502 may be trained to generate better predictions.

In some embodiments, the model (e.g., model 502) may automatically perform actions based on outputs 506. In some embodiments, the model (e.g., model 502) may not perform any actions. The output of the model (e.g., model 502) may be used to determine a synthetic availability of a resource, determine an aggregate availability of a computer network, select cryptographically secure digital assets, recommend alternative blockchain actions, verify actual availabilities of resources, or other actions.

As shown in FIG. 5, in some embodiments, model 502 may be trained by taking inputs 504 and provide outputs 506. Model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving, as compared to traditional computer programs. During training, an output layer of model 502 may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, back propagation techniques may be utilized by model 502 where forward stimulation is used to reset weights on the "front" neural units. In some embodiments, stimulation and inhibition for model 502 may be freer flowing, with connections interacting in a more chaotic and complex fashion. During testing, an output layer of model 502 may indicate whether or not a given input corresponds to a classification of model 502 (e.g., a synthetic availability of a resource, an aggregate availability of a computer network, selected cryptographically secure digital assets, alternative blockchain actions, actual availabilities of resources, etc.).

In some embodiments, model 502 may be trained to determine a synthetic availability related to a resource. For example, the system may retrieve (or otherwise obtain) from a database, a first set of information to train model 502. Model 502 may ingest the first set of information as input 504 during a training routine. The first set of information may include a set of training availability characteristics corresponding to a respective resource of a set of resources. For example, each training availability characteristic may be labeled with an availability value associated with the respective training availability characteristic. In a computing network embodiment, the availability characteristics (and training availability characteristics) may be bandwidth information (e.g., maximum data transfer rates, congestion, etc.), latency information (e.g., propagation delay, queuing delay, processing delay, network jitter, etc.), processing power information (e.g., max throughput, routing table size, firewall limitations, intrusion detection system limitations, intrusion prevention system limitations, etc.), memory information (e.g., buffer size, state table size), encryption/decryption information (e.g., encryption/decryption protocols, encryption/decryption standards), scalability information (e.g., addressing limitations, address size information, address availability information, etc.), availability status information (e.g., online, offline, etc.), or other characteristics pertaining to a resource. Each availability characteristic may be labeled with a label indicating an availability value (e.g., an amount of bandwidth, latency value, amount of processing power, amount of memory, a scalability value, availability status value (e.g., online, offline), etc.).

In a financial service embodiment, the availability characteristics may include asset characteristics (e.g., characteristics of a good/currency/medium of exchange). For example, the availability characteristics may include issuing authority information (e.g., a recognized government or central monetary authority within a country), legal tender information (e.g., whether it is authorized by the government for settling debts, transactions, and payments within or outside of the country's borders), denomination and/or amount information, physical form (e.g., bank notes and coins), type (e.g., fiat, commodity-backed), security features (e.g., printed security features, cryptocurrency security protocol information, encryption standards), exchange rate information, stability information, regulation information, market demand information, supply information, volatility information, utility information, divisibility information, availability status (e.g., ability to be retrieved or used in transaction, whether the bank branch holding the good/asset/currency/medium of exchange is open) or other information related to a good, asset, currency, or other medium of exchange.

Each availability characteristic may be labeled with a label indicating a liquidity (e.g., availability) value (e.g., a value representing liquidity of the issuing authority, a value indicating how liquid the legal tender is, a value indicating a denomination/amount, a value representing the physical form of the asset, a value indicating the type of asset, a value indicating security features of the asset, an exchange rate, a value indicating a supply of the asset, volatility value of the asset, a value indicating a utility of the asset, a value indicating the divisibility of the asset, a value indicating the availability status (e.g., the asset being available to be used, the asset unavailable to be used, etc.)). The liquidity value for each availability characteristic may be normalized (e.g., on a scale 0-1, 0-10, 0-100, or other scale) to indicate a relative liquidity value with respect to a global liquidity value. For example, an asset of a gold bar (e.g., type of asset) may be afforded a liquidity value of 7 on a scale 0-10 where 0 indicates not liquid, and 10 indicates very liquid. As another example, an asset of a United States Dollar may be afforded a liquidity value of 10 on the same scale. Additionally, the liquidity values for the availability characteristics may be based on an embedding model's processing of web-scraped availability characteristic information, retrieved (e.g., from a database associated with the computing network) availability characteristic information, or other third-party sourced availability characteristic information. Additionally, each availability characteristic may be labeled with a label indicating a resource identifier associated with the respective resource. For example, where the resource is a bank branch, the system may label each availability characteristic with a bank-branch identifier (e.g., an address of the bank branch, a name of the bank branch, numerical identifier associated with the bank branch).

In some embodiments, the system may generate a feature vector based on the first set of information. For example, the system may provide the first set of information (e.g., the set of training availability characteristics, the set of availability values, known synthetic availability values, resource identifiers, etc.) to an embedding model (e.g., an autoencoder, or other embedding model configured to generate a feature vector) to generate a feature vector that includes the first set of information to be provided to model 502. As another example, the feature vector may be labeled to indicate a historically determined synthetic availability (e.g., a known synthetic availability) based on the set of training availability characteristics. By doing so, model 502 may learn patterns between input features (e.g., the availability characteristics) of input 504 to generate an output 506.

Output 506 may be a predicted synthetic availability related to a resource. For example, model 502 may ingest the first set of information (e.g., the raw data, the feature vector(s), etc.) as input 504 to generate output 506, indicating a predicted synthetic availability related to the resource. The predicted synthetic availability might be predicted (e.g., via model 502) based availability characteristics of resources (or a user-account based resources). For example, the synthetic availability may represent a synthetic liquidity of a bank branch or a synthetic liquidity of a user account's liquidity at a given bank branch (e.g., synthetic liquidity of assets that are associated with a user in a user account of the user at the bank branch). Model 502 may learn associations or other patterns between the availability characteristics to generate the predicted synthetic availability as output 506. The predicted synthetic availability may be a value (e.g., numerical value, alphanumerical value, etc.) of a synthetic availability associated with the resource. During the training routine, when model 502 generates the predicted synthetic availability as output 506, output 506 may be fed back into model 502 to update one or more configurations (e.g., weights, biases, or other parameters) based on its assessment of its prediction (e.g., outputs 506) and reference feedback information (e.g., user indication of accuracy, reference labels, ground truth information, predetermined synthetic availability information, known synthetic availability information, etc.). For example, the system may update one or more configurations of model 502 based on a computed accuracy metric between output 506 and a known output (e.g., ground truth information indicating a correct synthetic availability). For instance, the accuracy metric may be based on a loss function (e.g., mean squared error, cross-entropy loss, mean absolute error, hinge loss), a gradient descent algorithm (e.g., stochastic gradient descent, mini-batch gradient descent, batch gradient descent), back propagation, or other reference feedback information to generate more accurate predictions based on the predicted output 506 and a known output. By doing so, model 502 may be trained to generate more accurate predictions.

In some embodiments, model 502 may be trained to select a cryptographically secure digital asset. For example, the system may retrieve (or otherwise obtain) from a database, a second set of information to train model 502. Model 502 may ingest the second set of information as input 504 during a training routine. The second set of information may include action characteristics (e.g., of blockchain actions) of an action and cryptographically secure digital asset characteristics.

In a computing network embodiment, the action characteristics may indicate a type of blockchain action (e.g., an allocation of computational resources), a service identifier (e.g., a network service to be provided), a timestamp (e.g., a timestamp indicating when the service is to be provided), an entity account identifier (e.g., an identifier indicating a user to whom the service is to be provided, a company identifier indicating a company to which the service is to be provided, etc.), or other characteristics of an action to be performed. The cryptographically secure digital assets may refer to a token or other digital asset (e.g., NFT, cryptocurrency, utility token, etc.) that represents an availability of a given resource. For example, as each action (e.g., a resource allocation to provide a service) is associated with its own requirements (e.g., to provide such service), the system may select a cryptographically secure digital asset to represent an availability of one or more resources needed to provide the service. For example, each cryptographically secure digital asset may be associated with a set of characteristics indicating a value (e.g., a value of availability), security protocols (e.g., how secure the asset is), requirements (e.g., asset standards, etc.), or other characteristics. Such characteristics may correspond to action characteristics, and as such, the system may select a cryptographically secure digital asset to represent the availability of computer resources. For example, each action characteristic may be associated with a label indicating a required resource for providing the action (e.g., service, resource allocation procedure, etc.), and each cryptographically secure digital asset may represent a resource and the properties of that resource (e.g., via the cryptographically secure digital asset characteristics). As such, model 502 may be trained to learn associations between actions (and the characteristics of such actions) and cryptographically secure digital assets used to represent availabilities of the resources needed to provide the service. By doing so, the model may learn to select standardized cryptographically secure digital assets to represent availabilities of resources. This in turn enables the system to balance the digital log based on actual/synthetic availabilities of resources as the model learns (i) tokenized representations of availabilities of resources, and (ii) which resources are commonly used to provide a service.

In a financial service embodiment, the action characteristics may be transaction characteristics. For example, the transaction characteristics may include an amount (e.g., denomination amount, monetary amount, amount of currency, amount of an asset, etc.), one or more conditions of the transaction, a type of resource (e.g., a type of asset, such as a stock, bond, currency, crypto currency, fiat money, etc.), a time stamp (e.g., a time at which the transaction is to be conducted), a payer user-account identifier (e.g., an account identifier identifying the payer of the transaction), a beneficiary user-account identifier (e.g., an account identifier identifying the beneficiary of the transaction), or other transaction characteristic information.

In some embodiments, the system may generate a feature vector based on the second set of information. For example, the system may provide the second set of information (e.g., the set of action characteristics, cryptographically secure digital asset characteristics, historically selected cryptographically secure digital assets based on historical action characteristics, etc.) to an embedding model (e.g., an autoencoder, or other embedding model configured to generate a feature vector) to generate a feature vector that includes the second set of information to be provided to model 502. For example, the feature vector may represent the second set of information in an embedding space (e.g., a numeric embedding, an alphanumeric embedding, etc.).

The feature vector may include one or more labels indicating which embedding corresponds to what action characteristic. For example, an amount transaction characteristic may be labeled as "transaction amount" for the embedding "4392518." The cryptographically secure digital asset characteristics may include availability characteristics (e.g., as described above) of cryptographically secure digital assets (e.g., cryptocurrencies, tokens, NFTs, etc.). The cryptographically secure digital asset characteristics may be labeled. For example, the system may generate a feature vector representing the cryptographically secure digital asset characteristics in an embedding space. The feature vector may include one or more labels indicating which embedding corresponds to what cryptographically secure digital asset characteristic. For example, a security protocol characteristic may be labeled as "protocol" for the embedding "324174." As another example, the feature vector may be labeled to indicate action characteristics, cryptographically secure digital asset characteristics, and a cryptographically secure digital asset that was selected based on a historical action characteristic. For example, the feature vector may be labeled to indicate a historically selected cryptographically secure digital asset based on a historical set of action characteristics, with respect to a set of available cryptographically secure digital asset characteristics. By doing so, model 502 may learn patterns between input features (e.g., the action characteristics and the cryptographically secure digital asset characteristics) of input 504 to generate an output 506.

Output 506 may be a selected cryptographically secure digital asset. For example, model 502 may ingest the second set of information (e.g., the raw data, the feature vector(s), etc.) as input 504 to generate output 506, indicating a selected cryptographically secure digital asset. The selected cryptographically secure digital asset might be selected (e.g., via model 502) based on the action characteristics and the cryptographically secure digital asset characteristics. For example, because each action (e.g., transaction) is associated with its own set of requirements (e.g., an amount, asset type, etc.), model 502 may learn associations or other patterns between the action characteristics and characteristics of cryptographically secure digital assets to select a cryptographically secure digital asset on which to base the transaction while a resource is offline or otherwise unavailable. For example, if the action (e.g., transaction) is for $100 while a bank branch is closed, the system may select a cryptographically secure digital asset to be used to conduct the transaction while the bank branch is closed. The selected cryptographically secure digital asset may be a cryptographically secure digital asset that the system (e.g., model 502) selects that reduces the risk of the transaction from departing from an original value while the bank is closed. For instance, where the transaction is for $100, model 502 may be configured to select a cryptographically secure digital asset to be used to conduct the transaction while the bank branch is closed that is not-volatile, such that when the bank branch reopens, a difference between the value of the selected cryptographically secure digital asset is within a threshold value of the original $100 value of the transaction. By doing so, the system may reduce transaction errors stemming from cryptocurrency volatility. In other words, model 502 may select the best-suited cryptographic digital asset for completing the transaction based on the requirements of the transaction, the availability of the resources (e.g., bank branches), and characteristics (e.g., volatility) of the cryptographically secure digital assets. As such, model 502 may learn associations or other patterns between the action characteristics and the cryptographically secure digital assets to generate the selected cryptographically secure digital assets as output 506. The selected cryptographically secure digital asset may be represented by a value (e.g., numerical value, alphanumerical value, etc.) indicating the identity of the cryptographically secure digital asset. During the training routine, when model 502 generates the selected cryptographically secure digital asset as output 506, output 506 may be fed back into model 502 to update one or more configurations (e.g., weights, biases, or other parameters) based on its assessment of its prediction (e.g., outputs 506) and reference feedback information (e.g., user indication of accuracy, reference labels, ground truth information, predetermined synthetic availability information, known synthetic availability information, etc.). For example, the system may update one or more configurations of model 502 based on a computed accuracy metric between output 506 and a known output (e.g., ground truth information indicating correctly selected cryptographically secure digital asset). For instance, the accuracy metric may be based on a loss function (e.g., mean squared error, cross-entropy loss, mean absolute error, hinge loss), a gradient descent algorithm (e.g., stochastic gradient descent, mini-batch gradient descent, batch gradient descent), back propagation, or other reference feedback information to generate more accurate predictions based on the predicted output 506 and a known output. By doing so, model 502 may be trained to generate more accurate predictions.

In some embodiments, model 502 may be trained to determine an aggregate availability (e.g., for a computer network). For example, the system may retrieve (or otherwise obtain) from a database a third set of information to train model 502. Model 502 may ingest the third set of information as input 504 during a training routine. The third set of information may include actual availability information (e.g., actual availability of one or more resources), synthetic availability information (e.g., synthetic availability of one or more resources), or other availability information. As such, model 502 may be trained to learn associations between actual and/or synthetic availability information to determine the aggregate availability of the computer network to provide a service. For example, because the availability may be actual and/or synthetic availability, the system may monitor for whether resources become online/offline. In scenarios where the resources are online, the system may use actual availability in lieu of synthetic availability as the actual availability reflects more accurate information about the particular resource (or user account resources available at that resource). As such, for any resources that are determined to be online at the time of the action (e.g., allocation of resources to provide a service, conducting a transaction, etc.), the system may determine actual availability for that resource and use the actual availability (and any synthetic availability needed from other resources) to perform the action. Using the actual availability and the synthetic availability, model 502 may generate an aggregate availability of the computing network. By doing so, the system may determine a network-wide availability of resources for performing an action.

In some embodiments, the system may generate a feature vector based on the third set of information. For example, the system may provide the second set of information (e.g., synthetic availability of resource(s), actual availability of resource(s), historically determined aggregate availability based on synthetic/actual availability, etc.) to an embedding model (e.g., an autoencoder, or other embedding model configured to generate a feature vector) to generate a feature vector that includes the second set of information to be provided to model 502. For example, the feature vector may represent the third set of information in an embedding space (e.g., a numeric embedding, an alphanumeric embedding, etc.).

The feature vector may include one or more labels indicating which embedding corresponds to what availability. For example, a synthetic availability may be labeled "synthetic" for the embedding "368424." As another example, the feature vector may be labeled to indicate a historically determined (e.g., known) aggregate availability based on one or more synthetic or actual availabilities of resources (e.g., synthetic/actual availability values). By doing so, model 502 may learn patterns between input features (e.g., synthetic/actual availability) of input 504 to generate an output 506.

Output 506 may be an aggregate availability. For example, model 502 may ingest the third set of information (e.g., the raw data, the feature vector(s), etc.) as input 504 to generate output 506 indicating an aggregate availability of the computing network. Model 502 may learn associations or other patterns between the synthetic availability and/or the actual availability to generate the aggregate availability as output 506. The aggregate availability may be represented by a value (e.g., numerical value, alphanumerical value, etc.)

indicating a network-wide availability of resources available to provide the service (or complete the transaction). During the training routine, when model 502 generates the aggregate availability as output 506, output 506 may be fed back into model 502 to update one or more configurations (e.g., weights, biases, or other parameters) based on its assessment of its prediction (e.g., outputs 506) and reference feedback information (e.g., user indication of accuracy, reference labels, ground truth information, predetermined synthetic availability information, known synthetic availability information, etc.). For example, the system may update one or more configurations of model 502 based on a computed accuracy metric between output 506 and a known output (e.g., ground truth information indicating a correctly predicted aggregate availability). For instance, the accuracy metric may be based on a loss function (e.g., mean squared error, cross-entropy loss, mean absolute error, hinge loss), a gradient descent algorithm (e.g., stochastic gradient descent, mini-batch gradient descent, batch gradient descent), back propagation, or other reference feedback information to generate more accurate predictions based on the predicted output 506 and a known output. By doing so, model 502 may be trained to generate more accurate predictions. In some embodiments, however, the aggregate availability may be generated based on a RAG framework to obtain accurate, up to date, information in which to generate the aggregate availability.

In some embodiments, the model 502 may be implemented in a Retrieval-Augmented Generative (RAG) framework. For example, FIG. 4 shows illustrative components for a RAG framework used to support managing resources across global or cloud networks, in accordance with one or more embodiments. The components of FIG. 4 may be implemented in cloud components 512 of FIG. 5.

Figure 6:
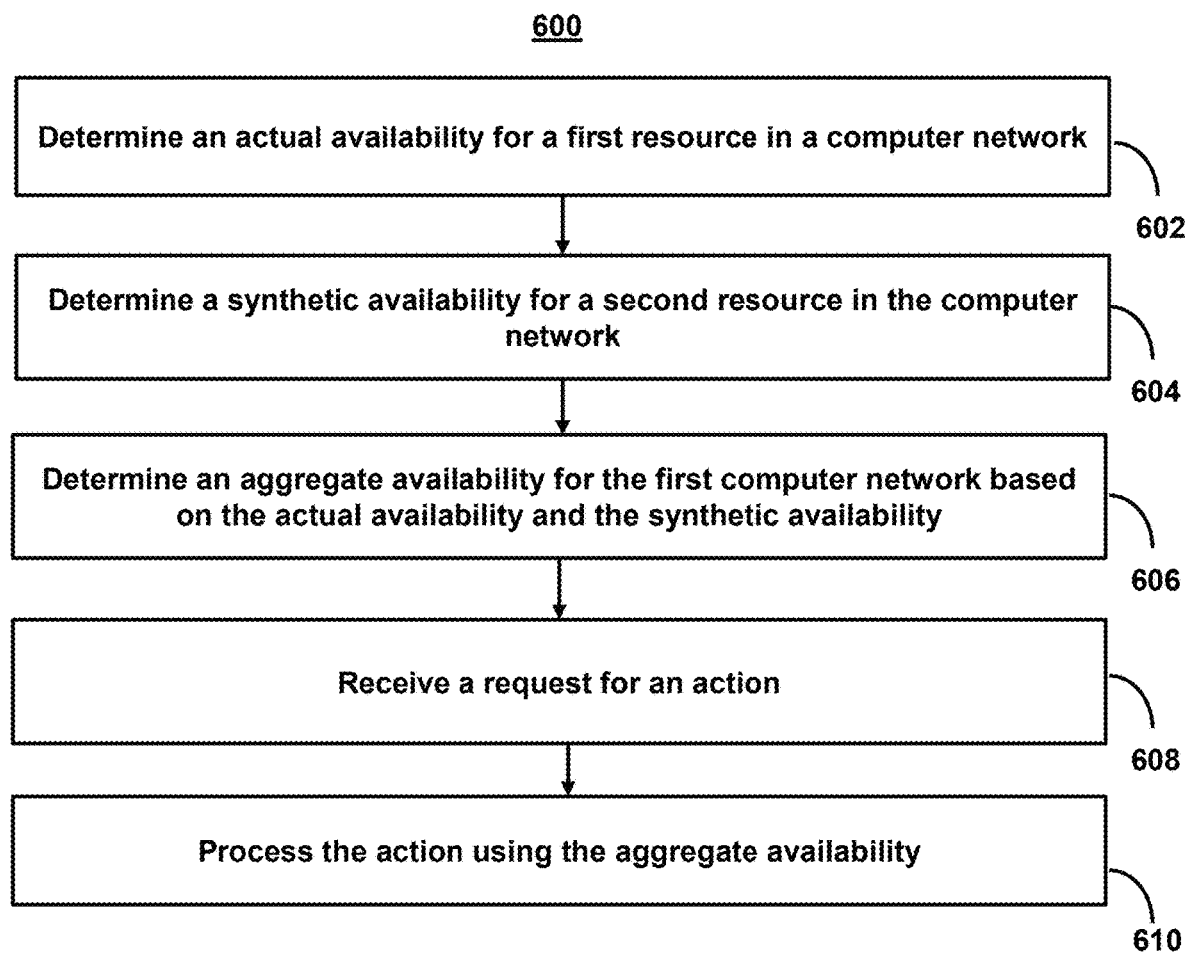
FIG. 6 shows a flowchart of the steps involved in managing resources across global or cloud networks, in accordance with one or more embodiments.

FIG. 6 shows a flowchart of the steps involved in managing resources across global or cloud networks, in accordance with one or more embodiments. For example, the system may use process 600 (e.g., as implemented on one or more system components described above) in order to manage resources across global or cloud networks while mitigating issues related to providing services while resources are offline.

At step 602, process 600 (e.g., using one or more components described above) may determine an actual availability for a first resource in a computer network. For example, the system may determine, using a first self-executing program, a first actual availability for a first resource in a first computer network, wherein the first resource is currently online, and wherein the first actual availability is represented by a first cryptographically secure digital asset in a digital log.

In some embodiments, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

At step 604, process 600 (e.g., using one or more components described above) may determine a synthetic availability for a second resource in the computer network. For example, the system may determine, using a second self-executing program, a first synthetic availability for a second resource in the first computer network, wherein the second resource is currently offline, and wherein the first synthetic availability is represented by a second cryptographically secure digital asset in a digital log.

In some embodiments, determining the first synthetic availability for the second resource in the first computer network may comprise the system retrieving a last known actual availability for the second resource from the digital log and selecting the first synthetic availability from a plurality of synthetic availabilities, based on the last known actual availability. For example, the system may access the digital log, which records historical actual availability data for the resource in the computer network. The system may retrieve the most recent or last known actual availability value recorded in the log. The system may use multiple synthetic availability models or algorithms to forecast or estimate availability based on different factors, such as historical patterns, statistical analysis, predictive models, or machine learning algorithms. These models may generate synthetic availability values that represent predicted or simulated availability for the resource. The system may employ a selection process that compares the last known actual availability retrieved from the digital log with the various synthetic availability values generated by different models. The comparison may involve evaluating the deviation or similarity between the last known actual availability and each synthetic availability model. Criteria for comparison may include statistical measures, error rates, similarity indices, or thresholds that determine which synthetic availability value is most aligned or accurate relative to the last known actual availability. Based on the comparison criteria, the system selects the synthetic availability value from the plurality of synthetic availabilities that best matches or correlates with the last known actual availability obtained from the digital log. The system may utilize the chosen synthetic availability value as a representation or estimation of the resource's availability for future planning, decision-making, or system operations. It may integrate this synthetic availability value into algorithms, monitoring systems, or resource allocation strategies within the computer network.

The system may continuously refine or update the synthetic availability selection process based on new actual availability data recorded in the digital log, improving the accuracy and reliability of synthetic availability estimations over time.

At step 606, process 600 (e.g., using one or more components described above) may determine an aggregate availability for the first computer network based on the first synthetic availability and the first synthetic availability. For example, the system may determine a first aggregate availability for the first computer network based on the first actual availability and the first synthetic availability.

In some embodiments, determining the first aggregate availability for the first computer network based on the first actual availability and the first synthetic availability may comprise the system aggregating the first cryptographically secure digital asset and the second cryptographically secure digital asset and determining the first aggregate availability based on aggregating the first cryptographically secure digital asset and the second cryptographically secure digital asset. For example, the system may gather or calculate the real-time or historical availability of resources using actual data obtained from monitoring systems or logs. The system may also determine a last known amount of availability at an offline resource. Alternatively or additionally, the system may derive synthetic availability from predictive models, statistical analysis, and/or other algorithms that forecast or estimate resource availability based on historical patterns, trends, and/or predictive factors. The system may consider two cryptographically secure digital assets as indicators of availability. Each asset's value may represent the availability status or a weighted measure reflecting the degree of availability for the corresponding resource. For instance, the first asset's value might represent the actual percentage availability, while the second asset's value signifies a predicted or estimated availability measure. The system may combine or aggregate the values of the two assets (actual and synthetic) to determine the aggregate availability. The system may use mathematical operations (such as addition, averaging, weighted aggregation, or other algorithms) to combine these values and calculate an overall representation of aggregate availability. The system may use the significance or reliability attributed to each asset's availability representation. The system may apply different weights or proportions during aggregation to prioritize one token's influence over the other in determining the aggregate availability. Based on the calculated aggregate availability value, the system assesses whether the network's overall availability meets predefined thresholds, requirements, or criteria for optimal functioning or desired operational levels. If the aggregate availability meets desired criteria, the system may proceed with resource allocation, task execution, or decision-making based on the assessed availability. In case the aggregate availability falls below acceptable levels, the system may trigger contingency plans, alternative resource utilization, or alert mechanisms to mitigate potential risks or issues.

At step 608, process 600 (e.g., using one or more components described above) may receive a request for an action. For example, the system may receive a first request to perform a first blockchain action across the first computer network. In some embodiments, the system may receive the first request to perform the first blockchain action across the first computer network may comprise a system determining that the first blockchain action requests access to the second resource and determining to use the first actual availability to process the first blockchain action.

For example, the process of receiving a request to perform a blockchain action across a computer network involves assessing the action's requirements, including access to resources, and making decisions based on the availability of those resources. The system may receive a request to execute a blockchain action across the computer network. This request may contain information about the action to be performed and the resources required for its execution. The system may examine the details of the blockchain action to identify the resources needed, including access to a second resource and potential dependencies on the availability of other resources. The system may assess the availability status of the required resources. The system may check the actual availability of the first resource (already known or retrievable from logs or real-time monitoring systems) that might be involved in processing the blockchain action. Upon evaluating the actual availability of the first resource, the system may make a determination whether to proceed with using this available resource to process the blockchain action that requests access to the second resource. If the system decides to use the actual availability of the first resource, the system may initiate the processing of the blockchain action, leveraging the available resource to fulfill the action's requirements. Throughout this process, the system maintains logs or records of resource availability, actions performed, decisions made based on resource availability, and the outcome of the blockchain action execution.

In case the first resource's availability changes or if there are unexpected issues during execution, the system may have predefined error-handling mechanisms or contingency plans to manage such situations. The system may continue to monitor for whether a resource is online or offline. For example, the system may determine that the second resource is now online and replace, using a fourth self-executing program, the first synthetic availability with a second actual availability in the digital log. Additionally or alternatively, the system may determine that the first resource is now offline and replace, using a fifth self-executing program, the first actual availability with a second synthetic availability in the digital log. Upon completion of the blockchain action or decision-making process based on resource availability, the system may provide feedback, update status, or generate reports to relevant stakeholders regarding the action's execution and resource utilization.

In some embodiments, determining to use the first actual availability to process the first blockchain action may comprise the system determining that the second resource is offline and, in response to determining that the second resource is offline, determining to use the first aggregate availability to process the first blockchain action. For example, when a system determines that a second resource required for a blockchain action is offline, it can respond by using an aggregate availability derived from multiple other resources to process the blockchain action. To do so, the system may continually monitor the status of various resources, including the second resource necessary for the blockchain action. This monitoring could involve real-time checks, periodic pings, or status updates from network nodes or monitoring systems. The system may detect or receive information indicating that the second resource required for the blockchain action is offline or unavailable. This could be due to maintenance, technical issues, a bank branch being closed (e.g., in a financial services embodiment), and/or other reasons causing the resource to be temporarily inaccessible. Upon detecting the offline status of the second resource, the system may initiate a process to calculate an aggregate availability value. This involves assessing the availability status of a plurality of other resources within the network. The system may compute or aggregate the availability metrics, status, or capabilities of multiple other resources that are online and accessible. It combines this information to derive an aggregate availability value that represents the combined availability of these resources. Using the calculated aggregate availability value, the system may determine whether it is feasible or appropriate to use this combined availability of other resources to process the first blockchain action, compensating for the unavailability of the second resource. If the system determines that the aggregate availability of other resources is sufficient or adequate to handle the blockchain action, the system proceeds to execute the action using the collective capabilities of the available resources. During the execution, the system may dynamically allocate or redistribute availability, liquidity, tasks, load, and/or responsibilities among the available resources to ensure efficient processing of the blockchain action. While the action is being processed using the aggregate availability, the system continues to monitor resource status. It reassesses the situation to determine when the initially offline resource is back online and whether to adjust resource allocation accordingly. Throughout this process, the system maintains logs and records the decision-making process, resource availability details, and action execution outcomes. It may also generate reports or notifications to stakeholders regarding resource utilization and actions taken.

At step 610, process 600 (e.g., using one or more components described above) may process the action using the aggregate availability. For example, the system may process the first blockchain action using the first aggregate availability. In some embodiments, the system may process the first blockchain action using the first aggregate availability by determining a second aggregate availability for the first computer network following the first blockchain action and determining, using a third self-executing program, a second synthetic availability for the second resource following the first blockchain action. For example, following a blockchain action the system may continuously monitor actual and synthetic availability, update availability values as needed, recalculate aggregate availability, and/or adjust resource allocation or decision-making accordingly.

In some embodiments, processing the first blockchain action using the first aggregate availability may comprise the system determining an amount of availability needed to process the first blockchain action. The system may then use the first actual availability to process the first blockchain action. The system may then deduct the amount from the first synthetic availability to determine a second synthetic availability for the second resource. The system may then determine a third synthetic availability for the first resource corresponding to the amount. For example, the system may evaluate the first blockchain action's requirements and determine the amount of availability needed from the resources involved in the action. The system may check the first actual availability, which represents the real-time availability status of the resources involved. It uses this actual availability to process the first blockchain action. After using the actual availability to process the action, the system deducts the amount of availability consumed or utilized from the first synthetic availability corresponding to the resource involved in the action. This deduction adjusts the synthetic availability value to reflect the portion of resources utilized for processing the first blockchain action. The system may recalculate or determine a third synthetic availability value specifically for the first resource based on the amount of availability consumed during the processing of the first blockchain action. This third synthetic availability represents the adjusted availability estimation for the first resource after accounting for the utilization in the processing of the action.

In some embodiments, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

In some embodiments, the first verification may be determined based on an amount for an off-chain record corresponding to the first resource, and the first verification may be received at a first blockchain network via a first oracle. For example, the system may interact with an oracle that has access to off-chain data, such as databases, APIs, or external systems, where the off-chain record corresponding to a specific resource is stored or updated. The system may define conditions or rules specifying that an on-chain action should occur based on certain parameters or data retrieved from the off-chain record. For instance, the condition could be a specific amount or value associated with the resource in the off-chain record. The system may use the oracle to query the off-chain data source and retrieve the relevant information or amount corresponding to the resource. The oracle fetches this data from the off-chain record. Upon receiving the data from the off-chain source, the system may validate and compare it against the predefined conditions or rules set for triggering the on-chain action. If the retrieved amount matches or meets the specified criteria, the validation process confirms that the condition is satisfied. Once the validation confirms that the condition based on the off-chain record's data is met (e.g., a party delivers a good at issue in a transaction, a party paid for a good, a network connection is created, appropriate availability/liquidity is found, etc.), the system triggers the corresponding on-chain action or smart contract function. This action could involve initiating a transaction, updating a smart contract state, executing a programmatic function, or performing any predefined action on the blockchain. The verified on-chain action is broadcast to the blockchain network for execution and inclusion in a block. Miners or validators on the blockchain network process and validate the transaction, ensuring its inclusion in the distributed ledger. After the transaction is confirmed and added to the blockchain, the on-chain action corresponding to the validated off-chain data is executed, thereby reflecting the updated state or result on the blockchain.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
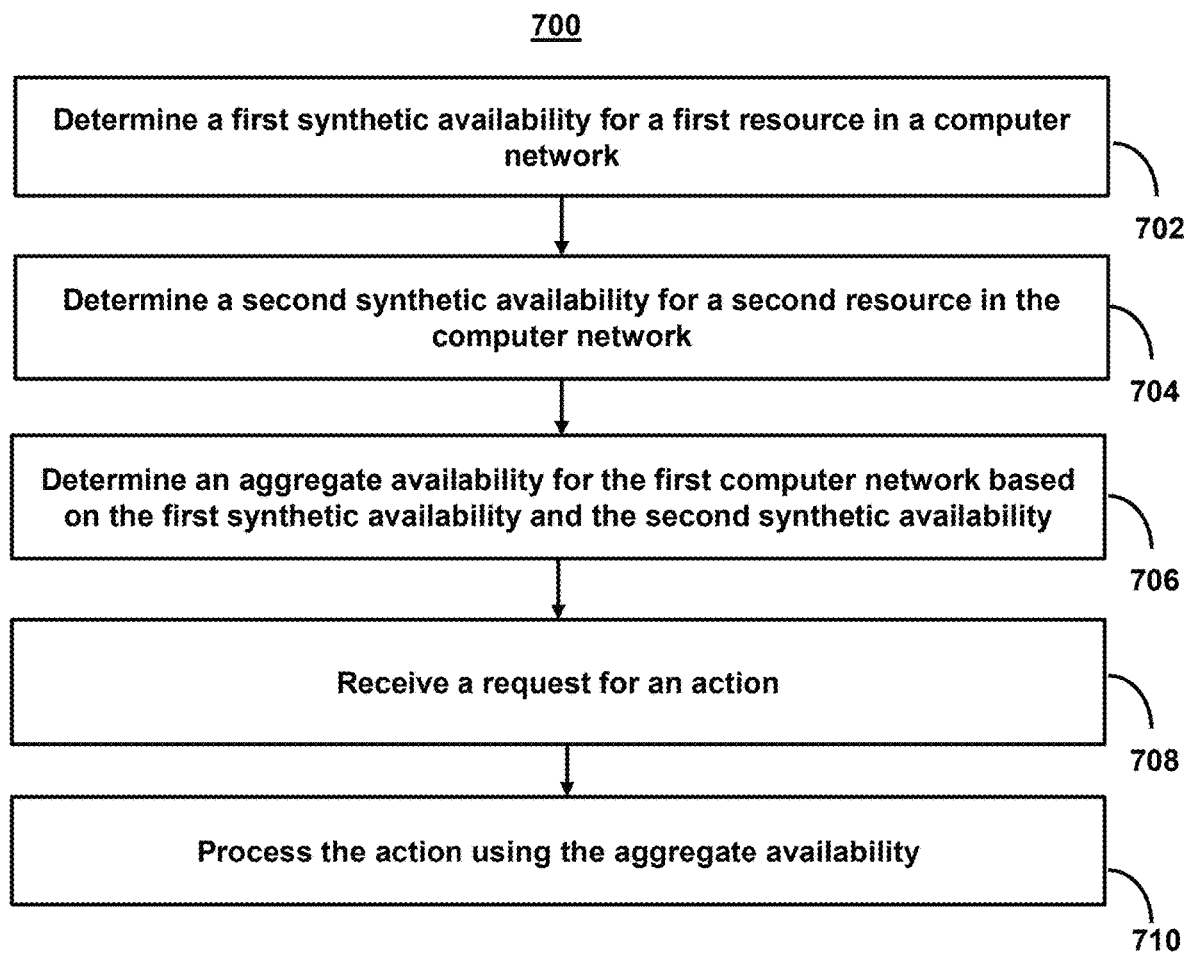
FIG. 7 shows illustrative components for a Retrieval-Augmented Generation (RAG) framework used to support managing resources across global or cloud networks, in accordance with one or more embodiments.

FIG. 7 shows a flowchart of the steps involved in managing global or cloud networks irrespective of resource-readiness, in accordance with one or more embodiments. For example, the system may use process 700 (e.g., as implemented on one or more system components described above) to reduce the amount of computer resource reallocations for services.

At step 702, process 700 (e.g., using one or more components described above) determines a first synthetic availability for a first resource in the computer network. For example, the system may determine, using a first self-executing program, the first synthetic availability for the first resource. The first synthetic availability may be represented by a first cryptographically secure digital asset in the digital log. The first synthetic availability may be related to a first actual availability for the first resource. For example, to reduce the amount of computer resource allocations for a service, the system may determine a synthetic availability of a resource within the first computer network. The synthetic availability may be related to the actual availability of the resource (e.g., characteristics of availability of the resource, bandwidth, processing power, data packet ingestion rate, last known actual availability, or other actual-availability-related information). In some embodiments, where a resource is associated with one or more computational limits, the synthetic availability may represent that the computational limits of the respective resource are maxed out or that the resource is currently unavailable. For example, if the resource has a maximum processing load of 1000 instructions a minute, the synthetic availability may indicate that the resource is currently processing 900 instructions a minute. As another example, the synthetic availability may represent that the resource is currently offline or otherwise unavailable. By determining the synthetic availability for the computing resource, the system may assume a "worst case scenario" to enable the system to allocate resources more efficiently as opposed to simply allocating resources irrespective of future processing loads.

In a financial services embodiment, the system may determine a first synthetic availability (e.g., liquidity) of a bank branch (e.g., resource). For example, as described above, the first computing network may represent a banking network, where each resource of the computing network is a bank branch that is part of that banking network. To enable users (e.g., customers) of bank branches access to assets held in those bank branches irrespective of whether such bank branches are open or closed for business (e.g., available or unavailable), the system may determine a synthetic liquidity of the assets held a respective bank branch. For example, synthetic liquidity may indicate the liquidity of assets (e.g., goods/currency/medium of exchange) associated with a bank branch (or a user account at that bank branch) when the bank branch is closed, unavailable, or otherwise cannot provide access to the assets associated with (e.g., held at) that bank branch. In some embodiments, the system may determine a synthetic liquidity of assets held by a user account at the bank branch. For example, where a user (e.g., customer) is attempting to complete a transaction involving one or more closed bank branches, the system may leverage determined synthetic liquidity of assets (e.g., based on its relation to actual liquidity of the users last known assets prior to the bank branch becoming unavailable) pertaining to the user's account at a given bank branch. By doing so, transactions (e.g., blockchain actions) may be completed even when the bank branch is closed. When the bank branch becomes available (e.g., online, reopens, etc.), the system may replace the synthetic availability with actual availability for the user's account and/or bank branch.

At step 704, process 700 (e.g., using one or more components described above) determines a second synthetic availability for a second resource in the computer network. For example, the system may determine, using a second self-executing program, the second synthetic availability for the second resource. The second synthetic availability may be represented by a second cryptographically secure digital asset in the digital log. The second synthetic availability may be related to a second actual availability for the second resource. For example, similar to the discussion above, the system may determine a synthetic availability of a second resource (or a resource related to a user account, such as when a resource is available through a cloud computing provider, and the user uses an account to access a given resource). By doing so, the system may determine the synthetic availability of resources within a computing network to allocate resources for a service. In a financial services embodiment, the system may determine the synthetic availability (e.g., liquidity) of a bank branch (or liquidity of assets held by a user account at that bank branch) to complete transactions irrespective of whether the bank branch is available or not.

In a financial services embodiment, a user (e.g., a customer) may want to complete a transaction (e.g., a blockchain action) using assets that the customer holds that are held at a first bank branch (e.g., resource) and a second bank branch (e.g., a second resource). For example, the customer may have a user account at each of the first bank branch and the second bank branch. The first bank branch may hold a first set of assets (e.g., a first stock, a first bond, a first amount of cryptocurrency, and a first amount of fiat currency). The system may determine a first synthetic availability (e.g., liquidity) of the first set of assets. For example, the first synthetic availability may be determined based on a combination of the first set of assets. The second bank branch may hold a second set of assets (e.g., a second amount of fiat currency, and a second amount of a precious metal). The system may determine a second synthetic availability (e.g., liquidity) of the second set of assets. For example, the second synthetic availability may be determined based on a combination of the second set of assets. The system determines such synthetic availabilities to enable the user to complete a transaction irrespective of resource readiness (e.g., the bank branches being open or closed). As will be discussed later, the system may determine a first aggregate availability (e.g., an aggregate liquidity) of the resources (e.g., the bank branches, the customer's aggregate liquidity of assets held at the bank branches at which the user has an account) to complete the transaction. In this way, the system enables the user to complete a transaction using synthetic liquidity of his/her assets at any given point in time.

In some embodiments, determining (i) the first synthetic availability for the first resource in the first computer network, and (ii) the second synthetic availability for the second resource in the first computer network may be determined by an artificial intelligence model. For example, as each service has its own set of requirements, and each resource to be allocated to a service has its own set of availability characteristics (a set of limitations, a set of requirements, etc.), the system may leverage an artificial intelligence model to determine synthetic availabilities for resources within the computing network. In some embodiments, the system may determine synthetic availabilities for resources that are unavailable (e.g., offline). In some embodiments, the system may determine synthetic availabilities for resources that are available (e.g., online). For example, the system may identify a set of availability characteristics associated with a resource. The availability characteristics may be bandwidth information (e.g., maximum data transfer rates, congestion, etc.), latency information (e.g., propagation delay, queuing delay, processing delay, network jitter, etc.), processing power information (e.g., max throughput, routing table size, firewall limitations, intrusion detection system limitations, intrusion prevention system limitations, etc.), memory information (e.g., buffer size, state table size), encryption/decryption information (e.g., encryption/decryption protocols, encryption/decryption standards), scalability information (e.g., addressing limitations, address size information, address availability information, etc.), availability status information (e.g., online, offline, etc.), or other characteristics pertaining to a resource.

The system may provide the set of availability characteristics associated with the first resource to an artificial intelligence model trained to determine synthetic availabilities of resources. For example, as described above, the system may provide the set of availability characteristics associated with the first resource as input to the artificial intelligence model. The artificial intelligence model may generate an output indicating the first synthetic availability of the first resource. The system may also provide the set of availability characteristics associated with the second resource to the artificial intelligence model trained to determine synthetic availabilities of resources. For example, the system may provide the set of availability characteristics associated with the second resource as input to the artificial intelligence model. The artificial intelligence model may generate an output indicating the second synthetic availability of the second resource. By doing so, the system may generate synthetic availabilities of the resources to be used when processing a blockchain action (e.g., allocating resources to facilitate a service).

In a financial services embodiment, the availability characteristics may refer to a characteristic of an asset (e.g., good/currency/medium of exchange) associated with a bank branch (or a user account at that bank branch). In such embodiment, the availability characteristics may be issuing authority information (e.g., a recognized government or central monetary authority within a country), legal tender information (e.g., whether it is authorized by the government for settling debts, transactions, and payments within or outside of the country's borders), denomination and/or amount information, physical form (e.g., bank notes and coins), type (e.g., fiat, commodity-backed), security features (e.g., printed security features, cryptocurrency security protocol information, encryption standards), exchange rate information, stability information, regulation information, market demand information, supply information, volatility information, utility information, divisibility information, availability status (e.g., ability to be retrieved or used in transaction, whether the bank branch holding the asset is open), or other information related to an asset. Such characteristics may be used to determine a synthetic liquidity (or other synthetic valuation) of the bank branch based on the availability characteristics of assets held at the bank branch. By doing so, a value may be accorded to liquidity of a bank branch (or a user's account) even when the bank branch is currently closed, thereby enabling users to complete transactions when the bank branch is currently unavailable.

Such availability characteristics may be retrieved from a database storing the availability characteristics, via real-time network monitoring, performing web scraping, or identification by another process. The system may determine a synthetic availability (e.g., for the first or second resource) by providing the set of availability characteristics to an artificial intelligence model trained to determine synthetic availabilities of resources. For example, the artificial intelligence model trained to determine synthetic availabilities of resources may be a supervised machine learning model. In other embodiments, the artificial intelligence model trained to determine synthetic availabilities of resources may be an unsupervised machine learning model. The system may provide the set of availability characteristics as input to the artificial intelligence model, and the artificial intelligence model may generate an output indicating the synthetic availability of a resource (e.g., the first or second resource).

In some embodiments, the system may determine the first synthetic availability (e.g., for the first resource) and the second synthetic availability (e.g., the for the second resource) by retrieving a last known actual availability for each of the first resource and the second resource. For example, the system may retrieve the last known actual availability for the first resource from the digital log and may also retrieve the last known actual availability for the second resource from the digital log. The system may then select the first synthetic availability from a plurality of synthetic availabilities based on the last known actual availability of the first resource. The system may also select the second synthetic availability from the plurality of synthetic availabilities based on the last known actual availability of the second resource. For example, the system may retrieve the most recent or last known actual availabilities (e.g., for the first resource and the second resource) to base a selection of the first synthetic availability and the second synthetic availability on. For example, in some embodiments, the plurality of synthetic availabilities may be predetermined, forecast availabilities corresponding to resources of the computing network. The system may select a synthetic availability (e.g., first and second synthetic availability) based on the last known actual availability for the respective resources of the computer network. By doing so, the system may utilize the chosen synthetic availability value as a representation or estimation of the resource's availability for future planning, decision-making, or system operations.

At step 706, process 700 (e.g., using one or more components described above) determines an aggregate availability for the first computer network. For example, the system may determine an aggregate availability for the first computer network based on the first synthetic availability and the second synthetic availability.

In some embodiments, the system may determine, using an artificial intelligence model, a first aggregate availability for the first computer network based on the first synthetic availability and the second synthetic availability. For example, the system may provide the first synthetic availability and the second synthetic availability, as input, to an artificial intelligence model trained to determine (or otherwise generate) an aggregate availability for a computer network (e.g., the first computer network). In response to the system providing the first synthetic availability and the second synthetic availability as input to the artificial intelligence model, the artificial intelligence model may generate an output. For example, the output may be an aggregate availability (e.g., the first aggregate availability) based on the first synthetic availability and the second synthetic availability. For example, the system may generate an aggregate availability to determine a network-wide availability. For instance, the aggregate availability may represent an availability of resources that may be allocated (e.g., used) to provide a service (e.g., resource allocation, transaction, etc.) across the first computer network. Due to the complex nature of service requirements and resource characteristics, the artificial intelligence model may be trained to determine an overall availability of the resources that are able to be used in connection with providing the service. As an example, by using an aggregate availability (e.g., based on synthetic/actual availabilities) to provide a service (e.g., blockchain action, resource allocation, transaction, etc.), the system may reduce risk (e.g., of error-prone allocations, or error-prone transactions). For instance, in a financial services embodiment, the system may reduce the risk of the synthetic liquidity (e.g., to be used when completing the transaction) from deviating substantially (e.g., exceeding a threshold value) from an actual liquidity when a given resource (e.g., bank branch) that is currently unavailable (e.g., closed at the time of the transaction) becomes available (e.g., opens for business).

In some embodiments, determining the first aggregate availability may be based on an availability status of the resources. For example, the system may detect that a first resource is currently online, and the second resource is currently offline. The system may detect the availability status of the resources via one or more network monitoring systems, sensors, or tools within the network infrastructure to continuously observe and detect the actual availability of resources. In response to detecting that a resource is currently online, the system may determine an actual availability for the resource. For example, the system may determine a first actual availability for a first resource in a manner as described above. By doing so, the system may use the most up-to-date information when generating an aggregate availability. For example, the system may determine, using the artificial intelligence model trained to determine aggregate availabilities, the first aggregate availability for the first computer network based on the first actual availability and the second synthetic availability.

In some embodiments, the first aggregate availability may be determined using an artificial intelligence model within a RAG framework. For example, the artificial intelligence model (e.g., first artificial intelligence model) may be an LLM that is part of a RAG framework (e.g., as described above). For example, the system may obtain the first synthetic availability for the first resource and the second availability for the second resource (e.g., from a database storing the determined first and second synthetic availabilities). The system may provide (i) the first synthetic availability and (ii) the second synthetic availability to the first artificial intelligence model as input. The first artificial intelligence model may be trained to generate aggregate availabilities. The first artificial intelligence model may also be communicatively coupled to a retrieval component configured to retrieve actual availabilities related to resources of the first computer network. For example, the LLM may determine whether a resource is currently available (e.g., using the network monitoring systems, sensors, or tools). If a resource is online, the LLM may access a database storing actual availabilities for resources (e.g., online resources) to be used when generating the aggregate availability. The system may then receive, from the first artificial intelligence model, the first aggregate availability for the first computer network. For example, the first aggregate availability may be based on retrieved actual availabilities for online resources. By doing so, the system may enhance aggregate availability determinations leveraging the most up-to-date information. In this way, the system may efficiently allocate resources to provide a service as the network's overall availability reflects current, real-time resource availability information that is supplemented with synthetic availabilities of the network.

In some embodiments, the first artificial intelligence model may be communicatively coupled to a retrieval component configured to retrieve weighted availabilities related to resources of the first computer network. For example, as described above, the LLM may access a database storing a set of weights associated with resources of the first computer network. For instance, one resource may be associated with a weight that is greater than the weight of another resource. In a financial services embodiment, the system may weight a type of availability (e.g., fiat cash) greater than that of another type of availability (e.g., stock). By doing so, the system may generate the first aggregate availability based on weighted availability of resources of the first computer network. In this way, by leveraging an LLM within a RAG framework, the system may reduce risk associated with completing a transaction. For example, the aggregate availability, as determined by the LLM within the RAG framework may reduce the risk of the synthetic liquidity (e.g., to be used when completing the transaction) from deviating substantially (e.g., exceeding a threshold value) from an actual liquidity when a given resource (e.g., bank branch) that is currently unavailable (e.g., closed at the time of the transaction) becomes available (e.g., opens for business).

At step 708, process 700 (e.g., using or more components described above) receives a request for an action. For example, the system may receive a first request to perform a first blockchain action across the first computer network. The request may be received from a user (e.g., a programmer, a computer engineer, a computer network architect, a customer, etc.). The request may be submitted via a user device (e.g., a mobile device, a smart phone, a laptop computer, etc.). The action (or alternatively, blockchain action) may be a resource allocation for providing a service. For example, a computer engineer may provide a request indicating that they would like to provide a given service using computing resources within the first computing network. In a financial services embodiment, the action may be a transaction involving a banking network. For example, the transaction request may be provided by a customer indicating that they would like to purchase a vehicle using their assets held at various bank branches within the banking network. For example, the customer may have an account at a first bank branch and another account at a second bank branch.

The action (or alternatively, the request for an action) may include a set of action characteristics. For example, in a computing network embodiment, the action characteristics may indicate a type of blockchain action (e.g., an allocation of computational resources), a service identifier (e.g., a network service to be provided), a timestamp (e.g., a timestamp indicating when the service is to be provided), an entity account identifier (e.g., an identifier indicating a user to which the service is to be provided for, a company identifier indicating a company to which the service is to be provided for, etc.), or other characteristics of an action to be performed. In a financial services embodiment, the action characteristics may be transaction characteristics. For example, the transaction characteristics may include an amount (e.g., denomination amount, monetary amount, amount of currency, amount of an asset, etc.), one or more conditions of the transaction, a type of resource (e.g., a type of asset, such as a stock, bond, currency, crypto currency, fiat money, etc.), a time stamp (e.g., a time at which the transaction is to be conducted), a payer user-account identifier (e.g., an account identifier identifying the payer of the transaction), a beneficiary user-account identifier (e.g., an account identifier identifying the beneficiary of the transaction), or other transaction characteristic information.

In some embodiments, the system may select a cryptographically secure digital asset based on action characteristics (e.g., of the first blockchain action). For example, as described above, the system may determine one or more characteristics of the first blockchain action. The system may provide the one or more characteristics, as input, to an artificial intelligence model trained to select cryptographically secure digital assets based on (i) action characteristics, and (ii) cryptographically secure digital asset characteristics. For example, in a computing network embodiment, each service may have its own set of requirements for providing the service, and each resource in the computing network may be associated with its own set of requirements (e.g., processing, memory, throughput limits). As such, the system may select a cryptographically secure digital asset based on action characteristics of the first blockchain action to enhance providing of such services by leveraging availability information of resources. For example, because the cryptographically secure digital assets may represent a value of availability corresponding to resources within the computing network, the system may allocate the correct amount and type of resources to provide a service within the computing network.

However, such efficient allocation (or usage of resources) is dependent on the system's selection of cryptographically secure digital assets to represent the availabilities of the resources of the computing network. As such, the system may leverage a trained artificial intelligence model that is trained on historically selected cryptographically secure digital assets with respect to historical action characteristics (e.g., of historical blockchain actions.). For example, the historically selected cryptographically secure digital assets and historical action characteristics may be verified by one or more subject-matter-experts, or be verified via a success indicator (e.g., a label indicating the respective cryptographically secure digital assets and historical action characteristics resulted in a successful operation/service being provided). As such, upon providing the one or more characteristics to the artificial intelligence model, the system may receive, from the artificial intelligence model, the first cryptographically secure digital asset. For example, the system may select the first cryptographically secure digital asset based on receiving the first cryptographically secure digital asset from the artificial intelligence model.

In some embodiments, the system may recommend an alternative blockchain action to be processed. For example, the system may receive a first recommendation indicating an alternative blockchain action to be processed by providing (i) a first request to perform a the first blockchain action, and (ii) the first aggregate availability for the first computer network as input to an artificial intelligence model trained to recommend blockchain actions. The artificial intelligence model may generate an output including a recommended alternative blockchain action to be performed based on characteristics of the first blockchain action and the first aggregate availability. In a financial services embodiment, the first aggregate availability (e.g., aggregate liquidity) of a customer's assets may satisfy a risk threshold related to an amount required for the transaction (e.g., the first blockchain action). For example, the risk threshold may indicate a predetermined percentage of aggregate availability required to be present relative to the transaction amount (e.g., of the blockchain request). In other words, if the transaction to be completed is for $100,000, the risk threshold is 10%, and the aggregate availability (e.g., of the customer's assets) is $105,000, then the risk threshold may fail to be satisfied.

For example, because there is not 10% of aggregate availability left over (e.g., to act as a safety net) for completing the transaction, the system may determine that the risk threshold is failed to be satisfied and may trigger the system to generate an alternative transaction to be generated using the aggregate availability that the customer has. For example, the artificial intelligence model may generate an alternative (e.g., recommended) transaction (e.g., blockchain action) to be processed in lieu of the original blockchain action. By doing so, the system may reduce risk of incompatible blockchain actions from being processed, thereby reducing wasted computational resources expended attempting to process an erroneous/incompatible blockchain action. Moreover, in this way, the system may reduce the risk being able to properly balance the digital log when resources become online (or otherwise available). For example, because the aggregate availability may involve synthetic (e.g., predicted/placeholder availability), the system may protect the integrity of the blockchain action (e.g., transaction) by allowing blockchain actions to be processed when they satisfy the risk threshold (e.g., to ensure actual availability may be correctly exchanged for the synthetic availability when resources become online).

The artificial intelligence model trained to recommend blockchain actions may be an LLM within a RAG framework. For example, the artificial intelligence model may be trained based on a set of training data including training blockchain actions and aggregate availabilities of a computing network. For example, the system may train the artificial intelligence model by providing the set of training data to the LLM during a training routine. The LLM may be communicatively coupled to a retrieval component configured to retrieve (i) similar blockchain actions historically processed by the first computer network successfully, and (ii) similar aggregate availabilities corresponding the similar blockchain actions historically processed by the first computer network successfully. The retrieved information may be provided to the LLM to be processed. The system may receive, from the LLM during the training routine, a set of candidate alternative blockchain actions (e.g., recommended alternative blockchain actions) based on the similar blockchain actions and similar aggregate availabilities. For instance, the candidate alternative blockchain actions may be generated based on the information retrieved (e.g., from a database) via the retrieval component. By doing so, the system may recommend a set of alternative blockchain actions to be processed. Additionally or alternatively, in response to receiving the set of candidate alternative blockchain actions, the system may provide a message, during the training routine, to the LLM including an accuracy value corresponding to each candidate alternative blockchain action of the set of candidate alternative blockchain actions (and/or the aggregate availabilities corresponding to such candidate alternative blockchain actions). For example, a subject-matter expert may fine tune the LLM's recommendations by providing feedback indicating whether the set of candidate alternative blockchain actions are accurate, or otherwise a good recommendation based on the determined aggregate availability of resources of the first computing network.

At step 710, process 700 (e.g., using or more components described above) processes the action using the aggregate availability. For example, the system may process the first blockchain action using the first aggregate availability.

In some embodiments, the system may replace the synthetic availability with actual availability in the digital log. For example, the system may determine, using the one or more self-executing programs, a third synthetic availability for the first resource following the first blockchain action. For example, where the first blockchain action is to allocate resources for a given service, the system may determine that the first resource is now online. The system may then replace, using the one or more self-executing programs, the third synthetic availability with third actual availability in the digital log. For example, the system may replace the synthetic availability of the first resource in the digital log with the actual availability for the first resource. For instance, replacing synthetic availability represented by digital assets with actual availability represented by detected availability in the digital log involved transitioning from a theoretical or assumed state of availability (synthetic availability) to the real-time, observed, or measured state of availability (actual availability) of resources or assets within a system. As such, upon detecting that the first resource is online (e.g., following the first blockchain action to allocate resources for a given service), the system may replace the synthetic availability for the first resource with actual availability of the first resource in the digital log. By doing so, the system may maintain a real-time ledger of resource availability efficiently determine which resources should be used to process future requests.

In a financial services embodiment, where the first blockchain action is a transaction, and the resource is one or more banks, the system may replace the synthetic availability (e.g., a synthetic liquidity) with actual availability (e.g., actual liquidity) in the digital log. For example, following the first blockchain action, when the system determines that a bank branch is currently open, the system may replace the synthetic liquidity in the digital log with actual liquidity (e.g., as determined via one or more verification processes as described above). By doing so, the system may balance the digital log (or other ledger) to reflect the actual availability (or liquidity) of the bank branch.

In some embodiments, the synthetic availability and the actual availability may represent bank-branch-level availabilities. For example, the synthetic availability may be a pool of synthetic availability of the bank branch when the bank branch is closed (or otherwise unavailable) and the actual availability may be a pool of actual availability of the bank branch when the bank branch is open (or otherwise online). For instance, such pools may pool together the respective availabilities of customer accounts associated with the respective bank branch.

In some embodiments, the synthetic availability and the actual availability may represent customer-level availabilities. For example, the synthetic availability may be a customer's synthetic availability (e.g., synthetic liquidity) of assets at that bank branch, and the actual availability may be the customer's actual availability (e.g., actual availability) of assets at that bank branch. In this way, customer's may have access to all of their assets irrespective of bank branch's being open (e.g., online, available, etc.) or closed (e.g., offline, unavailable, etc.) to be used when performing one or more transactions.

In some embodiments, the system may determine an amount of synthetic availability used to process the blockchain action and replace the synthetic availability with actual availability using a self-executing program. In a financial services embodiment, in one scenario, where the aggregate availability comprises a first synthetic availability corresponding to a first bank branch and a second synthetic availability corresponding to a second bank branch, the system may replace the first and second synthetic availabilities with actual availabilities. For example, a customer may purchase a vehicle for $100,000 using a first amount of synthetic liquidity from the first bank branch (e.g., $40,000) and a second amount of synthetic liquidity from the second bank branch (e.g., $60,000). The first amount and second amount of synthetic liquidity may be associated with an amount of actual availability (e.g., liquidity) corresponding to the customer's respective accounts at each of the first and second bank branches. Since the aggregate availability in such scenario comprises synthetic availabilities, when the respective resources become available (e.g., online, open for business, etc.), the system may replace the first and second synthetic availabilities with a first and second actual availability via the self-executing program. For example, the system may deduct the amount of first synthetic availability from an amount of actual availability that the user has in their account at the first bank branch. For instance, since the first amount of synthetic liquidity is $40,000 and was used to process the transaction, the self-executing program may deduct $40,000 from the user's financial account at the first bank branch to balance the digital log. Additionally, the system may deduct $60,000 from the user's financial account at the second bank branch to balance the digital log. By doing so, the system enables transactions to occur irrespective of resource availability, thereby enhancing the user experience.

In another scenario, where the aggregate availability comprises a first synthetic availability corresponding to a first bank branch and a first actual availability corresponding to a second bank branch, the system may replace the first synthetic availability with third actual availability using a self-executing program. For example, a customer may purchase a vehicle for $100,000 using a first amount of synthetic liquidity from the first bank branch (e.g., $40,000) and a second amount of actual liquidity from the second bank branch (e.g., $60,000). The first amount of synthetic liquidity may be associated with an amount of actual availability (e.g., liquidity) corresponding to the customer's account at each of the first bank branches (e.g., due to the first bank branch being closed). In such scenario, the system may deduct $60,000 from the user's account at the second bank branch (e.g., using a self-executing program). The system may also deduct, using a self-executing program, the amount of synthetic liquidity used to process the transaction (e.g., $40,000) from an amount of actual availability (e.g., liquidity) from user's account at the first bank branch when the first bank branch becomes available (e.g., online, opens, etc.). By doing so, the system may use portions of synthetic and actual availability to process transactions when one or more bank branches are closed.

In some embodiments, the system may determine an updated amount of synthetic availability following the blockchain action. For example, because the amount of synthetic availability used to process a blockchain action may differ between (i) the time at which the blockchain action was processed, and (ii) the time at which a corresponding resource becomes available, the system may determine an updated amount of synthetic availability used to process the blockchain action when a resource becomes online. For example, in a financial services embodiment, a blockchain action may be a transaction to purchase a home for $250,000, and the aggregate availability used to process the transaction includes (i) a first amount of synthetic liquidity from a customer's account at a first bank branch of $200,000, and (ii) a second amount of actual liquidity from the customer's account at a second bank branch of $100,000. The system may detect that the first bank branch is online. The system may then determine, using a third self-executing program, a second amount of synthetic liquidity corresponding to the first amount of synthetic liquidity. For example, from the time that the transaction was processed, the determined first amount of synthetic liquidity used to determine the first aggregate availability may have changed with respect to when the resource (e.g., first bank branch) opens. As such, the system may determine an updated amount of synthetic availability, using a self-executing program, corresponding to the first amount of synthetic liquidity when the first bank branch is detected to be online. For example, the updated amount of synthetic availability may now reflect a value of $210,000.

In some embodiments, a user may specify (e.g., via a user interface) which resources they want to use to complete the blockchain action, and an amount of resources they would like to use. For example, a customer may specify to use all available assets (or a portion thereof) from a given bank branch to complete the transaction, and to supplement the transaction using assets held at other bank branches. For example, continuing with the example above, the customer may specify to use all available assets at the first bank branch to process the transaction. If there are not sufficient assets in the user's account at the first bank branch, the system may supplement the transaction by using funds at another bank branch (e.g., the second bank branch), whether synthetic or actual, to complete the transaction.

Continuing with the example above, the system may replace, using a self-executing program, the updated amount of synthetic availability (e.g., $210,000) with actual availability in the digital log. For example, because the value of the customer's assets being held at the first bank branch may have changed to this updated value, and the customer specified to use all available assets from the first bank branch, then the system may replace the updated amount of synthetic availability with a corresponding amount of actual availability in the digital log. For example, the system may deduct $210,000 of actual liquidity of the user's assets from the customer's account at the first bank branch and may deduct $40,000 of actual liquidity of the user's assets from the customer's account at the second bank branch.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
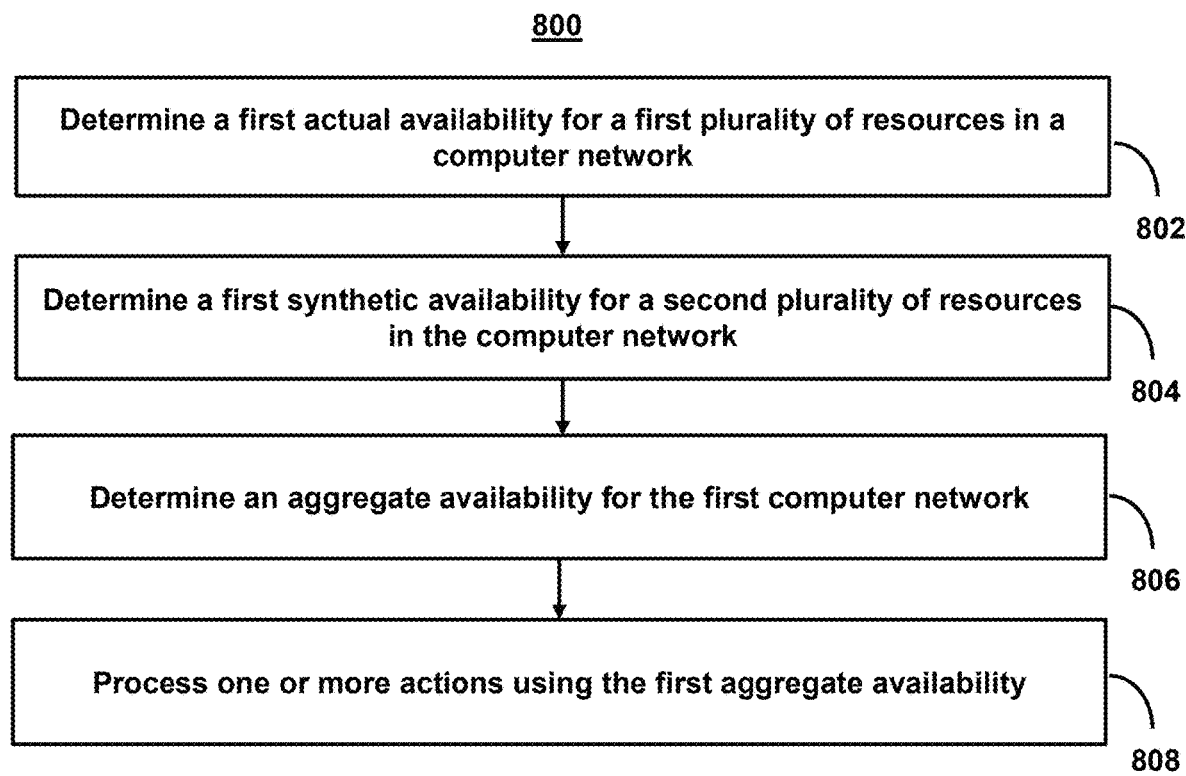
FIG. 8 shows a flowchart of the steps involved in managing global or cloud networks with using a plurality of resources, in accordance with one or more embodiments.

FIG. 8 shows a flowchart of the steps involved in managing global or cloud networks using a plurality of resources, in accordance with one or more embodiments. For example, the system may use process 800 (e.g., as implemented on one or more system components described above) to allocate resources to a service by supplementing actual availability of resources with synthetic availability of resources.

At step 802, process 800 (e.g., using one or more components described above) determines the first actual availability for a first plurality of resources in a computer network. For example, the system may determine, using a first self-executing program, a first actual availability for a first plurality of resources in a first computer network. The first plurality of resources may be currently online, and the first actual availability is represented by a first cryptographically secure digital asset(s) in a digital log. For example, the system may determine a set of actual availabilities corresponding to a first plurality of resources. For example, a first resource, a second resource, and a third resource may be part of the first plurality of resources. The system may determine a first actual availability for the first plurality of resources by adding (or otherwise combining) actual availabilities of each of the first, second, and third resources together. For example, the system may determine the actual availabilities corresponding to each of the first, second, and third resources in a manner that is the same or similar to that as described in other embodiments herein.

At step 804, process 800 (e.g., using one or more components described above) determines a first synthetic availability for a second plurality of resources in the computer network. For example, the system may determine, using a second self-executing program, a first synthetic availability for a second plurality of resources in the first computer network. The second plurality of resources may be currently offline (or otherwise unavailable), and the first synthetic availability may be represented by a second cryptographically secure digital asset(s). For example, the system may determine a set of synthetic availabilities corresponding to a second plurality of resources. For example, a fourth resource, a fifth resource, and a sixth resource may be part of the second plurality of resources. The system may determine a first synthetic availability for the second plurality of resources by adding (or otherwise combining) synthetic availabilities of each of the fourth, fifth, and sixth resources together. For example, the system may determine the synthetic availabilities corresponding to each of the fourth, fifth, and sixth resources in a manner that is the same or similar to that as described herein. By doing so, the system may determine a global availability of synthetic availability of (e.g., placeholder availability) resources that are currently unavailable to be used to facilitate one or more actions (e.g., allocate resources, conduct a transaction, etc.).

In some embodiments, the system may determine the first synthetic availability for the second plurality of resources in the first computer network based on a last known actual availability. For example, the system may retrieve a last known actual availability for each of the second plurality of resources from the digital log. Where the second plurality of resources includes a fourth resource, a fifth resource, and a sixth resource, the system may retrieve a last known availability for each of the fourth resource, the fifth resource, and the sixth resource. The system may combine (e.g., aggregate, add, append, etc.) the last known availabilities for each of the fourth resource, the fifth resource, and the sixth resource. The system may select the first synthetic availability from a plurality of synthetic availabilities. For example, the system may select the first synthetic availability from a plurality of synthetic availabilities based on the last known actual availability for each of the second plurality of resources. In some embodiments, the system may select the first synthetic availability from the plurality of synthetic availabilities based on the aggregated last known availabilities for each of the second plurality of resources. In other embodiments, the system may select a synthetic availability from the plurality of synthetic availabilities for each of the second plurality of resources, and then aggregate each of the selected synthetic availabilities of the second plurality of resources to determine the first synthetic availability.

At step 806, process 800 (e.g., using one or more components described above) determines an aggregate availability for the first computer network. For example, the system may determine a first aggregate availability for the first computer network based on the first actual availability and the first synthetic availability to process a plurality of blockchain actions. For instance, the system may determine the first aggregate availability for the first computer network in a manner that is the same or similar to that as described herein. By doing so, the system may determine a network-wide availability of resources for performing or otherwise facilitating an action.

In some embodiments, the first aggregate availability may be used to process a plurality of blockchain actions. For example, the plurality of blockchain actions may be a set of transactions. For instance, the system may determine an amount of availability for all online resources (e.g., open bank branches) and offline resources (closed bank branches). The system may use the determined amounts of availability to determine the aggregate availability, which may reflect a combined availability for all online and offline resources within the computer network. Additionally or alternatively, the first aggregate availability may reflect a combined availability for all online and offline resources within the computer network that is associated with a user's account. For example, at the time a given transaction (or set of transactions) is performed, the system may determine the first aggregate availability based on (i) assets associated with a customer's account from the first, second, and third resources (e.g., the first actual availability), and (ii) assets associated with the customer's account from the fourth, fifth, and sixth resources (e.g., the first synthetic availability).

In some embodiments, the system may determine the first aggregate availability based on a first artificial intelligence model. For example, the system may detect that (i) the first plurality of resources is currently online, and (ii) the second plurality of resources are currently offline. In response to detecting that the first plurality of resources are currently online, the system may determine the first actual availability for the first plurality of resources. For example, the system may obtain the first actual availability for the first plurality of resources from a database as determined in step 802 above. The system may then determine, using the first artificial intelligence model, the first aggregate availability for the first computer network based on the first actual availability and the first synthetic availability. For example, the system may provide the first actual availability and the first synthetic availability as input to the first artificial intelligence model in a manner that is the same as or similar to that as described in step 706 of process 700 (FIG. 7) to determine the first aggregate availability of the first computer network.

At step 808, process 800 (e.g., using one or more components described above) processes one or more actions using the first aggregate availability. For example, the system may process one or more of the plurality of blockchain actions using the first aggregate availability. The system may process the one or more of the plurality of blockchain actions in a manner that is similar to or the same as that described herein. For example, as opposed to using an aggregate availability of one or more indicated resources (e.g., a first resource, the second resource, etc.), the system may process one or more blockchain actions using a global availability of the entire computing network. In other words, the system may determine a total availability of all resources within the computing network (e.g., based on actual and synthetic availabilities of all respective online/offline resources) to process a blockchain action. By doing so, the system may facilitate one or more services (e.g., allocation of resources, transactions, etc.) irrespective of resource readiness using a globally determined availability.

In some embodiments, the system may determine a processing amount to be used for processing the plurality of blockchain actions. For example, the system may determine an amount of availability needed to process the plurality of blockchain actions. In some embodiments, the system may determine an amount of availability needed to process each blockchain action of the plurality of blockchain actions and aggregate each amount of availability needed to determine an overall amount of availability needed to process the plurality of blockchain actions. For example, the system may determine the amount of availability needed to process the plurality of blockchain actions based on the action characteristics of the plurality of blockchain actions. For example, where the plurality of blockchain actions is a plurality of transactions, the system may aggregate the transaction amounts (e.g., from the transaction characteristics) together to determine the amount of availability needed to process the plurality of blockchain actions.

The system may then determine that the first actual availability fails to satisfy the amount of availability needed to process the plurality of blockchain actions. For example, the system may determine that the first actual availability is less than that of the amount of availability needed to process the plurality of blockchain actions. The system may then determine an amount of supplemental availability needed to process the plurality of blockchain actions. For example, the system may deduct (e.g., subtract) the first actual availability from the amount of availability needed to process the plurality of blockchain actions. The difference (e.g., after the deduction) may reflect the amount of supplemental availability needed to process the plurality of blockchain actions. For example, in a financial services embodiment, where the amount of availability needed to process the plurality of blockchain actions is $20,000, and the first amount of actual liquidity is $14,000, then the system may determine that the amount of supplemental availability needed to process the plurality of blockchain actions (e.g., a transaction) is $6,000.

The system may then determine a second synthetic availability corresponding to the amount of supplemental availability. For example, the system may determine that $6,000 of synthetic liquidity is needed to process the plurality of blockchain actions. The system may then generate a processing amount, based on the first actual availability and the second synthetic availability, to process the plurality of blockchain actions. For example, the system may aggregate the first actual availability and the second synthetic availability to be used to process the plurality of blockchain actions. For instance, the system may use the first actual availability and the second synthetic availability in processing the plurality of blockchain actions. By doing so, the system may enable processing of blockchain actions that are supplemented by synthetic availabilities in lieu of automatically denying blockchain actions where actual availability of a resource is unable to be used. In this way, blockchain actions may be performed irrespective of current resource readiness, thereby enhancing the user experience.

In some embodiments, the system may replace synthetic availabilities with actual availabilities. For example, the system may determine that a second resource of the second plurality of resources is now online (e.g., via one or more network monitoring sensors or tools). The system may then determine a third synthetic availability of the second resource used to process the plurality of blockchain actions. For example, the system may determine how much synthetic availability of a given resource of the plurality of second resources was used to process the plurality of blockchain actions. For example, following the financial services embodiment above, the system may determine that $2,000 of synthetic liquidity was used from a given bank branch (e.g., of the $6,000) to process the plurality of blockchain actions. The system may then replace, using a self-executing program, the third synthetic availability with a second actual availability in the digital log (e.g., –$2,000). By doing so, the system may balance the digital log to reflect a current status of actual availability for the resource following the processing of blockchain actions, thereby providing the most up-to-date information for facilitating future blockchain actions or services.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

Figure 9:
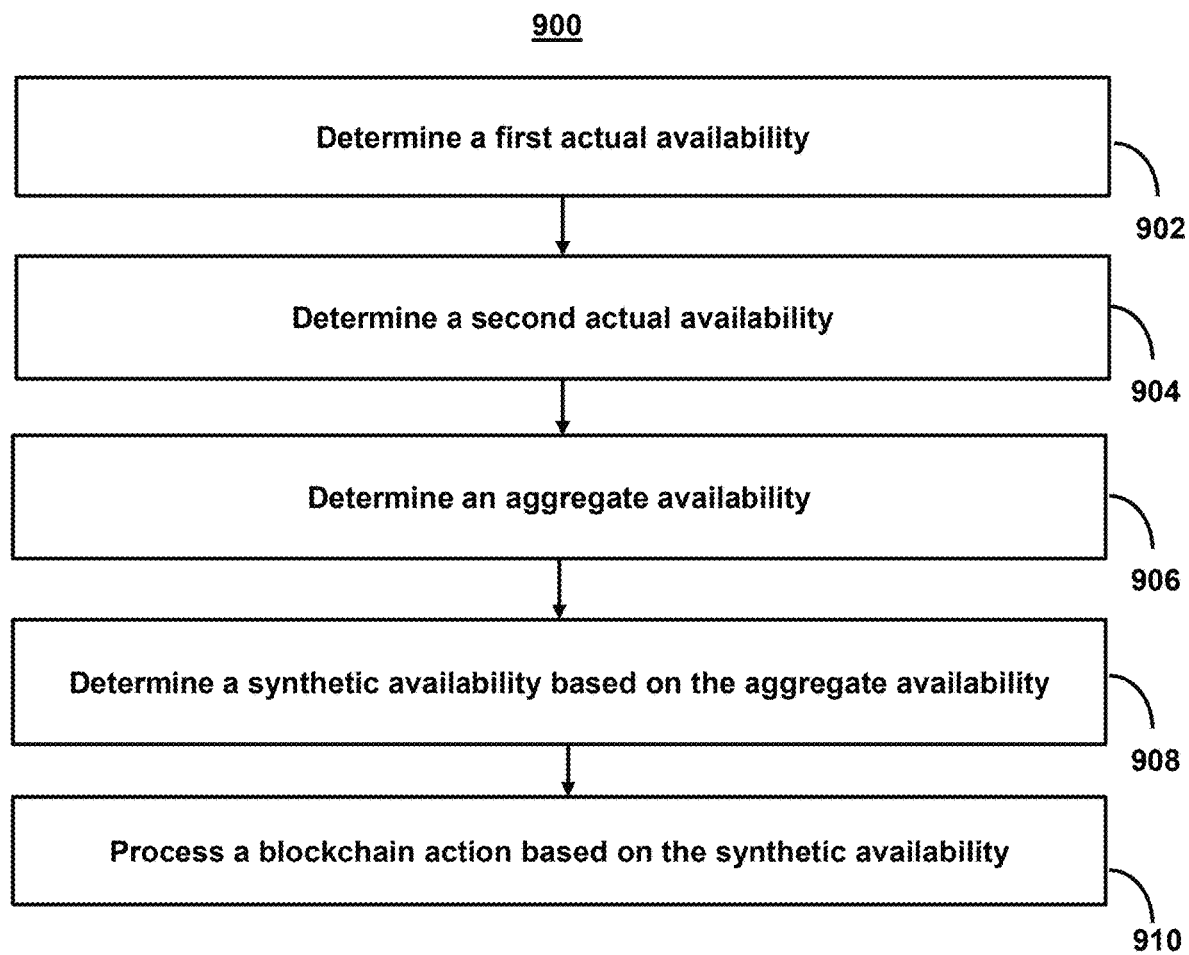
FIG. 9 shows a flowchart of the steps involved in pooling a plurality of resources across computer networks, in accordance with one or more embodiments.

FIG. 9 shows a flowchart of the steps involved in pooling a plurality of resources across computer networks, in accordance with one or more embodiments. For example, the system may use process 900 (e.g., as implemented on one or more system components described above) to pool a plurality of resources across computer networks using synthetic availabilities. The system may use process 900 (e.g., as implemented on one or more system components described above) to pool a plurality of resources across computer networks using synthetic availabilities by aggregating disparate resource information—such as financial balances, computing power, or storage capacity—from multiple sources and standardizing their availability representations. Synthetic availabilities serve as abstracted indicators that reflect the estimated or predicted availability of each resource, even if the actual status may vary across networks or systems. Process 900 may include logic to retrieve and normalize resource metadata from various networked locations, apply conversion or reconciliation rules to account for differences in protocols, currencies, or resource types, and present a unified availability view to the client. This enables the client to interact with the pooled resources as though they were part of a single, cohesive system. For example, in a financial context, process 900 may allow a client to collect funds from various international or distributed financial pools by using synthetic availability indicators to determine when and how much can be moved, then aggregating the amounts into a centralized U.S.-based account. The process improves resource coordination and accessibility across otherwise disconnected or heterogeneous environments.

At step 902, process 900 (e.g., using one or more components described above) determines a first actual availability. For example, the system may determine a first actual availability for a first resource in a first computer network for a first user. For example, a system may determine a first actual availability for a first resource in a first computer network for a first user by evaluating a combination of real-time and historical data related to the resource's current status, usage patterns, and access permissions. The system may begin by querying the availability status of the resource, checking whether it is currently active, idle, or in use by another process or user. It may then assess the network conditions, such as bandwidth or latency, that could affect access to the resource. In parallel, the system may analyze the first user's credentials and access rights to ensure authorization. Additionally, the system might incorporate scheduling data or predictive models based on past behavior or system load to estimate when the resource will next become free. By synthesizing this information, the system can determine the earliest feasible point in time at which the first user can be granted access to the first resource within the first computer network.

At step 904, process 900 (e.g., using one or more components described above) determines a second actual availability. For example, the system may determine a second actual availability for a second resource in the first computer network for the first user. The system may determine a second actual availability for a second resource in the first computer network for the first user by evaluating the resource's current status across multiple potential sources, such as different financial institutions, bank branches, or cryptocurrency pools, and consolidating this information into a coherent availability assessment. This determination may involve querying real-time data feeds, APIs, or distributed ledger systems to assess the present state of the second resource, such as the balance in a foreign currency account, the liquidity of a cryptocurrency asset, or the availability of funds held at a remote banking location. The system may also consider network conditions, transaction settlement times, currency conversion rates, and any applicable access restrictions or compliance requirements specific to the first user. Using this data, the system can synthesize an accurate and actionable view of the second resource's availability within the same computer network context as the first resource. For instance, if the first user holds assets in multiple currencies or decentralized pools, the system may calculate the time, method, and value at which these assets could be accessed or transferred, thereby determining the second actual availability in a way that accounts for logistical and transactional complexity.

At step 906, process 900 (e.g., using one or more components described above) determines an aggregate availability. For example, the system may determine a first aggregate availability for the first user based on the first actual availability and the second actual availability. The system may determine a first aggregate availability for the first user by combining the first actual availability and the second actual availability into a unified representation of accessible resources. This process may involve normalizing the values of the first and second resources—accounting for differences such as currency type, unit of measure, or time to availability—and applying aggregation logic that reflects the user's ability to access or utilize the combined resources. For example, if the first actual availability represents funds in a U.S. bank account and the second actual availability represents cryptocurrency holdings or foreign assets, the system may apply real-time exchange rates, liquidity assessments, and transferability constraints to determine the effective value and timing of access for each. The system may also consider prioritization rules, user preferences, or regulatory conditions in calculating how and when the resources may be pooled. Once these factors are reconciled, the system can compute a first aggregate availability that reflects the total usable amount or capacity available to the first user, providing a comprehensive, real-time view of their consolidated resource access across the network.

In some embodiments, the system may determine the first aggregate availability by retrieving a user aggregation event corresponding to the first user, determining a first characteristic corresponding to the first user, and comparing the first characteristic to the user aggregation event. For example, the system may determine the first aggregate availability by retrieving a user aggregation event corresponding to the first user, determining a first characteristic associated with the user, and comparing the characteristic to the aggregation event to inform the availability calculation. The user aggregation event may represent a historical or scheduled action in which the user's resources were combined, transferred, or evaluated across different accounts or systems. The first characteristic could include factors such as the user's transaction history, risk profile, preferred currency, geographic location, or access permissions. By comparing this characteristic to the parameters of the user aggregation event—such as timing, method of aggregation, or involved resources—the system can assess the relevance and applicability of the event to the user's current context. This comparison allows the system to determine whether the previous aggregation logic remains valid or needs to be adjusted, enabling it to accurately calculate a current first aggregate availability. For instance, if the user typically aggregates funds into a U.S. account once liquidity thresholds are met across multiple pools, the system may use this pattern, combined with real-time data, to predict and formalize the total availability accessible to the user at the present moment.

In some embodiments, the system may determine the first aggregate availability by retrieving a network-wide aggregation event corresponding to the first computer network, determining a first characteristic corresponding to the first computer network, and comparing the first characteristic to the network-wide aggregation event. For example, the system may determine the first aggregate availability by retrieving a network-wide aggregation event corresponding to the first computer network, determining a first characteristic associated with the network, and comparing the characteristic to the aggregation event to inform the availability calculation. The network-wide aggregation event may reflect a past or scheduled consolidation of resources across multiple users, systems, or nodes within the network—such as a coordinated liquidity sweep, settlement cycle, or batch processing event. The first characteristic of the network could include parameters such as current network load, latency, resource distribution, transaction volume, or operational status. By comparing this characteristic to the conditions under which the network-wide aggregation event occurred-such as timing, resource types, or performance metrics—the system can assess the relevance of that event to the current network state. This evaluation enables the system to determine whether the prior aggregation behavior is applicable under present conditions, and to what extent it can be used to estimate the current aggregate availability. For example, if a previous network-wide aggregation resulted in pooled liquidity being made available after certain thresholds or conditions were met, the system can use this precedent—adjusted for the current network context—to calculate the first aggregate availability for the first user with greater accuracy and predictive insight.

In some embodiments, the system may determine the first aggregate availability by retrieving a temporal aggregation event corresponding to a first time period, determining a current time, and comparing the current time to the first time period. For example, the system may determine the first aggregate availability by retrieving a temporal aggregation event corresponding to a first time period, determining a current time, and comparing the current time to the first time period to assess the applicability of the aggregation event to the present context. The temporal aggregation event may represent a past or scheduled consolidation of resources— such as daily fund sweeps, end-of-day reconciliations, or periodic batch transfers—that occurred or is set to occur within a defined time window. By determining the current time and comparing it to the first time period associated with the aggregation event, the system can evaluate whether the event has already taken place, is currently in progress, or is pending execution. This temporal comparison allows the system to assess whether the resources associated with the aggregation event should be considered part of the current aggregate availability. For instance, if the event was scheduled for a daily cutoff at 5:00 PM and the current time is 6:00 PM, the system may include the results of the aggregation in its calculation. Conversely, if the current time is prior to the event window, the system may exclude those resources or apply a projected availability. This time-aware evaluation ensures that the first aggregate availability reflects both actual and imminent resource accessibility aligned with scheduled aggregation behaviors.

In some embodiments, the system may determine the first aggregate availability by receiving a user selection of a predetermined aggregation event and monitoring for the predetermined aggregation event. For example, the system may determine the first aggregate availability by receiving a user selection of a predetermined aggregation event and actively monitoring for the occurrence of that event. The user selection may indicate a specific type of aggregation— such as a scheduled transfer, a liquidity consolidation, or a multi-account fund pooling—that the user expects to occur based on known timing, conditions, or business rules. Once the system registers this selection, it may begin monitoring relevant system components, network activity, or resource states to detect when the predetermined aggregation event begins, progresses, or completes. This may involve listening for triggers such as account balance changes, transaction confirmations, or system-generated event logs that signal the execution or completion of the selected aggregation. Upon detection, the system can incorporate the resulting resource changes into its calculation of the first aggregate availability, ensuring that the user's resources are accurately reflected according to the expected behavior of the aggregation event. By aligning the availability determination with the user's intent and a specific, monitored event, the system provides a more dynamic and responsive representation of resource access in real-time.

In some embodiments, the system may determine the first aggregate availability by retrieving a user aggregation event corresponding to the first user, determining a first characteristic corresponding to the first user, and comparing the first characteristic to the user aggregation event. For example, the system may determine the first aggregate availability by retrieving a user aggregation event corresponding to the first user, determining a first characteristic associated with the user, and comparing the characteristic to the aggregation event to evaluate its applicability to the current context. The user aggregation event may represent a prior or scheduled consolidation of resources—such as transfers between accounts, currency exchanges, or pooling of digital assets—specifically tied to the user's activity or preferences. The first characteristic may include data such as the user's transaction behavior, resource access patterns, account configurations, or historical aggregation timing. By comparing this characteristic to the conditions and parameters of the user aggregation event—such as the type of resources involved, the frequency or timing of the event, or the thresholds that triggered it—the system can determine whether similar conditions exist in the present. If the current user characteristics align with those of the previous event, the system may infer that a comparable aggregation is likely or already in progress, and use this information to calculate a current first aggregate availability. This approach allows the system to adaptively forecast or confirm the user's accessible resources based on personalized aggregation patterns and real-time behavior.

In some embodiments, the system may determine the first aggregate availability by receiving computer network data corresponding to the first computer network, generating a feature input based on the computer network data, inputting the feature input into a first model to generate a first output, wherein the first model is trained on historic computer network data to generate outputs related to likelihoods of network anomaly events, and comparing the first output to a predetermined aggregation event, wherein the predetermined aggregation event indicates a likelihood of a network anomaly event. For example, the system may determine the first aggregate availability by receiving computer network data corresponding to the first computer network, generating a feature input based on that data, and inputting the feature input into a first model to generate a first output, where the model is trained on historical computer network data to predict the likelihood of network anomaly events. The received computer network data may include real-time metrics such as latency, packet loss, throughput, node availability, and system error rates. From this data, the system generates a structured feature input that captures relevant patterns or anomalies indicative of network behavior. This feature input is then fed into the trained model, which analyzes the data and produces a first output representing the likelihood or severity of a potential network anomaly event. The system then compares this first output to a predetermined aggregation event, which serves as a benchmark or threshold indicating conditions under which resource aggregation may be disrupted, delayed, or altered due to network instability. If the model output indicates a high likelihood of a network anomaly that aligns with the parameters of the predetermined aggregation event, the system may adjust or delay the calculation of the first aggregate availability accordingly. Conversely, if the output suggests low anomaly risk, the system may proceed with the aggregation process under standard assumptions. This predictive, model-driven approach allows the system to dynamically assess and adapt resource availability based on the evolving health and reliability of the computer network.

In some embodiments, the system may determine the first aggregate availability by receiving resource activity data corresponding to the first resource, generating a feature input based on the resource activity data, inputting the feature input into a first model to generate a first output, wherein the first model is trained on historic resource activity data to generate outputs related to likelihoods of cyber-security events, and comparing the first output to a predetermined aggregation event, wherein the predetermined aggregation event indicates a likelihood of a cyber-security event. For example, the system may determine the first aggregate availability by receiving resource activity data corresponding to the first resource, generating a feature input based on that data, and inputting the feature input into a first model to produce a first output, where the model is trained on historical resource activity data to predict the likelihood of cyber-security events. The resource activity data may include logs, access patterns, authentication attempts, data transfer behaviors, and other operational signals associated with the first resource. The system processes this data to extract relevant features—such as frequency of access, unusual IP addresses, or anomalies in usage timing—which are compiled into a structured feature input. This input is then analyzed by the trained model, which evaluates the patterns against known signatures and behaviors associated with past cyber-security incidents, such as unauthorized access, data breaches, or system intrusions. The resulting first output represents a probability or risk score reflecting the likelihood of a cyber-security event affecting the first resource. The system then compares this output to a predetermined aggregation event, which defines thresholds or conditions under which aggregation processes may be delayed, restricted, or adjusted due to security concerns. If the model indicates an elevated risk consistent with the parameters of the predetermined aggregation event, the system may reduce, postpone, or conditionally alter the aggregation of the resource into the user's available pool. This approach ensures that the first aggregate availability reflects not only the technical and operational status of the resource but also incorporates proactive security risk assessments to protect the integrity of the aggregation process.

In some embodiments, the system may determine the first aggregate availability by receiving user objective data corresponding to the first user, generating a feature input based on the user objective data, inputting the feature input into a first model to generate a first output, wherein the first model is trained on historic user objective data and historic network activity data to generate outputs related to recommendations for aggregation events, and generating for display, on a user interface, a first recommendation to trigger an aggregation event. For example, the system may determine the first aggregate availability by receiving user objective data corresponding to the first user, generating a feature input based on that data, and inputting the feature input into a first model to generate a first output, wherein the model is trained on historical user objective data and historic network activity data to produce recommendations for aggregation events. The user objective data may include financial goals, risk tolerance, resource utilization preferences, time constraints, or specific aggregation strategies previously selected by the user. The system processes this data to extract relevant features—such as the urgency of access, preferred resource types, or expected outcomes—and combines it with contextual data about current or historical network conditions. This composite feature input is then provided to the trained model, which analyzes the information and generates a first output representing an optimal or recommended action related to triggering a resource aggregation event. Based on this output, the system generates for display, on a user interface, a first recommendation tailored to the user's objectives and the network's current state. This recommendation may include suggested timing, aggregation methods, or resource prioritization strategies that would maximize availability or efficiency. By integrating user intent with network intelligence and predictive analytics, the system helps guide the user in initiating aggregation events that are both contextually and strategically aligned, thereby enhancing the accuracy and relevance of the first aggregate availability determination.

In some embodiments, the system may determine the first aggregate availability by retrieving a first threshold actual availability for the first resource and comparing the first threshold actual availability to the first actual availability for a first resource in a first computer network for a first user. For example, the system may determine the first aggregate availability by retrieving a first threshold actual availability for the first resource and comparing it to the first actual availability of that resource within a first computer network for a first user. The first threshold actual availability represents a predefined minimum amount or condition—such as a monetary value, computing capacity, or data volume—that must be met or exceeded for the resource to be considered eligible for aggregation. The system first retrieves this threshold, which may be defined by user preferences, policy constraints, or operational requirements. It then compares this threshold to the current first actual availability of the resource, which reflects the real-time, accessible state of that resource. If the actual availability meets or exceeds the threshold, the system determines that the resource qualifies for inclusion in the aggregation process and incorporates it into the user's first aggregate availability. Conversely, if the actual availability falls below the threshold, the resource may be excluded or deferred from aggregation until conditions improve. This threshold-based comparison ensures that only meaningful or actionable resources are included in the aggregation, helping the system deliver a more accurate and functionally relevant representation of the user's total available assets across the network.

In some embodiments, the system may determine the first aggregate availability by retrieving respective user identifiers for a plurality of resources and determining that the first resource and the second resource correspond to the first user based on a first respective user identifier for the first resource and a second respective user identifier for the second resource. For example, the system may determine the first aggregate availability by retrieving respective user identifiers for a plurality of resources and determining that the first resource and the second resource correspond to the first user based on a first respective user identifier for the first resource and a second respective user identifier for the second resource. Each resource within the system may be tagged or associated with metadata that includes a user identifier—such as an account number, digital wallet address, user ID, or other unique token—that links the resource to a specific user. The system first retrieves these identifiers for all relevant resources across various platforms, accounts, or network segments. It then compares the identifiers associated with the first and second resources to determine if they match or otherwise relate to the same user entity. If the first and second user identifiers both correspond to the first user, the system concludes that these resources are under common ownership or control and are therefore eligible to be aggregated. Once the relationship is established, the system can include both the first and second resources in the calculation of the first aggregate availability, ensuring that all assets attributable to the first user are properly recognized and represented in the availability determination. This identity-based approach enables accurate consolidation of distributed resources tied to a single user across multiple systems or networks.

In some embodiments, the system may determine the first aggregate availability by receiving a request to pool resources based on respective geographic locations, retrieving respective geographic identifiers for a plurality of resources, and determining to pool the first resource and the second resource based on a first respective geographic identifier for the first resource and a second respective geographic identifier for the second resource. For example, the system may determine the first aggregate availability by receiving a request to pool resources based on respective geographic locations, retrieving geographic identifiers for a plurality of resources, and determining to pool the first resource and the second resource based on their respective geographic identifiers. The request may originate from a user, application, or automated process seeking to aggregate resources that are located within specific regions, jurisdictions, or proximity zones—for example, to optimize performance, reduce latency, comply with regulatory requirements, or align with logistical preferences. Upon receiving the request, the system identifies and retrieves geographic identifiers—such as country codes, region tags, IP geolocations, or physical addresses—associated with each resource. It then analyzes the first geographic identifier for the first resource and the second geographic identifier for the second resource to determine if they meet the criteria specified in the request, such as being within the same country, time zone, or regulatory region. If the geographic relationship satisfies the pooling condition, the system includes both the first and second resources in the calculation of the first aggregate availability. This location-aware aggregation approach ensures that the resources presented as available are not only technically accessible but also geographically aligned with the user's specified parameters or constraints.

In some embodiments, the system may determine the first aggregate availability by receiving a request to pool resources based on respective resource activity, retrieving respective activity identifiers for a plurality of resources, and determining to pool the first resource and the second resource based on a first respective activity identifier for the first resource and a second respective activity identifier for the second resource. For example, the system may determine the first aggregate availability by receiving a request to pool resources based on respective resource activity, retrieving respective activity identifiers for a plurality of resources, and determining to pool the first resource and the second resource based on their respective activity identifiers. The request may specify that only resources exhibiting certain types or levels of activity—such as frequency of access, transaction volume, data processing rates, or operational status—should be considered for aggregation. In response, the system retrieves activity identifiers associated with each resource, where each identifier represents a classification or metric indicating recent or ongoing resource behavior. The first activity identifier for the first resource and the second activity identifier for the second resource are then analyzed to determine whether they align with the requested pooling criteria, such as both resources being actively used within a defined timeframe or meeting minimum usage thresholds. If the activity identifiers satisfy the conditions outlined in the request, the system includes the corresponding resources in the aggregation process and uses them to calculate the first aggregate availability. This activity-based approach allows the system to dynamically assemble resource pools that reflect real-time or relevant utilization patterns, ensuring that only actively engaged or contextually significant resources contribute to the user's total available capacity.

At step 908, process 900 (e.g., using one or more components described above) determines a synthetic availability based on the aggregate availability. For example, the system may determine, using a first self-executing program, a first synthetic availability based on the first aggregate availability, wherein the first synthetic availability is represented by a first cryptographically secure digital asset in a digital log. For example, the system may determine, using a first self-executing program, a first synthetic availability based on the first aggregate availability, wherein the first synthetic availability is represented by a first cryptographically secure digital asset in a digital log. The self-executing program—such as a smart contract deployed on a blockchain or distributed ledger platform—is designed to autonomously calculate and record synthetic representations of resource availability without requiring manual intervention. Once the first aggregate availability is computed, the self-executing program uses this value as an input to generate a corresponding synthetic availability, which may be abstracted or tokenized to reflect the user's access to pooled resources across various systems. The program then issues or updates a cryptographically secure digital asset that embodies this synthetic availability, encoding it with relevant metadata such as the value, source references, time of issuance, and associated user identity. This digital asset is then recorded in a tamper-resistant digital log, such as a blockchain ledger, ensuring traceability, security, and verifiability. By leveraging cryptographic methods and automated execution, the system creates a trusted, interoperable representation of the user's aggregate resource availability, enabling further interactions, transfers, or transactions within digital ecosystems.

At step 910, process 900 (e.g., using one or more components described above) processes a blockchain action based on the synthetic availability. For example, the system may process a first blockchain action based on the first synthetic availability by populating a third resource in the first computer network for the first user with a third actual availability corresponding to the first synthetic availability and modifying, using a second self-executing program, the first synthetic availability as recorded in the digital log. For example, the system may process a first blockchain action based on the first synthetic availability by populating a third resource in the first computer network for the first user with a third actual availability corresponding to the first synthetic availability, and modifying, using a second self-executing program, the first synthetic availability as recorded in the digital log. When a blockchain action—such as a transfer, redemption, or settlement—is initiated based on the first synthetic availability, the system triggers operations that convert the synthetic representation into an actionable, real-world allocation. Specifically, the system allocates or credits a third resource (e.g., an account, service quota, or data container) within the first computer network with a third actual availability that reflects the value or capacity of the first synthetic availability. Simultaneously, a second self-executing program, such as another smart contract, is invoked to update the digital log and modify the state of the first synthetic availability—this may include reducing its value, marking it as redeemed, or transitioning it to an inactive state. The update is cryptographically secured and immutably recorded in the blockchain ledger, ensuring transparency, integrity, and non-repudiation. Through this coordinated process, the system seamlessly bridges synthetic and actual availability while maintaining trust and traceability across decentralized and traditional computing environments.

In some embodiments, the system may process the first blockchain action by modifying the first actual availability for the first resource based on a first portion of the first synthetic availability corresponding to the first actual availability and modifying the second actual availability for the second resource based on a second portion of the first synthetic availability corresponding to the second actual availability. For example, the system may process the first blockchain action by modifying the first actual availability for the first resource based on a first portion of the first synthetic availability that corresponds to the first actual availability, and modifying the second actual availability for the second resource based on a second portion of the first synthetic availability that corresponds to the second actual availability. This approach enables the system to rebalance the distribution of availability across different resources in alignment with the synthetic availability's underlying composition. Upon execution of the blockchain action—such as a transaction or transfer linked to the synthetic availability—the system decomposes the synthetic representation into constituent portions that reflect how the original aggregate availability was derived from the underlying resources. The first portion is applied to adjust the availability of the first resource, for example, by decrementing its balance or capacity to reflect the usage of its contribution. Simultaneously, the second portion is applied to the second resource in a similar manner. This proportional adjustment ensures that the impact of the synthetic availability is accurately reflected at the resource level, maintaining consistency between on-chain synthetic representations and off-chain actual resource states. By doing so, the system effectively rebalances the resource availabilities, redistributing or reducing their capacities in a way that maintains integrity and traceability across both traditional infrastructure and blockchain-based accounting.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

Figure 10:
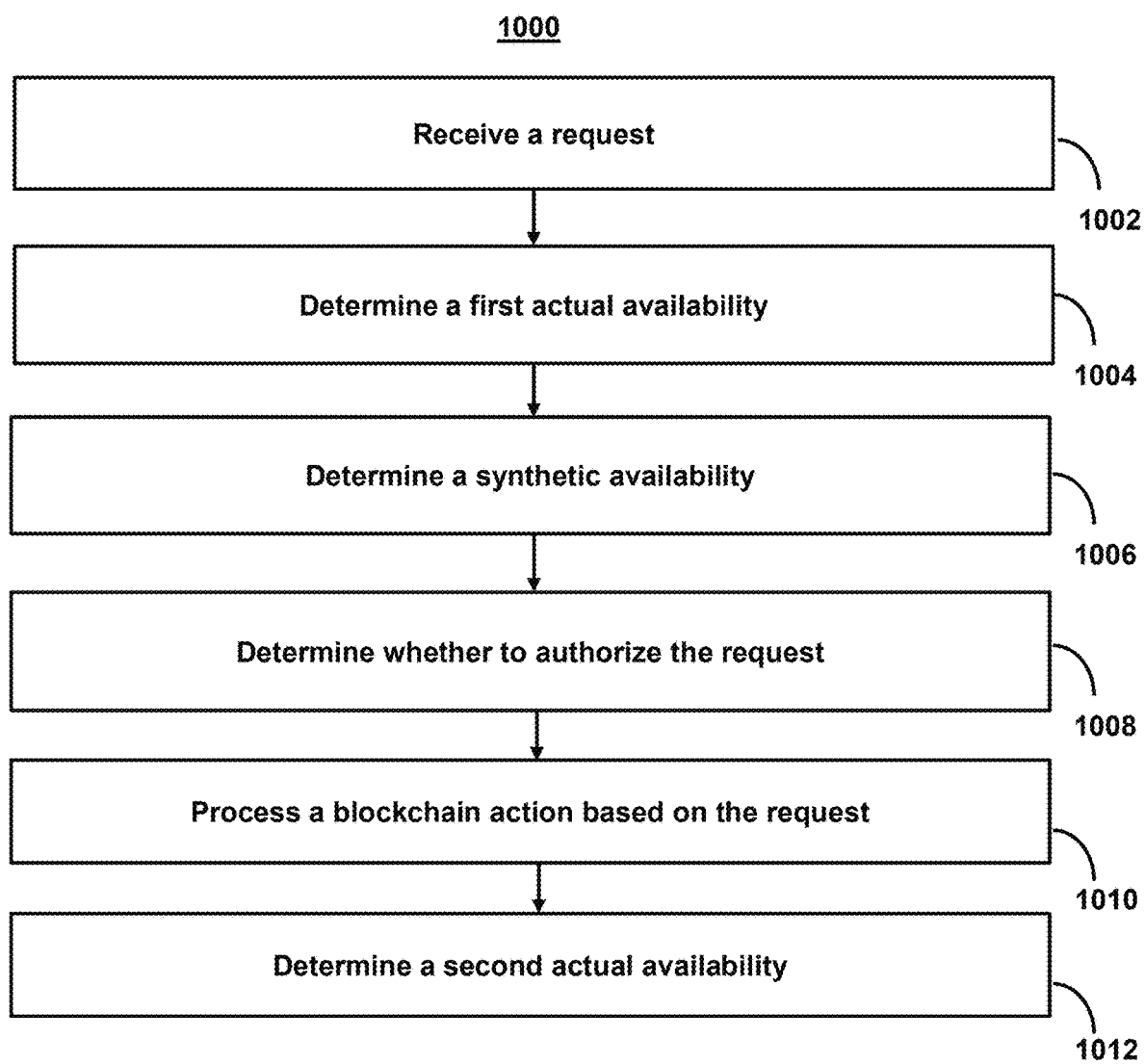
FIG. 10 shows a flowchart of the steps involved in dynamic management of a plurality of resources across computer networks, in accordance with one or more embodiments.

FIG. 10 shows a flowchart of the steps involved in dynamic management of a plurality of resources across computer networks, in accordance with one or more embodiments. For example, the system may use process 1000 (e.g., as implemented on one or more system components described above) for dynamic management of a plurality of resources across computer networks using synthetic availabilities. For example, the system may use process 1000 (e.g., as implemented on one or more system components described above) for dynamic management of a plurality of resources across computer networks using synthetic availabilities by continuously monitoring, evaluating, and mobilizing distributed resources in response to real-time events. Process 1000 may enable a flexible, automated framework where synthetic availability serves as an abstracted representation of actual resource access, allowing the system to support applications such as a "Just in Time Funding" product. In this context, the system can receive a triggering event—such as a user transaction request, threshold crossing, or system condition—that initiates an immediate liquidity or resource fulfillment process. Upon receiving the trigger, the system dynamically determines which underlying resources, spread across various accounts or platforms, contribute to the required availability. It then uses synthetic availability tokens or digital representations to aggregate and authorize the transfer or allocation of value. These synthetic representations may be validated and executed through smart contracts or other self-executing programs, which ensure secure, compliant, and timely transfers. The system then moves the necessary synthetic and/or actual funds into a designated third-party account or endpoint, completing the transaction in near real-time. Through process 1000, the system intelligently manages multi-source liquidity with minimal delay, enabling clients to access the resources they need exactly when required, without the need for pre-funded positions or manual intervention. This dynamic orchestration enhances operational efficiency, reduces capital lock-up, and supports a responsive digital finance infrastructure.

At step 1002, process 1000 (e.g., using one or more components described above) receives a request. For example, the system may receive a first request to generate availability at a first resource. For example, in response to the first request, the system may determine a first actual availability for a second resource by evaluating the current state, access conditions, and contextual attributes of that resource to assess how much is immediately usable or transferrable. Upon receiving the request—such as a transaction initiation, funding instruction, or availability query—the system identifies the second resource and retrieves associated data, including real-time balances, pending commitments, liquidity status, and any operational constraints (e.g., compliance rules, processing delays, or geographic limitations). It may also validate user permissions, resource identifiers, and linked synthetic availability, if applicable. The system then processes this information to determine the portion of the second resource that meets the criteria for actual availability—meaning it is both accessible and eligible to fulfill the request. This determination may involve reconciling transaction logs, checking for holds or locks, and ensuring alignment with predefined thresholds or triggers. The resulting first actual availability represents a verifiable, actionable value that the system can use to authorize transactions, initiate transfers, or support further operations involving the second resource.

At step 1004, process 1000 (e.g., using one or more components described above) determines a first actual availability. For example, the system may, in response to the first request, determine a first actual availability for a second resource. As an example, in response to the first request, the system may determine a first actual availability for a second resource by evaluating the current state, access conditions, and contextual attributes of that resource to assess how much is immediately usable or transferrable. Upon receiving the request—such as a transaction initiation, funding instruction, or availability query—the system identifies the second resource and retrieves associated data, including real-time balances, pending commitments, liquidity status, and any operational constraints (e.g., compliance rules, processing delays, or geographic limitations). It may also validate user permissions, resource identifiers, and linked synthetic availability, if applicable. The system then processes this information to determine the portion of the second resource that meets the criteria for actual availability—meaning it is both accessible and eligible to fulfill the request. This determination may involve reconciling transaction logs, checking for holds or locks, and ensuring alignment with predefined thresholds or triggers. The resulting first actual availability represents a verifiable, actionable value that the system can use to authorize transactions, initiate transfers, or support further operations involving the second resource.

At step 1006, process 1000 (e.g., using one or more components described above) determines a synthetic availability. For example, the system may determine, using a first self-executing program, a first synthetic availability for the second resource based on the first actual availability, wherein the first synthetic availability is represented by a first cryptographically secure digital asset in a digital log. The system may determine, using a first self-executing program, a first synthetic availability for the second resource based on the first actual availability by automatically converting the real, verified value of the resource into a digital representation that can be tracked and acted upon within a distributed network. Once the first actual availability is identified—such as a confirmed account balance, available computing power, or other resource capacity—the self-executing program (e.g., a smart contract) is triggered to create a corresponding synthetic availability. This synthetic availability is encoded as a cryptographically secure digital asset that reflects the characteristics of the underlying resource, including its value, origin, timestamp, and associated user or account information. The digital asset is then recorded immutably in a digital log, such as a blockchain ledger, where it can be referenced, transferred, or redeemed in future transactions. This process enables the system to abstract the actual availability into a flexible, interoperable form that supports secure, real-time operations across different platforms or jurisdictions, while maintaining transparency and auditability through the digital log.

At step 1008, process 1000 (e.g., using one or more components described above) determines whether to authorize the request. For example, the system may determine whether to authorize the first request. The system determines whether to authorize the first request by evaluating a set of predefined authorization criteria that assess the legitimacy, feasibility, and compliance of the request. This process typically begins by validating the identity and credentials of the requesting party using Know Your Customer (KYC) data, such as user identifiers, geographic location, and account status. The system may also perform Know Your Transaction (KYT) checks to analyze the nature and context of the transaction, including transaction amount, frequency, destination, and regulatory requirements. In parallel, the system evaluates operational metrics—such as the current ratio of synthetic to actual availability, overall liquidity conditions, and system load—to ensure that sufficient resources are available to fulfill the request without compromising network stability. The system may further apply AI-driven models to predict the likelihood of fraud or policy violations based on historical patterns and behavioral data. If all applicable thresholds, risk assessments, and compliance checks are satisfied, the system authorizes the request, triggering the appropriate downstream processes. Otherwise, the request may be denied, flagged for review, or queued for further validation. This multi-layered decision-making process ensures that authorizations are both secure and aligned with system rules, user entitlements, and regulatory obligations.

In some embodiments, the system may determine whether to authorize the first request by retrieving a known identifier for the first resource and comparing the known identifier to a plurality of approved identifiers. For example, the system may determine whether to authorize the first request by retrieving a known identifier for the first resource and comparing it to a plurality of approved identifiers stored within an authorization or compliance database. The known identifier—such as a resource ID, account number, token address, or digital fingerprint—serves as a unique reference associated with the first resource. Upon receiving the request, the system extracts this identifier and performs a lookup operation to determine whether it matches any entry within a predefined list of approved identifiers. These approved identifiers may represent whitelisted accounts, verified counterparties, or compliant entities that have been previously vetted based on regulatory, security, or operational criteria. If the known identifier for the first resource matches one of the approved entries, the system interprets this as a signal that the request involves a trusted or sanctioned resource and proceeds with further authorization steps or directly approves the request. If no match is found, the system may reject the request, flag it for manual review, or initiate additional verification procedures. This identifier-based validation process provides a fast, secure, and auditable method for enforcing access controls and ensuring that only trusted resources are allowed to participate in critical transactions or operations.

In some embodiments, the system may determine whether to authorize the first request by retrieving a plurality of approved geographic locations and comparing the first geographic location to the plurality of approved geographic locations. For example, the system may determine whether to authorize the first request by retrieving a plurality of approved geographic locations and comparing the first geographic location—associated with the origin or destination of the request—to this approved list. When the request is received, the system identifies the geographic location of the resource or user initiating the request, which may be determined through IP address tracking, account metadata, GPS coordinates, or user-provided information. The system then retrieves a stored list of approved geographic locations, which may be defined based on regulatory requirements, compliance policies, risk profiles, or jurisdictional restrictions. By comparing the first geographic location to this list, the system can determine whether the request originates from or is directed to a permissible region. If the first geographic location matches one of the approved entries, the system considers the request geographically valid and continues with further validation steps. If it does not match, the request may be denied, flagged for review, or subject to additional scrutiny such as enhanced due diligence. This geographic validation step helps enforce cross-border compliance, mitigate jurisdictional risk, and support location-based access control in resource pooling and transaction authorization processes.

In some embodiments, the system may determine whether to authorize the first request by retrieving a plurality of compliance requirements for a plurality of geographic locations and determining a compliance requirement for the first request based on the first geographic location. For example, the system may determine whether to authorize the first request by retrieving a plurality of compliance requirements associated with a plurality of geographic locations and identifying the specific compliance requirement that applies to the first request based on its corresponding first geographic location. When the request is initiated, the system first identifies the geographic origin or destination of the transaction, such as where the user or resource is located. It then accesses a compliance ruleset or database containing region-specific regulatory requirements, which may include anti-money laundering (AML) standards, know-your-customer (KYC) obligations, transaction limits, tax reporting rules, and data residency laws. The system uses the first geographic location to select the applicable compliance framework from the broader set of location-based policies. Once the relevant compliance requirement is identified, the system evaluates the details of the first request against those specific rules to determine whether the request satisfies all necessary legal, operational, and regulatory conditions. If compliant, the system proceeds with authorization; if not, it may reject the request, pause it for manual review, or trigger additional verification steps. This dynamic, geography-aware compliance check ensures that the system enforces appropriate standards based on jurisdictional context, supporting both global interoperability and localized regulatory enforcement.

In some embodiments, the system may determine whether to authorize the first request by determining a number of blockchain actions currently being processed and comparing the number of blockchain actions to a threshold number. For example, the system may determine whether to authorize the first request by first calculating the number of blockchain actions currently being processed within the network and then comparing that number to a predefined threshold. When the request is received, the system checks the current load on the blockchain infrastructure by monitoring active transactions, pending confirmations, or queued smart contract executions. This real-time transaction volume reflects the system's operational capacity and network congestion. The system then retrieves a threshold number—defined by performance limits, risk tolerance, or service-level agreements—that represents the maximum allowable blockchain actions that can be safely or efficiently handled at a given time. If the number of ongoing blockchain actions is below this threshold, the system proceeds to authorize the first request, initiating any required blockchain operations, such as transferring synthetic availability or recording a digital asset. However, if the current number exceeds the threshold, the system may delay, reject, or queue the request to prevent performance degradation or execution failures. This load-aware authorization process ensures network stability and helps optimize transaction throughput during periods of high activity.

In some embodiments, the system may determine whether to authorize the first request by determining a frequency of blockchain actions being processed from the second resource and comparing the frequency to a threshold frequency. For example, the system may determine whether to authorize the first request by calculating the frequency of blockchain actions being processed from the second resource and comparing that frequency to a predefined threshold frequency. Upon receiving the request, the system analyzes recent transaction activity originating from the second resource—such as the number of blockchain actions initiated within a specific time window (e.g., per minute, hour, or day). This frequency data reflects how actively the second resource is interacting with the blockchain, which may indicate usage patterns, risk exposure, or potential abuse. The system then compares the observed frequency to a threshold frequency that is established based on system policy, operational limits, or risk management protocols. If the frequency of blockchain actions from the second resource is below the threshold, the system considers the activity to be within acceptable bounds and may authorize the request. However, if the frequency exceeds the threshold, suggesting possible overuse, fraud, or strain on system resources, the request may be denied, delayed, or flagged for additional verification. This frequency-based control mechanism helps maintain network integrity, prevents resource exhaustion, and enforces fair usage across all participants.

In some embodiments, the system may determine whether to authorize the first request by determining a first transfer characteristic of the first blockchain action, retrieving a plurality of restricted actions, and comparing the first transfer characteristic to the plurality of restricted actions. For example, the system may determine whether to authorize the first request by identifying a first transfer characteristic of the first blockchain action—such as the transaction type, destination address, asset class, transfer amount, or timing—and comparing it to a plurality of restricted actions stored in a compliance or risk database. When the request is received, the system analyzes the proposed blockchain action to extract key attributes that define the nature of the transfer. These attributes are then evaluated against a predefined list of restricted actions, which may include blacklisted wallet addresses, prohibited asset types, disallowed transaction sizes, sanctioned jurisdictions, or flagged behavioral patterns. If the first transfer characteristic matches or closely resembles any of the restricted actions, the system may interpret the request as potentially non-compliant, high-risk, or fraudulent, and respond by denying the request, flagging it for manual review, or initiating additional checks. Conversely, if no match is found, the system proceeds with authorizing the blockchain action. This comparison process allows the system to enforce policy, regulatory, and risk controls in real-time, ensuring that blockchain transactions align with internal guidelines and external legal requirements.

In some embodiments, the system may determine whether to authorize the first request by determining a first transfer characteristic of the first blockchain action, retrieving a plurality of restricted actions, and comparing the first transfer characteristic to the plurality of restricted actions. For example, the system may determine whether to authorize the first request by first identifying a first transfer characteristic of the first blockchain action—such as the type of asset being transferred, the destination address, the amount, the origin of the funds, the timing of the transfer, or the network used. Once this characteristic is extracted, the system retrieves a plurality of restricted actions from a policy or compliance ruleset, which may include known high-risk destinations, disallowed asset types (e.g., privacy coins), flagged users or addresses, excessive transfer amounts, or time-based constraints such as blackout periods. The system then compares the first transfer characteristic to the set of restricted actions to determine if there is a match or a similarity that would raise a compliance or security concern. If a match is found, indicating the transfer falls within a prohibited category, the system may reject the request, delay execution, or escalate it for further review. If no match is found, the system continues with the authorization process. This approach enables the system to proactively block unauthorized, suspicious, or non-compliant blockchain actions, helping to maintain regulatory alignment and reduce exposure to fraud or misuse.

In some embodiments, the system may determine whether to authorize the first request by receiving resource activity data corresponding to the first resource, generating a feature input based on the resource activity data, inputting the feature input into a first model to generate a first output, wherein the first model is trained on historic resource activity data to generate outputs related to likelihoods of cyber-security events, and comparing the first output to an authorization criterion. For example, the system may determine whether to authorize the first request by receiving resource activity data corresponding to the first resource, generating a feature input based on that data, and evaluating it through a predictive model trained to identify cyber-security risks. The resource activity data may include indicators such as login frequency, access times, data transfer volumes, IP address history, unusual transaction patterns, or device signatures. The system processes this data to create a structured feature input, capturing behavior relevant to security analysis. This feature input is then submitted to a first model—typically a machine learning model—trained on historic resource activity data to detect patterns associated with cyber-security events such as unauthorized access, data breaches, or anomalous behavior. The model outputs a risk score or classification (the first output) that represents the likelihood of a potential security incident associated with the request. The system then compares this output to a predefined authorization criterion, such as a risk threshold or confidence level. If the model's output exceeds the acceptable threshold, indicating elevated risk, the system may deny or delay the authorization, or trigger further security verification steps. If the output falls within a safe range, the system proceeds to authorize the first request. This approach allows the system to make real-time, data-driven authorization decisions that proactively account for evolving cyber-security threats.

In some embodiments, the system may determine whether to authorize the first request by receiving computer network data, generating a feature input based on the computer network data, inputting the feature input into a first model to generate a first output, wherein the first model is trained on historic computer network data to generate outputs related to likelihoods of network anomaly events, and comparing the first output to an authorization criterion. For example, the system may determine whether to authorize the first request by receiving computer network data—such as latency metrics, packet loss rates, node availability, connection failures, and throughput statistics—and generating a feature input based on that data. The system processes this information to extract meaningful patterns and structure it into a feature input that accurately reflects the current state of the network. This feature input is then provided to a first model, typically a machine learning model trained on historical computer network data, which is designed to detect anomalies or conditions that could indicate instability, degradation, or potential risk within the network. The model outputs a first result, such as a probability score or anomaly classification, representing the likelihood of a network anomaly event. The system compares this output to an established authorization criterion, such as a risk threshold or anomaly tolerance level. If the output exceeds the defined criterion—suggesting an elevated risk of a network-related disruption—the system may choose to delay, reject, or further scrutinize the first request to avoid operational or security failures. If the output is within acceptable limits, the request is authorized and allowed to proceed. This predictive, network-aware authorization mechanism enables the system to proactively respond to infrastructure risks and maintain transaction integrity under fluctuating network conditions.

In some embodiments, the system may determine whether to authorize the first request by receiving user objective data corresponding to the first user, generating a feature input based on the user objective data, inputting the feature input into a first model to generate a first output, wherein the first model is trained on historic user objective data and historic network activity data to generate outputs related to recommendations for authorizing transfers, and generating for display, on a user interface, a first recommendation to authorize the first request. For example, the system may determine whether to authorize the first request by receiving user objective data corresponding to the first user—such as financial goals, risk tolerance, transaction preferences, usage patterns, or liquidity needs—and generating a feature input that captures this data in a structured format. The system may enrich this input by combining it with contextual information from historic network activity data, such as recent transaction volumes, network congestion levels, or security events. This combined feature input is then submitted to a first model trained on historical user objective data and network behavior, designed to produce outputs related to recommendations for whether a specific transfer request should be authorized. The model analyzes the input to generate a first output, which may indicate a recommended action such as approve, deny, delay, or require further validation. Based on this output, the system generates a first recommendation for display on a user interface, guiding a system operator or automated process toward a decision. This recommendation may include supporting rationale or confidence scores, helping the user understand the logic behind the model's suggestion. By leveraging personalized user data and dynamic network context, the system delivers intelligent, context-aware transfer recommendations that balance user intent with operational and risk-based considerations.

In some embodiments, the system may determine whether to authorize the first request by determining a first ratio of the first synthetic availability to a total availability for the second resource and comparing the first ratio to a threshold ratio. The system may determine whether to authorize the first request by calculating a first ratio of the first synthetic availability to the total availability for the second resource and comparing this ratio to a predefined threshold. The total availability for the second resource may include both actual and synthetic components, representing the full extent of the resource's usable value or capacity. Upon receiving the request, the system identifies the amount of synthetic availability already allocated for the second resource and divides it by the total availability to derive the first ratio. This ratio reflects how much of the resource is currently being represented or consumed through synthetic means. The system then compares the ratio to a threshold value, which may be established to manage risk, prevent overexposure to synthetic assets, or maintain liquidity within acceptable limits. If the first ratio exceeds the threshold—indicating an over-reliance on synthetic representations—the system may deny, delay, or flag the request for further review. Conversely, if the ratio falls within acceptable bounds, the system may proceed with authorizing the request. This ratio-based evaluation helps ensure that the system maintains a healthy balance between synthetic and actual availability, supporting operational integrity and financial stability.

In some embodiments, the system may determine whether to authorize the first request by determining a total amount of synthetic availability for the second resource and comparing the first synthetic availability to the total amount of synthetic availability. For example, the system may determine whether to authorize the first request by calculating the total amount of synthetic availability already associated with the second resource and comparing the first synthetic availability requested to that total. The system begins by identifying all existing synthetic availabilities that have been generated for or linked to the second resource, which may represent various tokenized or abstracted claims on the resource's actual availability. It aggregates these values to determine the total synthetic exposure currently in effect. Upon receiving the first request, which includes or implies the creation or transfer of a first synthetic availability, the system evaluates whether adding this new synthetic availability would exceed predefined operational, risk, or compliance limits. This is done by comparing the requested first synthetic availability to the total synthetic availability already in place. If the requested amount would push the synthetic total beyond an acceptable threshold—indicating potential over-leveraging or risk of resource misrepresentation—the system may reject or defer the request. If the amount falls within acceptable parameters, the system may proceed with authorization. This comparison ensures that synthetic liquidity tied to the second resource remains within safe bounds, preserving system integrity and preventing over-allocation of abstracted value.

In some embodiments, the system may determine whether to authorize the first request by determining a number of sub-transfers required between the first resource and the second resource and comparing the number of sub-transfers to a threshold number. For example, the system may determine whether to authorize the first request by first calculating the number of sub-transfers required between the first resource and the second resource to complete the requested operation, and then comparing this number to a predefined threshold. Sub-transfers may represent intermediary steps such as currency conversions, inter-bank transfers, cross-network hops, or jurisdiction-specific routing operations necessary to move value or data from the first resource to the second. Upon receiving the first request, the system analyzes the transaction path and decomposes it into its required sub-transfer components. It then tallies the total number of these steps and compares the result to a threshold number, which may be defined based on system performance constraints, transaction complexity limits, cost-efficiency guidelines, or risk exposure tolerances. If the number of required sub-transfers exceeds the threshold, indicating that the operation is too complex, costly, or time-sensitive, the system may deny, defer, or flag the request for further review. If the number is within the acceptable limit, the system proceeds with authorizing the request. This approach helps ensure efficient resource allocation and minimizes systemic friction, delays, or exposure associated with overly complex transfer paths.

In some embodiments, the system may determine whether to authorize the first request by receiving a second request to transfer availability from the second resource, wherein the second request is received before the first request, determining an amount of time between the second request and the first request, and comparing the amount of time to a threshold amount of time. For example, the system may determine whether to authorize the first request by receiving a second request to transfer availability from the second resource, where the second request is received prior to the first request, and using the time elapsed between the two to evaluate the authorization conditions. Upon receipt of the first request, the system references the timestamp of the earlier second request and calculates the amount of time that has passed between the two. This time interval is then compared to a predefined threshold amount of time, which may be established to enforce cooldown periods, prevent rapid successive transactions, or mitigate risks related to high-frequency or automated activity. If the time elapsed is less than the threshold—indicating that the two requests are occurring too close together—the system may deny, delay, or queue the first request for further review to prevent resource contention, fraud, or system overload. If the amount of time meets or exceeds the threshold, the request may be authorized as it falls within the acceptable timing window. This time-based evaluation allows the system to manage transaction pacing, maintain operational stability, and enforce timing-related policies across shared or limited resources.

At step 1010, process 1000 (e.g., using one or more components described above) processes a blockchain action based on the request. For example, the system may, in response to determining whether to authorize the first request, process a first blockchain action to transfer the first synthetic availability from the second resource to a second synthetic availability for the first resource. For example, in response to determining whether to authorize the first request, a system may process a first blockchain action to transfer the first synthetic availability from the second resource to a second synthetic availability for the first resource by initiating a secure, verifiable transaction on a distributed ledger. Once authorization is granted—based on compliance, operational, and risk-based evaluations—the system generates a blockchain transaction that reflects the movement of the synthetic availability. This transaction includes metadata such as the amount of synthetic availability to be transferred, the identity or address of the second resource (the sender), the identity or address of the first resource (the recipient), and any applicable conditions or constraints. The system may invoke a self-executing program (e.g., a smart contract) to validate and facilitate the transaction, ensuring that all predefined rules are satisfied before the transfer is completed. Upon successful execution, the system updates the digital log to reflect the new state: the first synthetic availability is deducted from the second resource and a corresponding second synthetic availability is created or incremented for the first resource. This updated state is cryptographically secured and recorded immutably on the blockchain, enabling traceability, auditability, and real-time access to the synthetic representation of resource availability.

At step 1012, process 1000 (e.g., using one or more components described above) determines a second actual availability. For example, the system may determine, using a second self-executing program, a second actual availability for the first resource based on the second synthetic availability. For example, the system may determine, using a second self-executing program, a second actual availability for the first resource based on the second synthetic availability by automatically evaluating whether the synthetic representation of value can be realized as an actual, usable resource. Once the second synthetic availability is recorded—typically as a cryptographically secure digital asset in a digital log—the second self-executing program (such as a smart contract) is triggered to validate the synthetic asset against a set of predefined rules and conditions. These may include the verification of source authenticity, sufficiency of backing assets, user permissions, network constraints, and any relevant compliance or timing requirements. If all conditions are met, the program autonomously converts the synthetic availability into a second actual availability, updating the system to reflect the real, accessible value now associated with the first resource. This actual availability may take the form of released funds, activated service credits, or provisioned computational resources. The result is a seamless and secure transition from an abstract, ledger-based representation to a tangible, operational asset—allowing the system to support real-time access, transaction settlement, or resource allocation based on previously tokenized availability.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 10.

Figure 11:
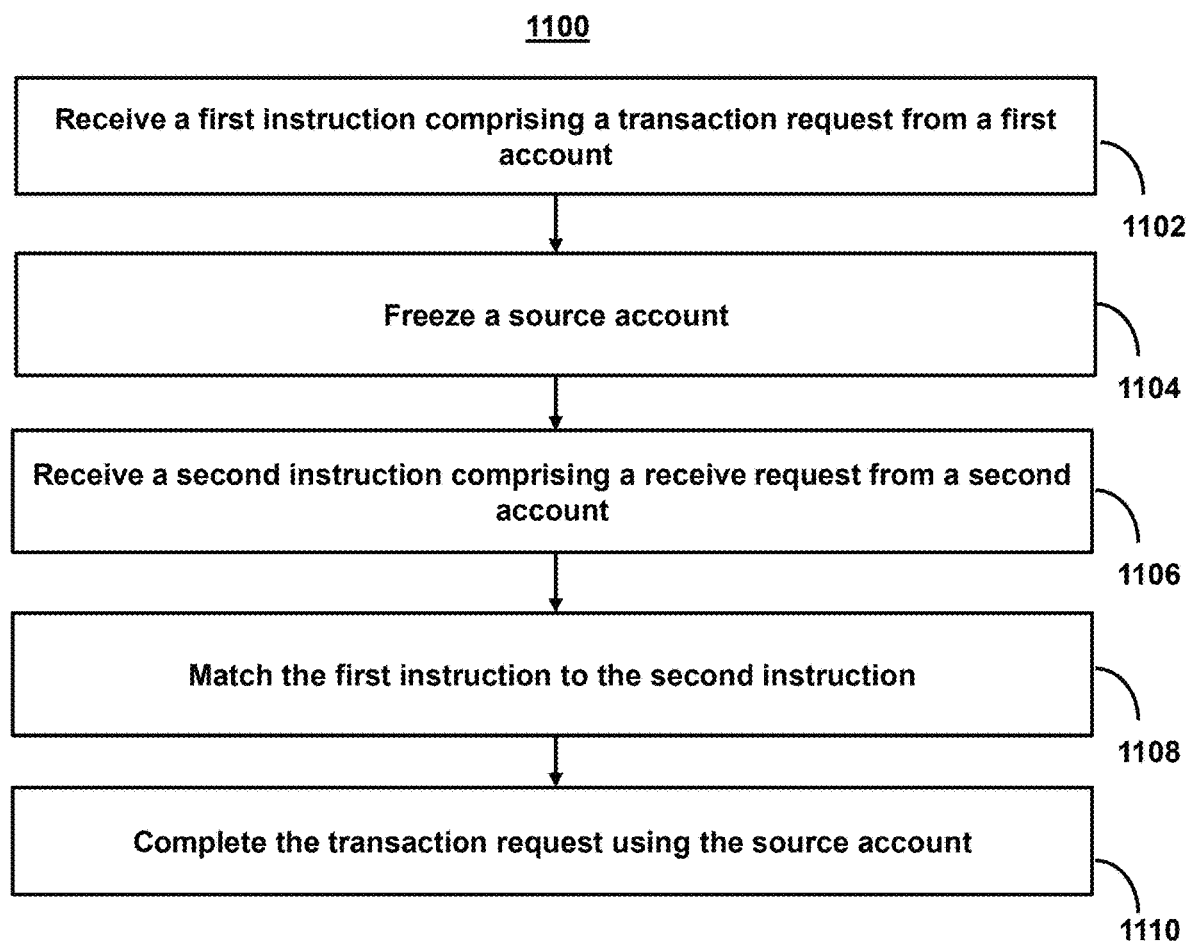
FIG. 11 shows a flowchart of the steps involved in a process for detokenization, in accordance with one or more embodiments.

FIG. 11 illustrates a flowchart of a process for detokenization, according to an embodiment. Process 1100 describes how an application can facilitate a transaction with a conventional account and keep a record of the transaction on a distributed ledger. For example, the system may use process 1100 (e.g., as implemented on one or more system components described above) in order to facilitate detokenization. Process 1100 may be used for executing multi-party validations and/or executing bifurcated digital signing processes (e.g., in order to facilitate a stablecoin redemption platform). For example, process 1100 may describe the detokenization process used to redeem a stablecoin.

At step 1102, process 1100 receives a deliver instruction from a first client device. The deliver instruction may be an instruction to transfer an asset from a source account hosted by the application (e.g., a digital wallet) into a destination account stored in a conventional system. The deliver instruction may include identifiers of the source account and the destination account. For example, the deliver instruction may be to transfer an asset to a particular transferee account from a given wallet. In some cases, the deliver instruction may include a BIC code for the application to enable the deliver instruction to be routed to the application using SWIFT messaging. In some embodiments, the application may validate the transaction request to verify that it is a valid request.

At step 1104, the application may freeze the balance of the source account (e.g., the token). By doing so, the application may make the balance unavailable for any transfers. The application may then create a new deliver instruction. This new deliver instruction may indicate the destination account (which would be the same as the destination account in the original request received from the client), but the source account would now be indicated as the conventional account in the set of financial applications to which the balance in the wallet is mapped for the particular asset in question. This new deliver instruction may include details of the ultimate source account (e.g., a wallet ID). The application may then route the transaction request to the set of financial applications. The application may transmit the transaction request to the set of financial applications using conventional or custom messaging (e.g., via the sets of instructions).

In some embodiments, a set of financial applications may validate the request and route the request to a financial market infrastructure such as one or more resources. The set of financial applications may validate the request using conventional request validation policies. The set of financial applications may then route the request to the FMI. The set of financial applications may do so using conventional messaging protocols (e.g., via the sets of instructions).

At step 1106, the FMI may receive a receive instruction from a second client device. The FMI may receive the receive instruction from the second client device through the financial institution that maintains the destination account that was identified in the transaction request from the first client device. The FMI may receive the receive instruction after the financial institution validates the receive instruction and routes the receive instruction to the FMI via a conventional message protocol). The receive instruction may include identifications of the destination account, the source account, and the ultimate source account. The receive instruction may include a reference to the asset being transferred to the destination account.

At step 1108, the FMI may match the receive instruction with the transaction request from the first client device. The FMI may match the receive instruction with the transaction request in a similar manner to the manner described above (e.g., compare the attributes (e.g., the different account identifiers and/or the identification of the asset) of the two requests and determine whether the attributes match). If the FMI determines the assets do not match, the FMI may generate an error message and stop the transaction from occurring. Otherwise, if the FMI determines the assets match, the FMI may settle the transaction by crediting the asset to the destination account and debiting the asset from the recipient account stored on the set of financial applications. The FMI may transmit (via the sets of instructions) a credit confirmation to the destination account being accessed by the second computing device and transmit (via the sets of instructions) a confirmation message for the debit to the set of financial applications.

At step 1110, the application completes the transaction request. In some embodiments, the set of financial applications may receive the debit confirmation (i.e., the debit from the conventional account in the set of financial applications which maps to the wallet from which the asset is being transferred) from the FMI and then create and transmit to the application a new confirmation of the debit from the wallet. The set of financial applications may transmit the confirmation to the application using a conventional communication protocol or a custom messaging protocol (e.g., via the sets of instructions). In some embodiments, the application may receive the confirmation and burn the previously frozen token in the source account (e.g., debit the asset of the transaction from the source account).

In some embodiments, the application may transmit a debit confirmation in addition to other transaction details (e.g., transaction status messages, intraday statement, end of day statements, etc.) to the first computing device (e.g., to the source account that the first computing device is accessing). The application may do so using conventional messaging protocols (e.g., the sets of instructions) or custom messaging protocols (e.g., via the sets of instructions).

In some embodiments, if the same entity owns both the source account and the destination account (e.g., the transferor/transferee account), the user may request the application to initiate the 'receive instruction', which is usually received from a second client device. The system may only do so, in some cases, if the application is authorized to do so (e.g., has the appropriate account permissions). Further, in some cases, depending on the asset in question, a transfer over a conventional settlement network may not need matching instructions (for example, for transferring USD, it may suffice to just have a deliver instruction). In some embodiments, the recipient account in the set of financial applications is not an omnibus account. In such cases, the designation of the ultimate source account may not be needed at any stage.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 11.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method for managing resources across global or cloud networks while mitigating issues related to providing services while resources are offline, pooling a plurality of resources across computer networks, dynamic management of a plurality of resources across computer networks, managing resources across global or cloud networks while mitigating issues related to providing services irrespective of resource readiness, and/or performing real-time actions.
2. The method of the preceding embodiment, further comprising: determining, using a first self-executing program, a first actual availability for a first resource in a first computer network, wherein the first resource is currently online, and wherein the first actual availability is represented by a first cryptographically secure digital asset in a digital log; determining, using a second self-executing program, a first synthetic availability for a second resource in the first computer network, wherein the second resource is currently offline, and wherein the first synthetic availability is represented by a second cryptographically secure digital asset in a digital log; determining a first aggregate availability for the first computer network based on the first actual availability and the first synthetic availability; receiving a first request to perform a first blockchain action across the first computer network; and processing the first blockchain action using the first aggregate availability.
3. The method of any one the preceding embodiments, wherein determining the first synthetic availability for the second resource in the first computer network further comprises: retrieving a last known actual availability for the second resource from the digital log; and selecting the first synthetic availability from a plurality of synthetic availabilities, based on the last known actual availability.

4. The method of any one of the preceding embodiments, wherein receiving the first request to perform the first blockchain action across the first computer network further comprises: determining that the first blockchain action requests access to the second resource; and determining to use the first actual availability to process the first blockchain action.

5. The method of any one of the preceding embodiments, wherein determining to use the first actual availability to process the first blockchain action further comprises: determining that the second resource is offline; and in response to determining that the second resource is offline, determining to use the first aggregate availability to process the first blockchain action.

6. The method of any one of the preceding embodiments, wherein determining the first aggregate availability for the first computer network based on the first actual availability and the first synthetic availability further comprise: aggregating the first cryptographically secure digital asset and the second cryptographically secure digital asset; and determining the first aggregate availability based on aggregating the first cryptographically secure digital asset and the second cryptographically secure digital asset.

7. The method of any one of the preceding embodiments, wherein processing the first blockchain action using the first aggregate availability further comprises: determining a second aggregate availability for the first computer network following the first blockchain action; and determining, using a third self-executing program, a second synthetic availability for the second resource following the first blockchain action.

8. The method of any one of the preceding embodiments, wherein processing the first blockchain action using the first aggregate availability further comprises: determining an amount of availability needed to process the first blockchain action; using the first actual availability to process the first blockchain action; deducting the amount from the first synthetic availability to determine a second synthetic availability for the second resource; and determining a third synthetic availability for the first resource corresponding to the amount.

9. The method of any one of the preceding embodiments, further comprising: determining that the second resource is now online; and replacing, using a fourth self-executing program, the first synthetic availability with a second actual availability in the digital log.

10. The method of any one of the preceding embodiments, further comprising: determining that the first resource is now offline; and replacing, using a fifth self-executing program, the first actual availability with a second synthetic availability in the digital log.

11. The method of any one of the preceding embodiments, further comprising: determining a first characteristic of the first actual availability; and selecting the first cryptographically secure digital asset, from a plurality of cryptographically secure digital assets, based on the first characteristic.

12. The method of any one of the preceding embodiments, wherein determining the first actual availability for the first resource in the first computer network further comprises: receiving a first verification that the first resource has the first actual availability; and recording the first cryptographically secure digital asset as corresponding to the first resource based on the first verification.

13. The method of any one of the preceding embodiments, wherein the first verification is determined based on an amount for an off-chain record corresponding to the first resource, and wherein the first verification is received at a first blockchain network via a first oracle.

14. The method of any one of the preceding embodiments, wherein receiving the first request further comprises: receiving, at a platform management application, a user request to perform a first off-chain action; and determining that the first blockchain action corresponds to first off-chain action.

15. The method of any one of the preceding embodiments, wherein receiving the first request further comprises: receiving a first user request to perform a first off-chain action; and determining that the first blockchain action corresponds to the second resource.

16. The method of the preceding embodiment, further comprising: determining, using a first self-executing program, a first synthetic availability for a first resource in a first computer network, wherein the first synthetic availability is represented by a first cryptographically secure digital asset in a digital log, and wherein the first synthetic availability is related to a first actual availability for the first resource; determining, using a second self-executing program, a second synthetic availability for a second resource in the first computer network, wherein the second synthetic availability is represented by a second cryptographically secure digital asset in the digital log, and wherein the second synthetic availability is related to a second actual availability for the second resource; determining, using a first artificial intelligence model, a first aggregate availability for the first computer network based on the first synthetic availability and the second synthetic availability; receiving a first request to perform a first blockchain action across the first computer network; and processing the first blockchain action using the first aggregate availability.

17. The method of any one of the preceding embodiments, further comprising: determining, using a third self-executing program, a third synthetic availability for the first resource following the first blockchain action; detecting that the first resource is online; and replacing, using a fourth self-executing program, the third synthetic availability with third actual availability in the digital log.

18. The method of any one of the preceding embodiments, further comprising: determining, using a fifth self-executing program, a fourth synthetic availability for the second resource following the first blockchain action; detecting that the second resource is online; and replacing, using a sixth self-executing program, the fourth synthetic availability with fourth actual availability in the digital log.

19. The method of any one of the preceding embodiments, further comprising: identifying, based on the first request, a user account identifier; determining, using a seventh self-executing program, a fifth synthetic availability for the first resource associated with the user account identifier following the first blockchain action; detecting that the first resource is online; and replacing, using an eighth self-executing program, the fifth synthetic availability with fifth actual availability associated with the user account identifier in the digital log.

20. The method of any one of the preceding embodiments, further comprising: identifying, based on the first request, a user account identifier; determining, using a ninth self-executing program, a sixth synthetic availability for the first resource associated with the user account identifier following the first blockchain action; detecting that the second resource is online; and replacing, using a tenth self-executing program, the sixth synthetic availability with sixth actual availability associated with the user account identifier in the digital log.

21. The method of any one of the preceding embodiments, wherein determining (i) the first synthetic availability for the first resource in the first computer network and (ii) the second synthetic availability for the second resource in the first computer network further comprises: retrieving a last known actual availability for each of (i) the first resource and (ii) the second resource from the digital log; and selecting the first synthetic availability and the second synthetic availability from a plurality of synthetic availabilities, based on the last known actual availability for each of (i) the first resource and (ii) the second resource, respectively.

22. The method of any one of the preceding embodiments, wherein determining the first aggregate availability for the first computer network further comprises: detecting that (i) the first resource is currently online and (ii) the second resource is currently offline; in response to detecting that the first resource is currently online, determining the first actual availability for the first resource; and determining, using the first artificial intelligence model, the first aggregate availability for the first computer network based on the first actual availability and the second synthetic availability.

23. The method of any one of the preceding embodiments, wherein determining the first aggregate availability for the first computer network further comprises: obtaining the first synthetic availability for the first resource and the second synthetic availability for the second resource; providing (i) the first synthetic availability and (ii) the second synthetic availability to the first artificial intelligence model, wherein the first artificial intelligence model is trained to generate aggregate availabilities, and wherein the first artificial intelligence model is communicatively coupled to a retrieval component configured to retrieve actual availabilities related to resources of the first computer network; and receiving, from the first artificial intelligence model, the first aggregate availability for the first computer network, wherein the first aggregate availability based on retrieved actual availabilities for online resources.

24. The method of any one of the preceding embodiments, wherein determining the first aggregate availability for the first computer network further comprises: obtaining the first synthetic availability for the first resource and the second synthetic availability for the second resource; providing (i) the first synthetic availability and (ii) the second synthetic availability to the first artificial intelligence model, wherein the first artificial intelligence model is trained to generate aggregate availabilities, and wherein the first artificial intelligence model is communicatively coupled to a retrieval component configured to retrieve weighted availabilities related to resources of the first computer network; and receiving, from the first artificial intelligence model, the first aggregate availability for the first computer network, wherein the first aggregate availability based on weighted availabilities of resources of the first computer network.

25. The method of any one of the preceding embodiments, further comprising: determining a first characteristic the first blockchain action; providing the first characteristic to a second artificial intelligence model trained to select cryptographically secure digital assets based on action characteristics and cryptographically secure digital asset characteristics; and receiving, from the second artificial intelligence model, the first cryptographically secure digital asset.

26. The method of any one of the preceding embodiments, further comprising: receiving a first recommendation indicating an alternative blockchain action to be processed by providing (i) the first request to perform the first blockchain action and (ii) the first aggregate availability for the first computer network to a second artificial intelligence model trained to recommend blockchain actions; and processing the alternative blockchain action in lieu of the first blockchain action.

27. The method of any one of the preceding embodiments, wherein the second artificial intelligence model comprises a Large Language Model (LLM), and wherein the LLM is trained, the training of the LLM comprising: obtaining a set of training data comprising training blockchain actions and aggregate availabilities of a computing network; providing the set of training data to the LLM during a training routine, the LLM being communicatively coupled to a retrieval component configured to retrieve (i) similar blockchain actions historically processed by the first computer network successfully and (ii) similar aggregate availabilities corresponding to the similar blockchain actions historically processed by the first computer network successfully to be provided to the LLM; receiving, from the LLM during the training routine, a set of candidate alternative blockchain actions based on (i) similar blockchain actions historically processed by the first computer network successfully and (ii) similar aggregate availabilities corresponding to the similar blockchain actions historically processed by the first computer network successfully; and in response to receiving the set of candidate alternative blockchain actions, providing a message, during the training routine, to the LLM comprising an accuracy value corresponding to each candidate alternative blockchain action of the set of candidate alternative blockchain actions.

28. The method of any one of the preceding embodiments, wherein determining the first synthetic availability for the first resource in the first computer network further comprises: identifying a set of availability characteristics associated with the first resource; and determining the first synthetic availability for the first resource by providing the set of availability characteristics to a third artificial intelligence model trained to determine synthetic availabilities of resources.

29. The method of any one of the preceding embodiments, further comprising: obtaining a set of training availability characteristics corresponding to a respective resource of a set of resources, wherein each training availability characteristic is labeled with an availability value associated with the respective training availability characteristic; providing the set of training availability characteristics as input to the third artificial intelligence model during a training routine to generate a first prediction indicating a predicted synthetic availability of a third resource; and updating one or more parameters of the third artificial intelligence model based on an accuracy metric between the predicted synthetic availability of the third resource and a known synthetic availability of the third resource.

30. The method of the preceding embodiments, further comprising: determining, using a first self-executing program, a first actual availability for a first plurality of resources in a first computer network, wherein the first plurality of resources is currently online, and wherein the first actual availability is represented by a first cryptographically secure digital asset in a digital log; determining, using a second self-executing program, a first synthetic availability for a second plurality of resources in the first computer network, wherein the second plurality of resources is currently offline, and wherein the first synthetic availability is represented by a second cryptographically secure digital asset in the digital log; determining a first aggregate availability for the first computer network based on the first actual availability and the first synthetic availability to process a plurality of blockchain actions.

31. The method of the preceding embodiments, further comprising processing one or more of the plurality of blockchain actions using the first aggregate availability.

32. The method of any one of the preceding embodiments, wherein determining the first synthetic availability for the second plurality of resources in the first computer network further comprises: retrieving a last known actual availability for each of the second plurality of resources from the digital log; and selecting the first synthetic availability from a plurality of synthetic availabilities, based on the last known actual availability for each of the second plurality of resources.

33. The method of any one of the preceding embodiments, wherein determining the first aggregate availability further comprises: detecting that (i) the first plurality of resources are currently online and (ii) the second plurality of resources are currently offline; in response to detecting that the first plurality of resources are currently online, determining the first actual availability for the first plurality of resources; and determining, using a first artificial intelligence model, the first aggregate availability for the first computer network based on the first actual availability and the first synthetic availability.

34. The method of any one of the preceding embodiments, wherein determining the first aggregate availability further comprises: determining an amount of availability needed to process the plurality of blockchain actions; determining that the first actual availability fails to satisfy the amount of availability needed to process the plurality of blockchain actions; deducting the first actual availability from the amount of availability needed to process the plurality of blockchain actions to generate an amount of supplemental availability needed to process the plurality of blockchain actions; determining a second synthetic availability corresponding to the amount of supplemental availability; generating a second aggregate availability based on the first actual availability and the second synthetic availability; and using the second aggregate availability to process the plurality of blockchain actions.

35. The method of any one of the preceding embodiments, further comprising: determining that a second resource of the second plurality of resources is now online; determining a third synthetic availability of the second resource used to process the plurality of blockchain actions; and replacing, using a self-executing program, the third synthetic availability with a second actual availability in the digital log.

36. The method of any one of the preceding embodiments, further comprising: determining a first actual availability for a first resource in a first computer network for a first user; determining a second actual availability for a second resource in the first computer network for the first user; determining a first aggregate availability for the first user based on the first actual availability and the second actual availability; determining, using a first self-executing program, a first synthetic availability based on the first aggregate availability, wherein the first synthetic availability is represented by a first cryptographically secure digital asset in a digital log; and processing a first blockchain action based on the first synthetic availability by populating a third resource in the first computer network for the first user with a third actual availability corresponding to the first synthetic availability and modifying, using a second self-executing program, the first synthetic availability as recorded in the digital log.

37. The method of any one of the preceding embodiments, wherein processing the first blockchain action further comprises: modifying the first actual availability for the first resource based on a first portion of the first synthetic availability corresponding to the first actual availability; and modifying the second actual availability for the second resource based on a second portion of the first synthetic availability corresponding to the second actual availability.

38. The method of any one of the preceding embodiments, wherein determining the first aggregate availability further comprises: retrieving a user aggregation event corresponding to the first user; determining a first characteristic corresponding to the first user; and comparing the first characteristic to the user aggregation event.

39. The method of any one of the preceding embodiments, wherein determining the first aggregate availability further comprises: retrieving a network-wide aggregation event corresponding to the first computer network; determining a first characteristic corresponding to the first computer network; and comparing the first characteristic to the network-wide aggregation event.

40. The method of any one of the preceding embodiments, wherein determining the first aggregate availability further comprises: retrieving a temporal aggregation event corresponding to a first time period; determining a current time; and comparing the current time to the first time period.

41. The method of any one of the preceding embodiments, wherein determining the first aggregate availability further comprises: receiving a user selection of a predetermined aggregation event; and monitoring for the predetermined aggregation event.

42. The method of any one of the preceding embodiments, wherein determining the first aggregate availability further comprises: retrieving a user aggregation event corresponding to the first user; determining a first characteristic corresponding to the first user; and comparing the first characteristic to the user aggregation event.

43. The method of any one of the preceding embodiments, wherein determining the first aggregate availability further comprises: receiving computer network data corresponding to the first computer network; generating a feature input based on the computer network data;

inputting the feature input into a first model to generate a first output, wherein the first model is trained on historic computer network data to generate outputs related to likelihoods of network anomaly events; and comparing the first output to a predetermined aggregation event, wherein the predetermined aggregation event indicates a likelihood of a network anomaly event.

44. The method of any one of the preceding embodiments, wherein determining the first aggregate availability further comprises: receiving resource activity data corresponding to the first resource; generating a feature input based on the resource activity data; inputting the feature input into a first model to generate a first output, wherein the first model is trained on historic resource activity data to generate outputs related to likelihoods of cyber-security events; and comparing the first output to a predetermined aggregation event, wherein the predetermined aggregation event indicates a likelihood of a cyber-security event.

45. The method of any one of the preceding embodiments, wherein determining the first aggregate availability further comprises: receiving user objective data corresponding to the first user; generating a feature input based on the user objective data; inputting the feature input into a first model to generate a first output, wherein the first model is trained on historic user objective data and historic network activity data to generate outputs related to recommendations for aggregation events; and generating for display, on a user interface, a first recommendation to trigger an aggregation event.

46. The method of any one of the preceding embodiments, wherein determining the first aggregate availability further comprises: retrieving a first threshold actual availability for the first resource; and comparing the first threshold actual availability to the first actual availability for a first resource in a first computer network for a first user.

47. The method of any one of the preceding embodiments, wherein determining the first actual availability further comprises: retrieving respective user identifiers for a plurality of resources; and determining that the first resource and the second resource correspond to the first user based on a first respective user identifier for the first resource and a second respective user identifier for the second resource.

48. The method of any one of the preceding embodiments, wherein determining the first actual availability further comprises: receiving a request to pool resources based on respective geographic locations; retrieving respective geographic identifiers for a plurality of resources; and determining to pool the first resource and the second resource based on a first respective geographic identifier for the first resource and a second respective geographic identifier for the second resource.

49. The method of any one of the preceding embodiments, wherein determining the first actual availability further comprises: receiving a request to pool resources based on respective resource activity; retrieving respective activity identifiers for a plurality of resources; and determining to pool the first resource and the second resource based on a first respective activity identifier for the first resource and a second respective activity identifier for the second resource.

50. The method of any one of the preceding embodiments, further comprising: receiving a first request to generate availability at a first resource; in response to the first request, determining a first actual availability for a second resource; determining, using a first self-executing program, a first synthetic availability for the second resource based on the first actual availability, wherein the first synthetic availability is represented by a first cryptographically secure digital asset in a digital log; determining whether to authorize the first request; in response to determining whether to authorize the first request, processing a first blockchain action to transfer the first synthetic availability from the second resource to a second synthetic availability for the first resource; and determining, using a second self-executing program, a second actual availability for the first resource based on the second synthetic availability.

51. The method of any one of the preceding embodiments, wherein determining whether to authorize the first request further comprises: retrieving a known identifier for the first resource; and comparing the known identifier to a plurality of approved identifiers.

52. The method of any one of the preceding embodiments, wherein determining whether to authorize the first request further comprises: retrieving a plurality of approved geographic locations; and comparing the first geographic location to the plurality of approved geographic locations.

53. The method of any one of the preceding embodiments, wherein determining whether to authorize the first request further comprises: retrieving a plurality of compliance requirements for a plurality of geographic locations; and determining a compliance requirement for the first request based on the first geographic location.

54. The method of any one of the preceding embodiments, wherein determining whether to authorize the first request further comprises: determining a number of blockchain actions currently being processed; and comparing the number of blockchain actions to a threshold number.

55. The method of any one of the preceding embodiments, wherein determining whether to authorize the first request further comprises: determining a frequency of blockchain actions being processed from the second resource; and comparing the frequency to a threshold frequency.

56. The method of any one of the preceding embodiments, wherein determining whether to authorize the first request further comprises: determining a first transfer characteristic of the first blockchain action; and retrieving a plurality of restricted actions; and comparing the first transfer characteristic to the plurality of restricted actions.

57. The method of any one of the preceding embodiments, wherein determining whether to authorize the first request further comprises: determining a first transfer characteristic of the first blockchain action; and retrieving a plurality of restricted actions; and comparing the first transfer characteristic to the plurality of restricted actions.

58. The method of any one of the preceding embodiments, wherein determining whether to authorize the first request further comprises: receiving resource activity data corresponding to the first resource; generating a feature input based on the resource activity data; inputting the feature input into a first model to generate a first output, wherein the first model is trained on historic resource activity data to generate outputs related to likelihoods of cyber-security events; and comparing the first output to an authorization criterion.

59. The method of any one of the preceding embodiments, wherein determining whether to authorize the first request further comprises: receiving computer network data; generating a feature input based on the computer network data; inputting the feature input into a first model to generate a first output, wherein the first model is trained on historic computer network data to generate outputs related to likelihoods of network anomaly events; and comparing the first output to an authorization criterion.

60. The method of any one of the preceding embodiments, wherein determining whether to authorize the first request further comprises: receiving user objective data corresponding to the first user; generating a feature input based on the user objective data; inputting the feature input into a first model to generate a first output, wherein the first model is trained on historic user objective data and historic network activity data to generate outputs related to recommendations for authorizing transfers; and generating for display, on a user interface, a first recommendation to authorize the first request.

61. The method of any one of the preceding embodiments, wherein determining whether to authorize the first request further comprises: determining a first ratio of the first synthetic availability to a total availability for the second resource; and comparing the first ratio to a threshold ratio.

62. The method of any one of the preceding embodiments, wherein determining whether to authorize the first request further comprises: determining a total amount of synthetic availability for the second resource; and comparing the first synthetic availability to the total amount of synthetic availability.

63. The method of any one of the preceding embodiments, wherein determining whether to authorize the first request further comprises: determining a number of sub-transfers required between the first resource and the second resource; and comparing the number of sub-transfers to a threshold number.

64. The method of any one of the preceding embodiments, wherein determining whether to authorize the first request further comprises: receiving a second request to transfer availability from the second resource, wherein the second request is received before the first request; determining an amount of time between the second request and the first request; and comparing the amount of time to a threshold amount of time.

65. The method of any one of the preceding embodiments, further comprising: receiving a user request to perform a real-time action, determining a transaction between one or more geographic locations, and executing a self-executing program to complete the transaction.

66. A tangible, non-transitory, machine-readable medium storing instructions that, when executed by a data processing apparatus, cause the data processing apparatus to perform operations comprising those of any of embodiments 1-65.

67. A system comprising one or more processors; and memory storing instructions that, when executed by the processors, cause the processors to effectuate operations comprising those of any of embodiments 1-65.

68. A system comprising means for performing any of embodiments 1-65.

What is claimed is:

1. A system for dynamic management of a plurality of resources across computer networks using synthetic availabilities, the system comprising:
   one or more processors; and
   one or more non-transitory, computer-readable media comprising instructions recorded thereon that when executed by the one or more processors cause operations comprising:
      receiving a first request to generate availability at a first resource based on potential availability at a second resource, wherein the first resource corresponds to a first user account in a first geographic location, and wherein the second resource corresponds to a second user account in a second geographic location;
      in response to the first request, determining, based on the second user account, a first actual availability for the second resource;
      determining, using a first self-executing program, a first synthetic availability for the second resource based on the first actual availability, wherein the first synthetic availability is represented by a first cryptographically secure digital asset in a digital log;
      determining whether to authorize the first request;
      in response to determining whether to authorize the first request, processing a first blockchain action to transfer the first synthetic availability from the second resource to a second synthetic availability for the first resource in the digital log;
      determining, using a second self-executing program, a second actual availability for the first resource based on the second synthetic availability; and
      recording the second actual availability at the second resource.

2. A method for dynamic management of a plurality of resources across computer networks, the method comprising:
   receiving a first request to generate availability at a first resource;
   in response to the first request, determining a first actual availability for a second resource;
   determining, using a first self-executing program, a first synthetic availability for the second resource based on the first actual availability, wherein the first synthetic availability is represented by a first cryptographically secure digital asset in a digital log;
   determining whether to authorize the first request;
   in response to determining whether to authorize the first request, processing a first blockchain action to transfer the first synthetic availability from the second resource to a second synthetic availability for the first resource; and
   determining, using a second self-executing program, a second actual availability for the first resource based on the second synthetic availability.

3. The method of claim 2, wherein determining whether to authorize the first request further comprises:
   retrieving a known identifier for the first resource; and
   comparing the known identifier to a plurality of approved identifiers.

4. The method of claim 2, wherein determining whether to authorize the first request further comprises:
   retrieving a plurality of approved geographic locations; and
   comparing the first geographic location to the plurality of approved geographic locations.

5. The method of claim 2, wherein determining whether to authorize the first request further comprises:
retrieving a plurality of compliance requirements for a plurality of geographic locations; and
determining a compliance requirement for the first request based on the first geographic location.

6. The method of claim 2, wherein determining whether to authorize the first request further comprises:
determining a number of blockchain actions currently being processed; and
comparing the number of blockchain actions to a threshold number.

7. The method of claim 2, wherein determining whether to authorize the first request further comprises:
determining a frequency of blockchain actions being processed from the second resource; and
comparing the frequency to a threshold frequency.

8. The method of claim 2, wherein determining whether to authorize the first request further comprises:
determining a first transfer characteristic of the first blockchain action;
retrieving a plurality of restricted actions; and
comparing the first transfer characteristic to the plurality of restricted actions.

9. The method of claim 2, wherein determining whether to authorize the first request further comprises:
receiving resource activity data corresponding to the first resource;
generating a feature input based on the resource activity data;
inputting the feature input into a first model to generate a first output, wherein the first model is trained on historic resource activity data to generate outputs related to likelihoods of cyber-security events; and
comparing the first output to an authorization criterion.

10. The method of claim 2, wherein determining whether to authorize the first request further comprises:
receiving computer network data;
generating a feature input based on the computer network data;
inputting the feature input into a first model to generate a first output, wherein the first model is trained on historic computer network data to generate outputs related to likelihoods of network anomaly events; and
comparing the first output to an authorization criterion.

11. The method of claim 2, wherein determining whether to authorize the first request further comprises:
receiving user objective data corresponding to the first user;
generating a feature input based on the user objective data;
inputting the feature input into a first model to generate a first output, wherein the first model is trained on historic user objective data and historic network activity data to generate outputs related to recommendations for authorizing transfers; and
generating for display, on a user interface, a first recommendation to authorize the first request.

12. The method of claim 2, wherein determining whether to authorize the first request further comprises:
determining a first ratio of the first synthetic availability to a total availability for the second resource; and
comparing the first ratio to a threshold ratio.

13. The method of claim 2, wherein determining whether to authorize the first request further comprises:
determining a total amount of synthetic availability for the second resource; and
comparing the first synthetic availability to the total amount of synthetic availability.

14. The method of claim 2, wherein determining whether to authorize the first request further comprises:
determining a number of sub-transfers required between the first resource and the second resource; and
comparing the number of sub-transfers to a threshold number.

15. The method of claim 2, wherein determining whether to authorize the first request further comprises:
receiving a second request to transfer availability from the second resource, wherein the second request is received before the first request;
determining an amount of time between the second request and the first request; and
comparing the amount of time to a threshold amount of time.

16. One or more non-transitory, computer-readable media comprising instructions recorded thereon that when executed by one or more processors cause operations comprising:
receiving a first request to generate availability at a first resource;
determining a first actual availability for a second resource;
determining a first synthetic availability for the second resource based on the first actual availability, wherein the first synthetic availability is represented by a first cryptographically secure digital asset in a digital log;
determining whether to authorize the first request;
in response to determining whether to authorize the first request, processing a first blockchain action to transfer the first synthetic availability from the second resource to a second synthetic availability for the first resource; and
determining a second actual availability for the first resource based on the second synthetic availability.

17. The one or more non-transitory, computer-readable media of claim 16, wherein determining whether to authorize the first request further comprises:
retrieving a known identifier for the first resource; and
comparing the known identifier to a plurality of approved identifiers.

18. The one or more non-transitory, computer-readable media of claim 16, wherein determining whether to authorize the first request further comprises:
retrieving a plurality of approved geographic locations; and
comparing the first geographic location to the plurality of approved geographic locations.

* * * * *